US009854448B2

(12) United States Patent
Takano

(10) Patent No.: US 9,854,448 B2
(45) Date of Patent: Dec. 26, 2017

(54) DEVICE AND METHOD FOR PERFORMING COMMUNICATION VIA A PLURALITY OF COMPONENT CARRIERS

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/124,320

(22) PCT Filed: Dec. 17, 2014

(86) PCT No.: PCT/JP2014/083387
§ 371 (c)(1),
(2) Date: Sep. 7, 2016

(87) PCT Pub. No.: WO2015/136808
PCT Pub. Date: Sep. 17, 2015

(65) Prior Publication Data
US 2017/0019794 A1    Jan. 19, 2017

(30) Foreign Application Priority Data

Mar. 14, 2014 (JP) ................................. 2014-052066

(51) Int. Cl.
H04W 72/00     (2009.01)
H04W 16/14     (2009.01)
(Continued)

(52) U.S. Cl.
CPC ....... *H04W 16/14* (2013.01); *H04W 72/0446* (2013.01); *H04W 72/0453* (2013.01); *H04W 52/367* (2013.01); *H04W 84/042* (2013.01)

(58) Field of Classification Search
None
See application file for complete search history.

(56) References Cited

U.S. PATENT DOCUMENTS

2006/0203841 A1    9/2006 Fischer
2011/0128895 A1    6/2011 Sadek et al.
(Continued)

FOREIGN PATENT DOCUMENTS

| JP | 2006-94001 A | 4/2006 |
| JP | 2013-524642 A | 6/2013 |
| JP | 2015-208958 | 3/2015 |

OTHER PUBLICATIONS

International Search Report dated Mar. 17, 2015 in PCT/JP2014/083387 Filed Dec. 17, 2014.
(Continued)

*Primary Examiner* — Idowu O Osifade
(74) *Attorney, Agent, or Firm* — Oblon, McClelland, Maier & Neustadt, L.L.P.

(57) ABSTRACT

A device enabling a frequency band shared between wireless communication of a cellular system and other wireless communication to be more appropriately used in the cellular system. The device includes a control unit configured to occupy a frequency band shared between wireless communication of a cellular system and other wireless communication for the wireless communication of the cellular system during a first period and release the frequency band from the wireless communication of the cellular system during at least a second period corresponding to the first period.

22 Claims, 34 Drawing Sheets

(51) Int. Cl.
*H04W 72/04* (2009.01)
*H04W 52/36* (2009.01)
*H04W 84/04* (2009.01)

(56) References Cited

U.S. PATENT DOCUMENTS

| | | | |
|---|---|---|---|
| 2011/0243047 A1 | 10/2011 | Dayal et al. | |
| 2013/0188552 A1* | 7/2013 | Kazmi | H04L 5/001 370/315 |
| 2013/0208587 A1 | 8/2013 | Bala et al. | |
| 2013/0343288 A1 | 12/2013 | Ratasuk et al. | |
| 2015/0195849 A1* | 7/2015 | Bashar | H04W 16/14 370/330 |
| 2015/0223243 A1* | 8/2015 | Tabet | H04W 28/085 370/330 |

OTHER PUBLICATIONS

Extended Search Report dated Sep. 28, 2017, in EP Application No. 14885091.0.
Office Action dated Oct. 31, 2017, in corresponding Japanese Patent Application No. 2016-507276.

* cited by examiner

FIG. 24
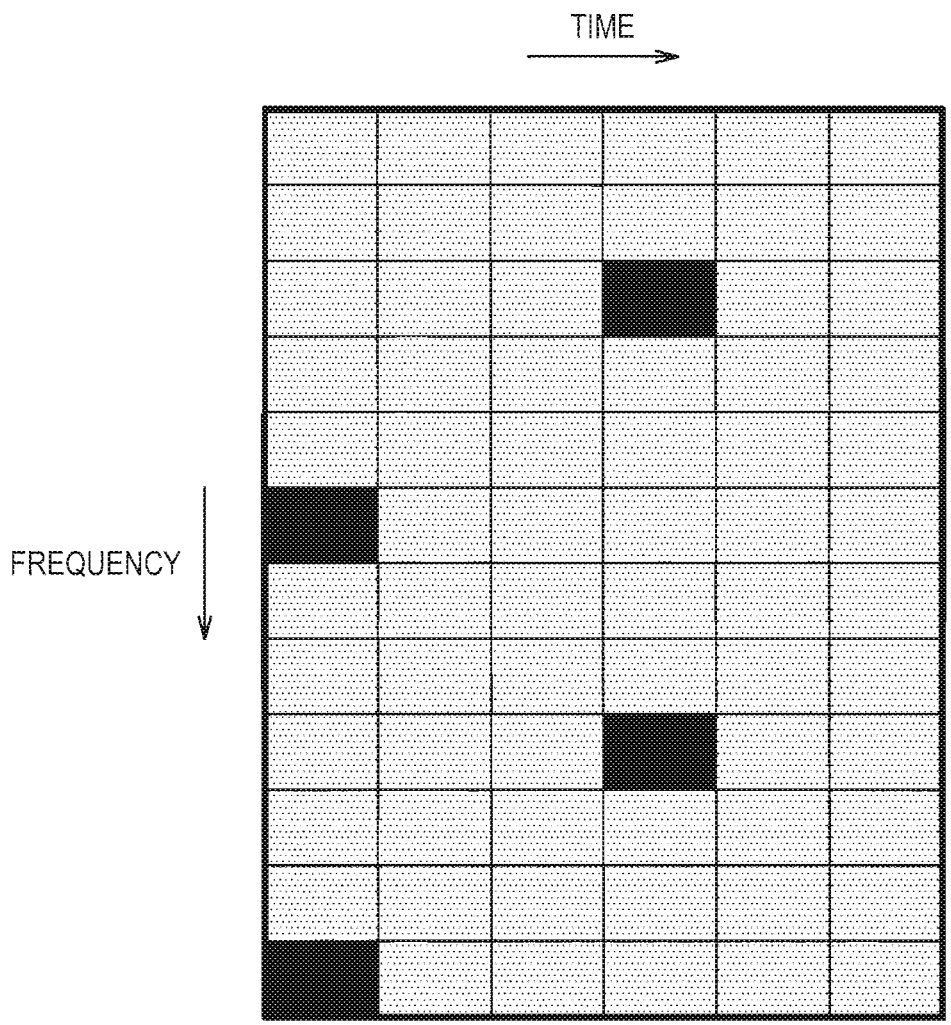
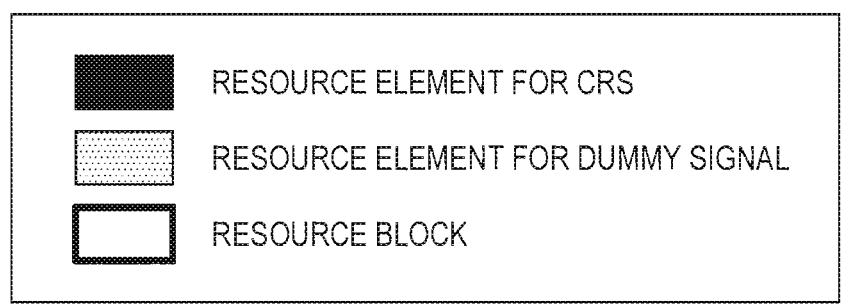

FIG. 25
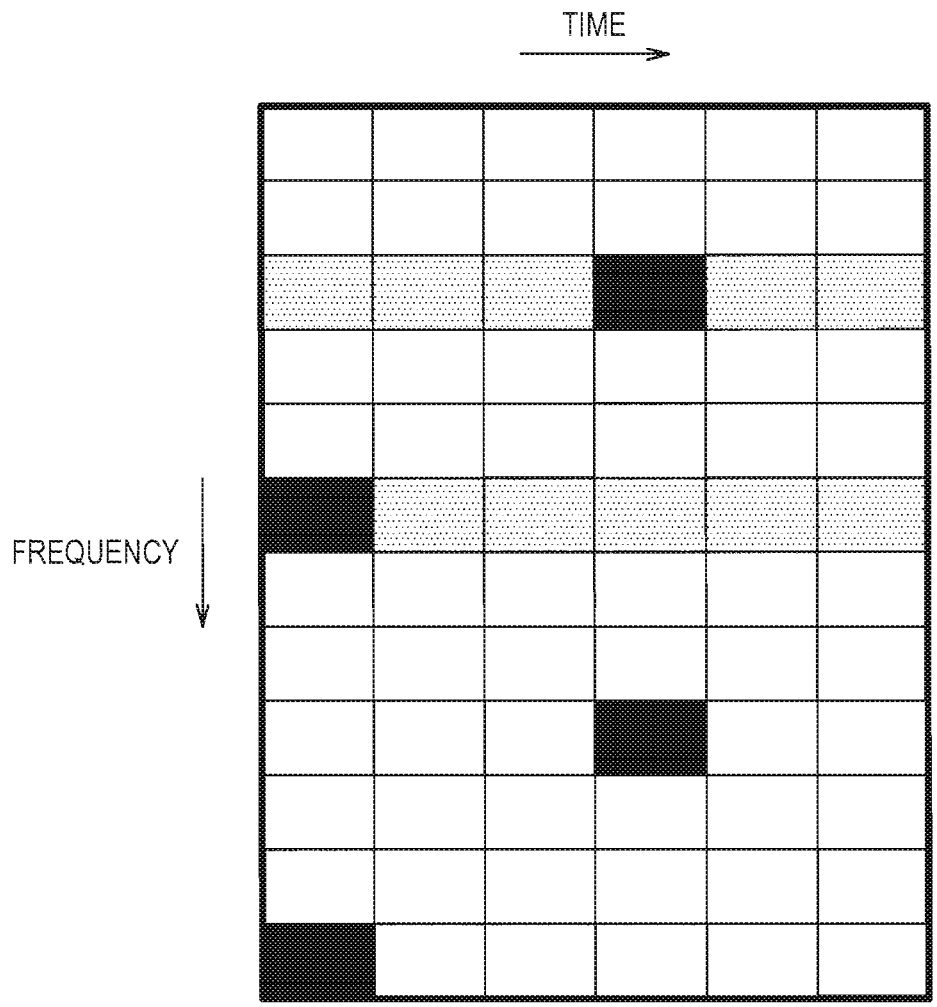
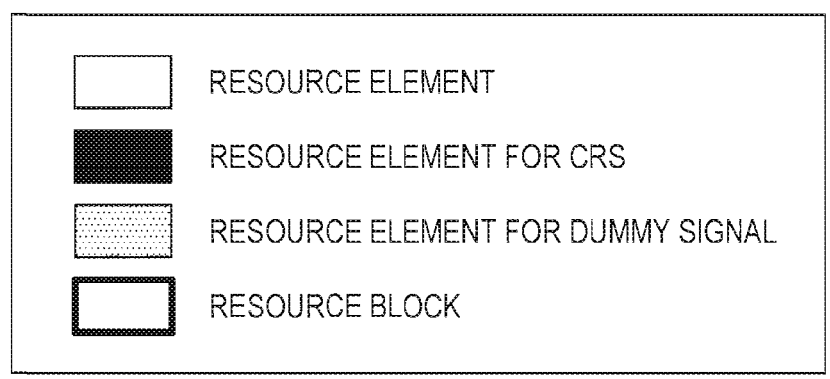

DEVICE AND METHOD FOR PERFORMING COMMUNICATION VIA A PLURALITY OF COMPONENT CARRIERS

TECHNICAL FIELD

The present disclosure relates to a device and a method.

BACKGROUND ART

In the $3^{rd}$ Generation Partnership Project (3GPP), various technologies for improving system throughput have been discussed. It may be said that a first shortcut for improving the system throughput is increasing a frequency to be used. In the 3GPP, the technology of carrier aggregation (CA) has been considered in Release 10 and Release 11. CA is a technology for improving the system throughput and a maximum data rate by aggregating component carriers (CCs) having a bandwidth of 20 MHz for use. A frequency band available as a CC must adopt the technology of such CA. Thus, a frequency band available for wireless communication of a cellular system is required.

For example, in Patent Literature 1 technology which enables a registered frequency band available for a registered provider and an unlicensed band available when a predetermined condition is satisfied to be used in addition to a dedicated frequency band allocated to each provider for exclusive use is disclosed.

CITATION LIST

Patent Literature

Patent Literature 1: JP 2006-094001A

SUMMARY OF INVENTION

Technical Problem

However, for example, when a frequency band to be used in other wireless communication (for example, wireless communication of a wireless local area network (LAN)) is also used in wireless communication of a cellular system, a variety of undesired results can be caused. That is, when a frequency band is shared between wireless communication of the cellular system and other wireless communication, a variety of undesired results can be caused.

As an example, the number of opportunities to use the above-mentioned frequency band in the above-mentioned other wireless communication is significantly reduced when the above-mentioned frequency band is excessively used in the wireless communication of the above-mentioned cellular system. Thus, the sharing of the above-mentioned frequency band can be a disadvantage for the above-mentioned other wireless communication.

As another example, a device of the above-mentioned cellular system can or cannot secure the above-mentioned frequency band for wireless communication of the above-mentioned cellular system. Thus, starting to use the above-mentioned frequency band in wireless communication of the above-mentioned cellular system can be time-consuming.

As still another example, there is a possibility of interference occurring between wireless communication of the above-mentioned cellular system and the above-mentioned other wireless communication in the above-mentioned frequency band when the above-mentioned frequency band is used in the above-mentioned cellular system. Thus, communication quality of the wireless communication of the above-mentioned cellular system and/or the above-mentioned other wireless communication can deteriorate.

Therefore, it is desirable to provide a mechanism which enables a frequency band shared between wireless communication of a cellular system and other wireless communication to be more appropriately used in the cellular system.

Solution to Problem

According to the present disclosure, there is provided a device including: a control unit configured to occupy a frequency band shared between wireless communication of a cellular system and other wireless communication for the wireless communication of the cellular system during a first period and release the frequency band from the wireless communication of the cellular system during at least a second period corresponding to the first period.

According to the present disclosure, there is provided a method including: occupying, by a processor, a frequency band shared between wireless communication of a cellular system and other wireless communication for the wireless communication of the cellular system during a first period and releasing the frequency band from the wireless communication of the cellular system during at least a second period corresponding to the first period.

Advantageous Effects of Invention

According to the above-described present disclosure, a frequency band shared between wireless communication of a cellular system and other wireless communication can be more appropriately used in the cellular system. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 24 is an explanatory diagram illustrating an example of a resource element (RE) in which a dummy signal is transmitted among some RBs.

FIG. 25 is an explanatory diagram illustrating an example of some REs in which a dummy signal is transmitted in each RB.

DESCRIPTION OF EMBODIMENT(S)

Figure 1:
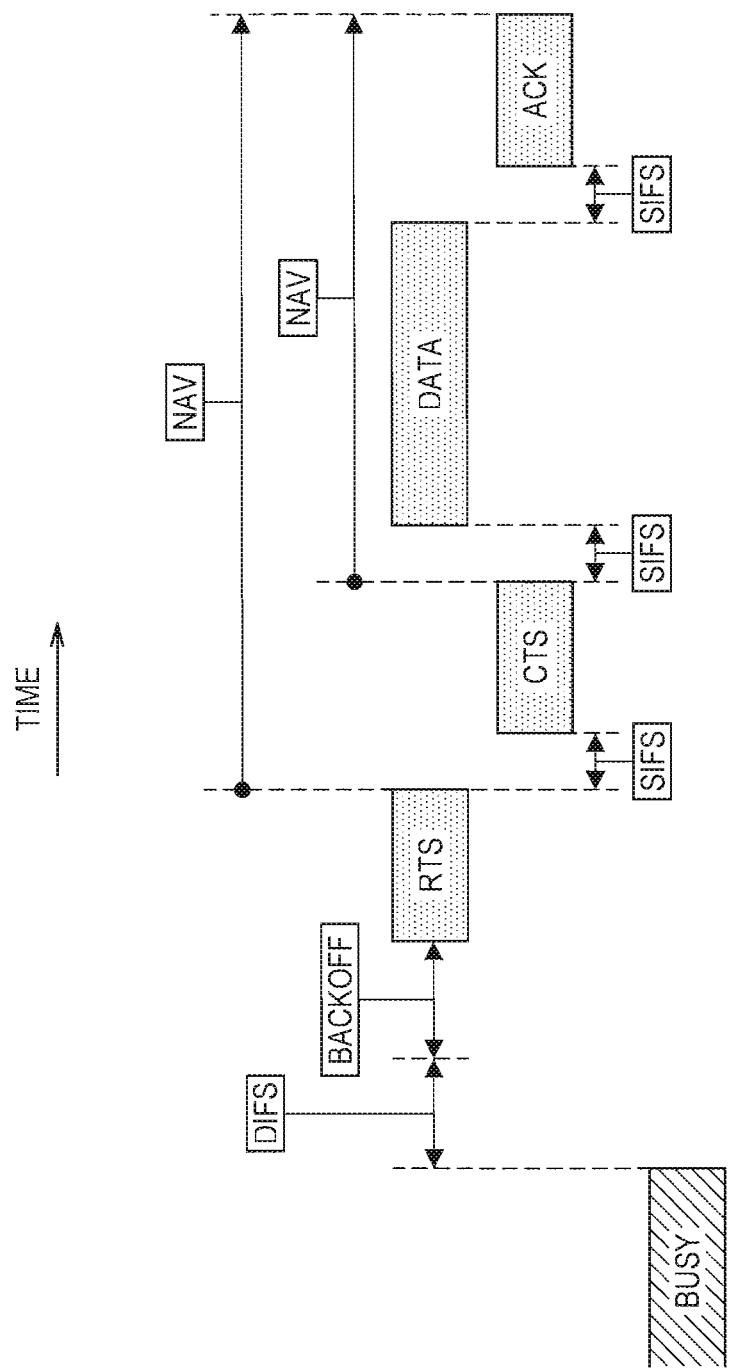
FIG. 1 is an explanatory diagram illustrating a frame format of Institute of Electrical and Electronics Engineers (IEEE) 802.11.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Also, the description will be given in the following order.
1. Introduction
2. Schematic configuration of system
3. First embodiment
  3.1. Summary
  3.2. Configuration of base station
  3.3. Configuration of terminal device
  3.4. Flow of process
  3.5. Modified example
4. Second embodiment
  4.1. Summary
  4.2. Configuration of base station
  4.3. Configuration of terminal device
  4.4. Flow of process
  4.5. First modified example
  4.6. Second modified example
  4.7. Combination of second embodiment and first embodiment
5. Third embodiment
  5.1. Summary
  5.2. Configuration of base station
  5.3. Configuration of terminal device
  5.4. Flow of process
  5.5. Modified example
  5.6. Combination of third embodiment and first embodiment/second embodiment
6. Application example
  6.1. Application example related to base station
  6.2. Application example related to terminal device
7. Conclusion <<1. Introduction>>

Figure 2:
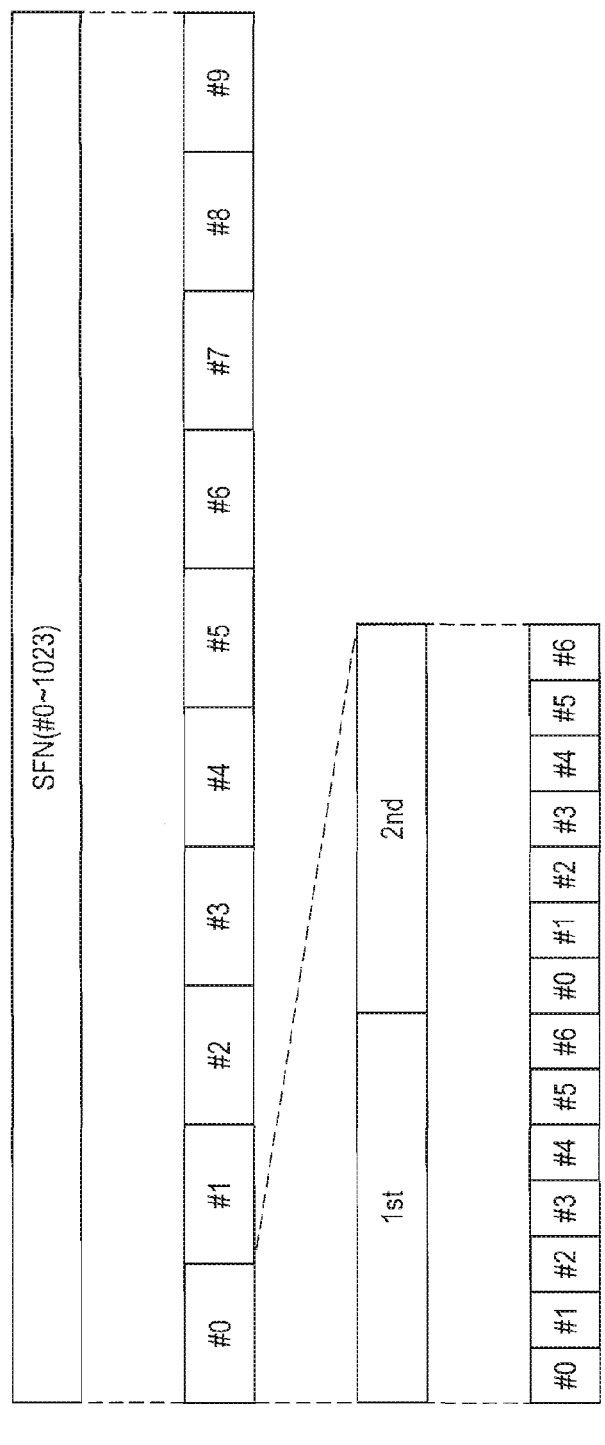
FIG. 2 is an explanatory diagram illustrating a frame format of long-term evolution (LTE).

First, sharing of a frequency band, technology of wireless communication conforming to a wireless local area network (LAN) standard, and technology of wireless communication of a cellular system will be described with reference to FIGS. 1 and 2.

(Sharing of Frequency Band)

A frequency band available for the wireless communication of the cellular system is required. For example, a band of 5 GHz is considered as a frequency band for use in wireless communication of the cellular system (hereinafter referred to as "cellular communication").

However, the band of 5 GHz is used in wireless communication conforming to the wireless LAN standard (hereinafter referred to as "wireless LAN communication"). Thus, when the cellular system uses the band of 5 GHz, for example, the band of 5 GHz is shared between cellular communication and wireless LAN communication. Specifically, for example, a frequency band of 5 GHz (for example, a channel of a wireless LAN) is used in the wireless LAN communication at a certain time and used in the cellular communication at another time. Thereby, frequency utilization efficiency of the band of 5 GHz is improved. Also, the wireless LAN standard includes Institute of Electrical and Electronics Engineers (IEEE) 802.11a, 11b, 11g, 11n, 11ac, and 11ad, etc. and these standards are characterized in that IEEE 802.11 is adopted for a media access control (MAC) layer.

Devices for performing wireless LAN communication are already widespread in the world. Thus, from the viewpoint of backward compatibility, a mechanism for sharing a frequency band between cellular communication and wireless LAN communication without changing an operation of the device for performing the wireless LAN communication is considered as the technology of Long Term Evolution (LTE) and is desired to be defined as a new standard of LTE. Also, a terminal device conforming to the above-mentioned new standard uses the shared frequency band, but a terminal device which does not conform to the above-mentioned new standard is considered as a terminal device not using the shared frequency band.

In LTE, LTE-Advanced, or a cellular system conforming to a communication standard equivalent thereto, the shared frequency band will be used as, for example, a component carrier (CC). Further, it is assumed that the frequency band of the cellular system is used as a primary component carrier (PCC) and the shared frequency band is used as a secondary component carrier (SCC). Also, a control signal and a data signal can be transmitted and received using a frequency band of the cellular system and the data signal can be transmitted and received using the shared frequency band.

(Technology of Wireless Communication Conforming to Wireless LAN Standard)

A frame format of IEEE 802.11 will be described as the technology of wireless communication conforming to the wireless LAN standard with reference to FIG. 1. FIG. 1 is an explanatory diagram illustrating a frame format of IEEE 802.11.

In IEEE 802.11, a DATA frame and an acknowledgement (ACK) frame are basic frames. When the DATA frame is correctly received, the ACK frame is a frame which causes a transmitting side to know the success of reception of the DATA frame. Although wireless LAN communication can be performed only by the DATA frame and the ACK frame, two frames such as a request to send (RTS) frame and a clear to send (CTS) frame are generally further used.

Before the RTS frame is transmitted, each terminal device which performs the wireless LAN communication confirms that no signal is transmitted during a period referred to as a distributed coordination function (DCF) inter-frame space (DIFS). This is referred to as carrier sense. When terminal devices simultaneously start to transmit signals at a point in time at which the NTS has elapsed, the signals may collide with each other. Thus, each terminal device waits for a backoff time randomly set for each terminal device and transmits a signal if no signal is transmitted for the backoff time.

Basically, the terminal device cannot transmit the signal while any signal is detected. However, because there is a hidden terminal problem, an RTS frame and a CTS frame including a duration field for setting a value referred to as a network allocation vector (NAV) are added. The NAV is set on the basis of a value included in the duration field. The terminal device setting the NAV avoids transmitting a signal during a period of the NAV.

First, a first terminal device for transmitting the DATA frame transmits the RTS frame. Then, another terminal device located around the first terminal device receives the RTS frame and acquires a value included in the duration field in the RTS frame. The other terminal device sets, for example, its own NAV to the above-mentioned acquired value and avoids transmitting a signal during the period of the NAV. For example, the period of the NAV is a period from the end of the RTS frame to the end of the ACK frame.

Also, a second terminal device for receiving the DATA frame transmits the CTS frame after only a short inter-frame space (SIFS) from the end of the RTS frame according to the reception of the RTS frame. Then, another terminal device located around the above-mentioned second terminal device receives the CTS frame and acquires a value included in the duration field in the CTS frame. The other terminal device sets, for example, its own NAV to the above-mentioned acquired value and avoids transmitting a signal during the period of the NAV. The period of the NAV is a period from the end of the CTS frame to the end of the ACK frame. Thereby, for example, it is possible to prevent the other terminal device (that is, a hidden terminal for the above-mentioned first terminal device) close to the above-mentioned second terminal device without being close to the above-mentioned first terminal device from transmitting a signal during communication of the above-mentioned first terminal device and the above-mentioned second terminal device.

Also, the RTS frame includes a frame control field, a reception address field, a transmission address field, and a frame check sequence (FCS) in addition to the duration field. Also, the CTS frame includes a frame control field, a reception address field, and an FCS in addition to the duration field.

Also, the DIFS and the SIFS in the standard of the IEEE 802.11 series have, for example, the following lengths.

TABLE 1

|  | 802.11b | 802.11g | 802.11a | 802.11n | 802.11ac |
| --- | --- | --- | --- | --- | --- |
| SIFS | 10 us | 10 us | 16 us | 16 us | 16 us |
| DIFS | 50 us | 28 us | 34 us | 34 us | 34 us |

(Technology of Wireless Communication of Cellular System)

(a) Frame Format

The frame format of LTE will be described with reference to FIG. 2. FIG. 2 is an explanatory diagram illustrating the frame format of LTE.

First, a unit of time such as a radio frame is used in LTE. One radio frame is 10 ms. Each radio frame is identified by a system frame number (SFN) which is any one of 0 to 1023.

The radio frame includes 10 sub-frames identified by #0 to #9, Each sub-frame is 1 ms, Further, each sub-frame includes two slots and each slot includes, for example, seven orthogonal frequency division multiplexing (OFDM) symbols. That is, each sub-frame includes 14 OFDM symbols. Also, the frame format illustrated in FIG. 2 is a frame format of a downlink and the frame format of an uplink includes a single carrier frequency division multiple access (SC-FDMA) symbol in place of an OFDM symbol.

(b) Carrier Aggregation

Component Carriers

With carrier aggregation in Release 10, up to a maximum of five CCs are aggregated for use by user equipment (UE). Each CC is a band with a maximum width of 20 MHz. Carrier aggregation includes a case in which successive CCs in the frequency direction are used, and a case in which separated CCs in the frequency direction are used. With carrier aggregation, the CCs to be used may be set for each UE.

PCC and SCC

In carrier aggregation, one of the multiple CCs used by a UE is a special CC. This special CC is called the primary component carrier (PCC). Also, the remaining CCs among the multiple CCs are called secondary component carriers (SCCs). The PCC may be different depending on the UE.

Since the PCC is the most important CC among the multiple CCs, it is desirable for the PCC to be the CC with the most stable communication quality. Note that in actual practice, which CC to treat as the PCC depends on the implementation.

The SCC is added to the PCC. In addition, an existing SCC that has been added may also be removed. Note that changing an SCC is conducted by removing an existing SCC and adding a new SCC.

PCC Determination Method and Changing Method

When a UE connection is initially established and the status of the UE goes from Radio Resource Control (RRC) Idle to RRC Connected, the CC that the UE used during the establishment of the connection becomes the PCC for that UE. More specifically, a connection is established through a connection establishment procedure. At this point, the status of the UE goes from RRC Idle to RRC Connected. Also, the CC used in the procedure becomes the PCC for the above UE. Note that the above procedure is a procedure initiated from the UE side.

Additionally, PCC changing is conducted by a handover between frequencies. More specifically, if a handover is specified in a connection reconfiguration procedure, a PCC handover is conducted, and the PCC is changed. Note that the above procedure is a procedure initiated from the network side.

Adding SCC

As discussed above, the SCC is added to the PCC. As a result, the SCC is associated with the PCC. In other words, the SCC is subordinate to the PCC. SSC addition may be conducted through a connection reconfiguration procedure. Note that this procedure is a procedure initiated from the network side.

Removing SSC

As discussed above, an SCC may be removed. SSC removal may be conducted through a connection reconfiguration procedure. Specifically, a specific SCC specified in a message is removed. Note that the above procedure is a procedure initiated from the network side.

In addition, the removal of all SCCs may be conducted through a connection re-establishment procedure.

Special Role of PCC

The connection establishment procedure, the transmitting and receiving of non-access stratum (NAS) signaling, and the transmitting and receiving of uplink control signals on the physical uplink control channel (PUCCH) are conducted only by the PCC, and not by the SCCs.

In addition, the detection of a radio link failure (RLF) and a subsequent connection re-establishment procedure are also conducted only by the PCC, and not by the SCCs.

(Conditions of Backhauling for Carrier Aggregation)

For example, an ACK of a downlink signal on an SCC is transmitted by the PUCCH of the PCC. Since the ACK is used for the retransmission of data by the evolved Node B (eNB), a delay of the ACK is not acceptable. Consequently, when a first eNB using a CC that acts as the PCC for a UE is different from a second eNB using a CC that acts as an SCC for the UE, a backhaul delay of approximately 10 ms between the first eNB and the second eNB is desirable.

<<2. Schematic Configuration of Cellular System>>

Figure 3:
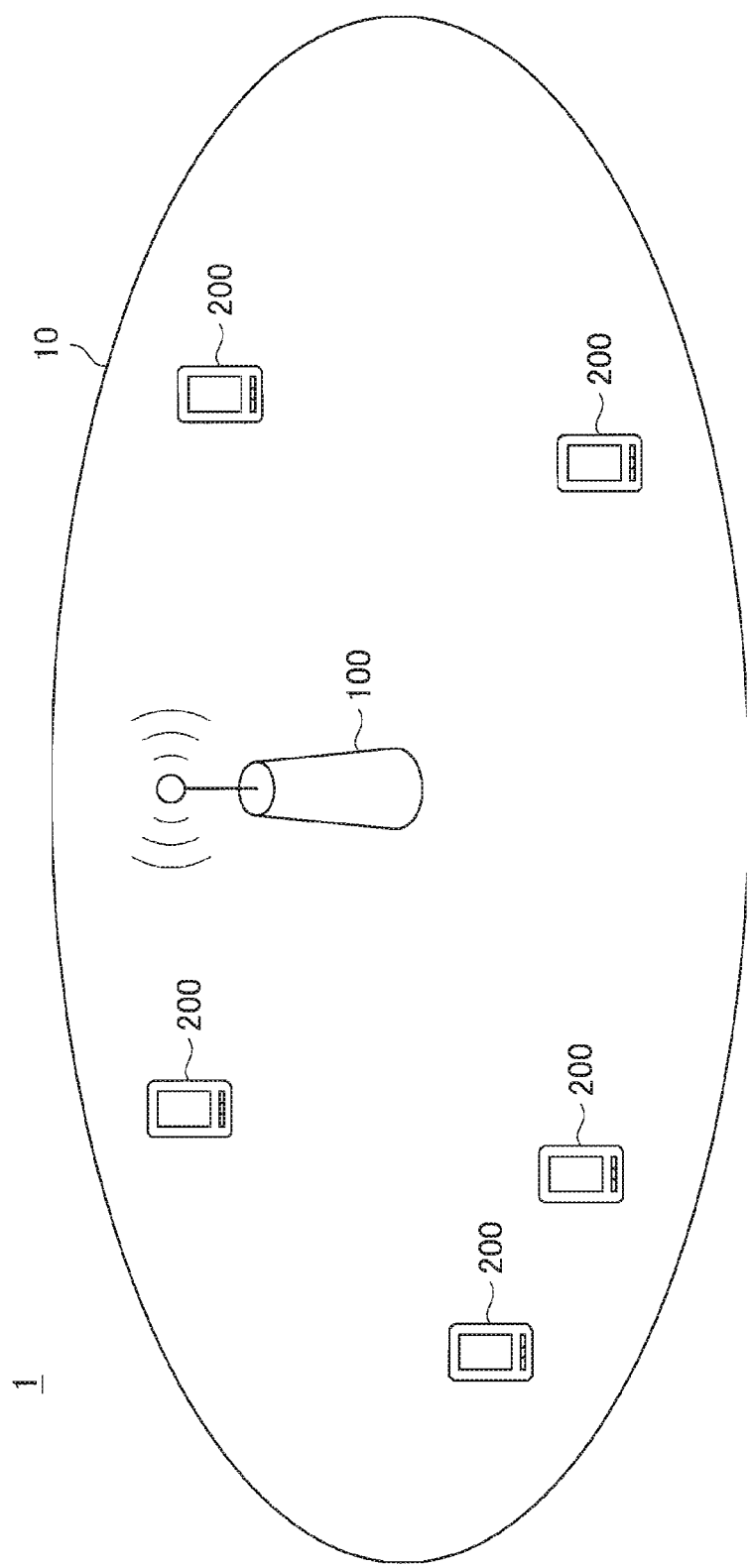
FIG. 3 is an explanatory diagram illustrating an example of a schematic configuration of a cellular system according to an embodiment of the present disclosure.

Next, a schematic configuration of a cellular system 1 according to an embodiment of the present disclosure will be described with reference to FIGS. 3 to 5. FIG. 3 is an explanatory diagram illustrating an example of the schematic configuration of the cellular system 1 according to the embodiment of the present disclosure. Referring to FIG. 3, the system 1 includes a base station 100 and a terminal device 200. The cellular system 1 is, for example, LTE, LTE-Advanced, or a system conforming to a communication standard equivalent thereto.

(Base Station 100)

The base station 100 performs wireless communication (cellular communication) of the cellular system 1. That is, the base station 100 performs wireless communication with the terminal device 200. For example, the base station 100 performs wireless communication with the terminal device 200 located within a cell 10 which is a communication area of the base station 100. Specifically, for example, the base station 100 transmits a downlink signal to the terminal device 200 and receives an uplink signal from the terminal device 200.

As an example, the base station 100 is a small base station and the cell 10 is a small cell. As another example, the base station 100 may be a macro base station and the cell 10 may be a macro cell.

(Terminal Device 200)

The terminal device 200 performs wireless communication (cellular communication) of the cellular system.

For example, the terminal device 200 performs wireless communication with the base station 100. For example, when the terminal device 200 is located within the cell 10 of the base station 100, the terminal device 200 performs wireless communication with the base station 100. Specifically, for example, the terminal device 200 receives the downlink signal from the base station 100 and transmits the uplink signal to the base station 100.

Also, the terminal device 200 can perform wireless communication with another terminal device (for example, another terminal device 200 or the like). For example, the terminal device 200 can perform device-to-device (D2D) communication. Also, the terminal device 200 can perform wireless communication within a localized network (LN) formed by the terminal device.

Also, the terminal device 200 may perform other wireless communication. For example, the terminal device 200 may perform wireless communication (wireless LAN communication) conforming to the wireless LAN standard.

(Frequency Band to be Used)

In wireless communication (that is, cellular communication) of the cellular system 1, the frequency band of the cellular system 1 is used. The frequency band is, for example, a band allocated to a provider of the cellular system 1, and can be referred to as a licensed band.

In particular, in the embodiment of the present disclosure, a frequency band to be used in other wireless communication is also used in the cellular communication. That is, a frequency band shared between the cellular communication and the above-mentioned other wireless communication (hereinafter referred to as a "shared band") is also used in the cellular communication. The above-mentioned other wireless communication is, for example, wireless communication conforming to a wireless LAN standard (that is, wireless LAN communication). Also, the above-mentioned shared band is, for example, a channel of a wireless LAN. As an example, the above-mentioned shared band is a channel of 20 MHz.

(Other Wireless Communication)

A communication area of the above-mentioned other wireless communication may be located within the cell 10. That is, the cell 10 can overlap a communication area of the above-mentioned other wireless communication.

For example, the other wireless communication is wireless LAN communication and a communication area of the wireless LAN can be located within the cell 10. That is, the cell 10 can overlap the communication area of the wireless LAN. Hereinafter, in this regard, a specific example will be described with reference to FIGS. 4 and 5.

Figure 4:
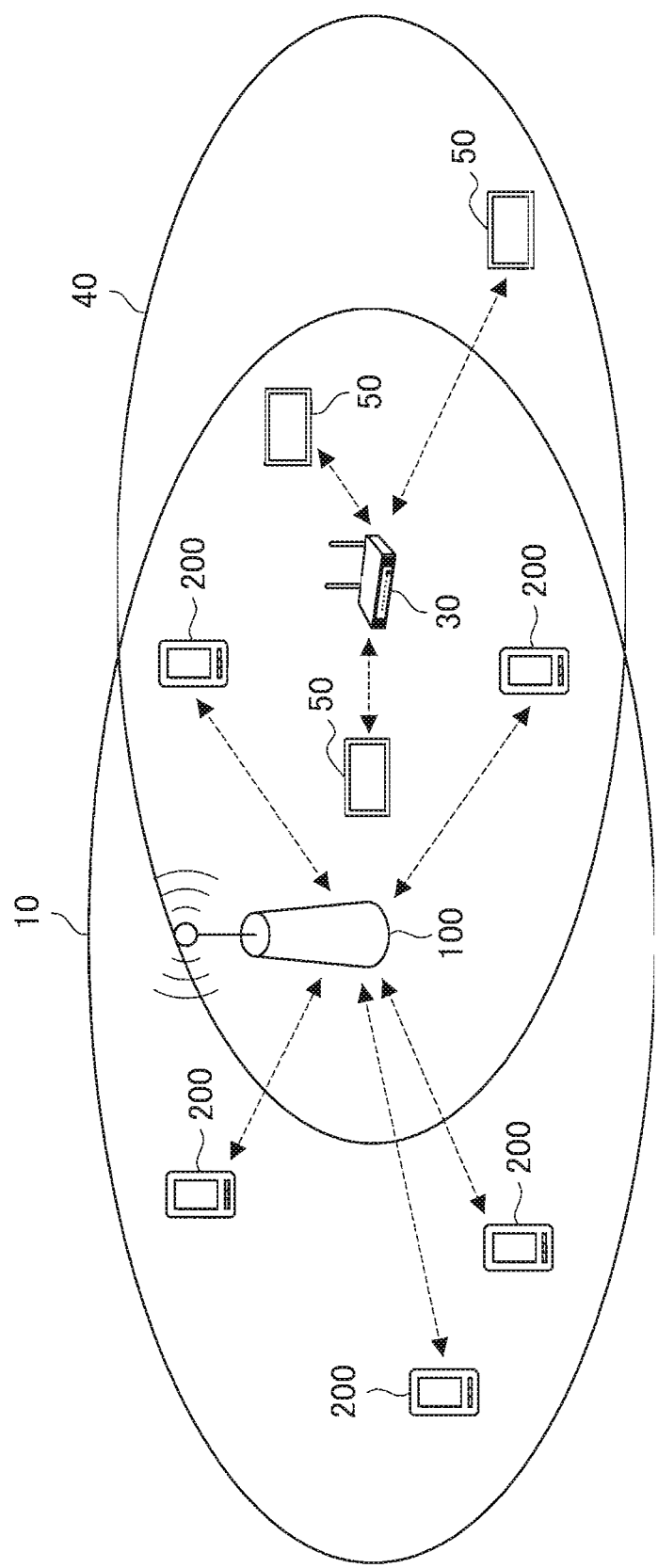
FIG. 4 is an explanatory diagram illustrating an example of a communication area of a wireless local area network (LAN) overlapping a small cell.

FIG. 4 is an explanatory diagram illustrating an example of a communication area of a wireless LAN overlapping a small cell. Referring to FIG. 4, the base station 100 which is a small base station and the terminal device 200 are illustrated. Further, an access point 30 of a wireless LAN and a terminal device 50 for performing wireless LAN communication are located around the base station 100 and the terminal device 200. A communication area 40 of the access point 30 overlaps the cell 10 which is a small cell.

Figure 5:
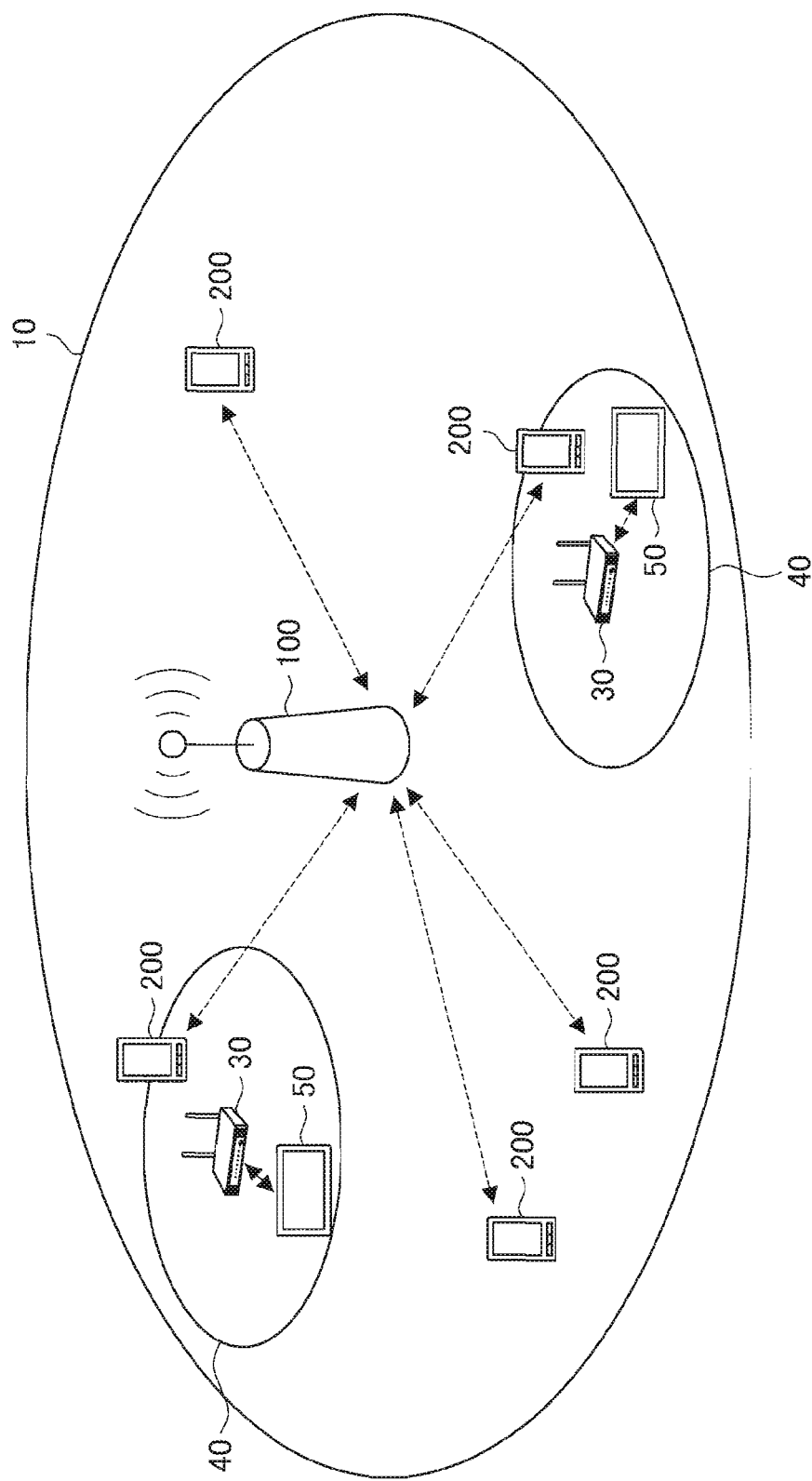
FIG. 5 is an explanatory diagram illustrating an example of a communication area of a wireless LAN overlapping a macro cell.

FIG. 5 is an explanatory diagram illustrating an example of a communication area of a wireless LAN overlapping a macro cell. Referring to FIG. 5, the base station 100 which is a macro base station and the terminal device 200 are illustrated. Further, the access point 30 of a wireless LAN and the terminal device 50 for performing wireless LAN communication are located around the base station 100 and the terminal device 200. The communication area 40 of the access point 30 overlaps the cell 10 which is a macro cell.

Also, the wireless LAN communication can include wireless communication conforming to a wireless LAN standard between terminal devices which perform the wireless LAN communication in addition to wireless communication between the wireless LAN access point and the terminal device (which perform wireless LAN communication). As an example, the wireless LAN communication can also include wireless communication according to Wi-Fi Direct.

The cellular system 1 according to the embodiment of the present disclosure has been described above. Also, the cellular system 1 can include a plurality of base stations 100 as well as one base station 100. Also, the cellular system 1 can include another device in addition to the base station 100 and the terminal device 200. For example, the cellular system 1 can include core network nodes (for example, a mobility management entity (MME), a serving gateway (S-GW), and a packet data network gateway (P-GW), etc.).

<<3. First Embodiment>>

Next, the first embodiment of the present disclosure will be described with reference to FIGS. 6 to 15.

<3.1. Summary>

First, the summary of the first embodiment will be described.

Problems Related to First Embodiment

When a frequency band is shared between the wireless communication of the cellular system (that is, cellular communication) and the other wireless communication (for example, wireless LAN communication), the number of opportunities to use the above-mentioned frequency band in the above-mentioned other wireless communication is significantly reduced if the frequency band is excessively used in the cellular communication. This becomes a disadvantage for a device which performs the above-mentioned other wireless communication. Thus, when the above-mentioned frequency band is shared, it is desirable to secure an opportunity to use the above-mentioned frequency band in the above-mentioned other wireless communication. For example, it is desirable that an opportunity to use the above-mentioned frequency band be fairly given to the cellular system and the device for performing other wireless communication. For example, because radio resources are fairly used between devices on the basis of a carrier sense multiple access with collision avoidance (CSMA/CA) in the wireless LAN communication, it is important to secure fairness when the above-mentioned other wireless communication is wireless LAN communication.

Also, wireless communication is performed using a relatively long radio frame of 10 ms as a unit in the cellular system. Also, in the cellular system, the terminal device can transmit and receive data using the above-mentioned frequency band by achieving synchronization according to a synchronization signal transmitted in a radio frame in a frequency band, acquiring system information, and performing a series of connection establishment procedures. In consideration of this regard, it is desirable to continuously use the frequency band shared between the cellular communication and the other wireless communication for a certain amount of time for the cellular communication.

Therefore, it is desirable to provide a mechanism which enables the frequency band shared between the cellular communication and the other wireless communication to be more appropriately used in the cellular system. More specifically, it is desirable to provide a mechanism capable of securing an opportunity to use the frequency band shared between the cellular communication and the other wireless communication in the above-mentioned other wireless communication and continuously using the frequency band for a certain amount of time for the cellular communication.

Characteristics of First Embodiment

According to the first embodiment, the frequency band shared between the cellular communication and the other wireless communication is occupied for the above-mentioned cellular communication during a first period and released from the above-mentioned cellular communication during at least a second period corresponding to the above-mentioned first period.

Thereby, for example, it is possible to secure an opportunity to use the frequency band shared between the cellular communication and the other wireless communication in the above-mentioned other wireless communication and continuously use the frequency band for a certain amount of time for the cellular communication.

<3.2. Configuration of Base Station>

Figure 6:
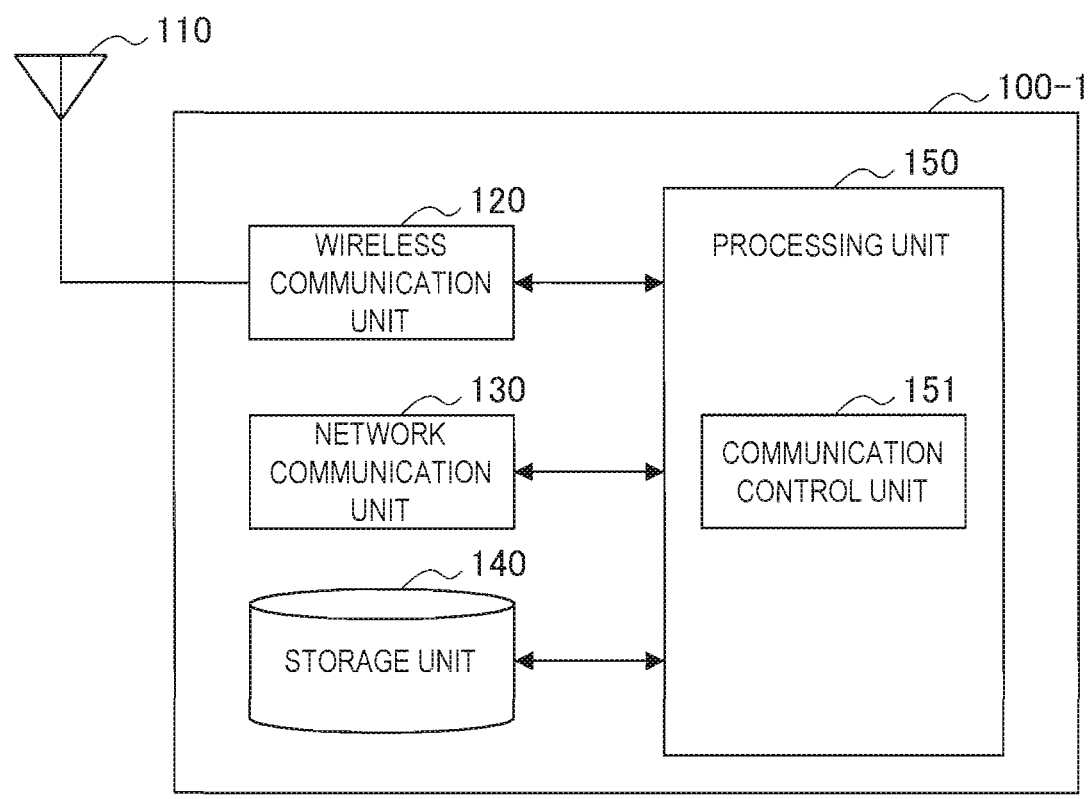
FIG. 6 is a block diagram illustrating an example of a configuration of a base station according to a first embodiment.

Next, an example of the configuration of a base station 100-1 according to the first embodiment will be described with reference to FIGS. 6 to 10. FIG. 6 is a block diagram illustrating an example of the configuration of the base station 100-1 according to the first embodiment. Referring to FIG. 6, the base station 100-1 is equipped with an antenna unit 110, a wireless communication unit 120, a network communication unit 130, a storage unit 140, and a processing unit 150.

(Antenna Unit 110)

The antenna unit 110 emits a signal output by the wireless communication unit 120 into space as a radio wave. Additionally, the antenna unit 110 converts a radio wave from space into a signal, and outputs the signal to the wireless communication unit 120.

(Wireless Communication Unit 120)

The wireless communication unit 120 transmits and receives signals. For example, the wireless communication unit 120 transmits a downlink signal to a terminal device 200-1 positioned within the cell 10, and receives an uplink signal from the terminal device 200-1 positioned within the cell 10.

For example, the wireless communication unit 120 transmits and receives a signal using the frequency band of the cellular system 1. Also, particularly, in the embodiment of the present disclosure, the wireless communication unit 120 transmits and receives a signal using the frequency band shared between the cellular communication and the other wireless communication (for example, wireless LAN communication) (that is, a shared band).

(Network Communication Unit 130) The network communication unit 130 communicates with other nodes. For example, the network communication unit 130 communicates with core network nodes (for example, MME, S-GA, P-GW, etc.). Also, the network communication unit 130 communicates with another base station 100-1.

(Storage Unit 140)

The storage unit 140 temporarily or permanently stores programs and data for the operation of the base station 100-1.

(Processing Unit 150)

The processing unit 150 provides various functions of the base station 100-1. The processing unit 150 includes a communication control unit 151. Also, the processing unit 150 can further include another component in addition to the communication control unit 151.

(Communication Control Unit 151)

The communication control unit 151 occupies the shared band (that is, the frequency band shared between the cellular communication and the other wireless communication) for the above-mentioned cellular communication during the first period, and releases the above-mentioned shared band from the above-mentioned cellular communication during the second period corresponding to the above-mentioned first period.

(a) Other Wireless Communication

For example, the above-mentioned other wireless communication is wireless communication conforming to the wireless LAN standard (that is, wireless LAN communication). In this case, the above-mentioned shared band is shared between the cellular communication and the wireless LAN communication. The above-mentioned shared band is, for example, a channel of a wireless LAN. As an example, the shared band is the channel of 20 MHz.

(b) Occupancy of Shared Band

Occupancy by Transmission of Signal for First Period

For example, the communication control unit 151 occupies the above-mentioned shared band for the above-mentioned cellular communication during the above-mentioned first period by controlling the wireless communication device for performing wireless communication (cellular communication) of the cellular system 1 so that the above-mentioned wireless communication device transmits a signal using the above-mentioned shared band during the above-mentioned first period.

For example, the above-mentioned wireless communication device is the base station 100-1, and the communication control unit 151 controls the base station 100-1 so that the base station 100-1 transmits a signal using the above-mentioned shared band during the above-mentioned first period. More specifically, for example, the communication control unit 151 allocates a radio resource of the above-mentioned shared band to any signal during the above-mentioned first period. Also, for example, the communication control unit 151 maps the signal to the radio resource of the above-mentioned shared band during the above-mentioned first period.

Also, the above-mentioned wireless communication device may be the terminal device 200-1 and the communication control unit 151 may control the terminal device 200-1 so that the terminal device 200-1 transmits a signal using the shared band during the above-mentioned first period. More specifically, for example, the communication control unit 151 may instruct the terminal device 200-1 to transmit the signal using the above-mentioned shared band during the above-mentioned first period. For example, this instruction may be performed according to radio resource control (RRC) signaling or system information (SI).

For example, as described above, the wireless communication device (that is, at least one of the base station 100-1 and the terminal device 200-1) is controlled. Also, as a specific technique for transmitting a signal by the wireless communication device, for example, a technique described in a third embodiment can be applied. Also, as the signal transmission technique, a technique described in a second embodiment can also be applied.

As described above, for example, by transmitting the signal using the above-mentioned shared band during the above-mentioned first period, a device for performing the above-mentioned other wireless communication (for example, wireless LAN communication) detects the signal transmitted using the above-mentioned shared band and avoids using the shared band. Thus, the above-mentioned shared band can be occupied for cellular communication.

Occupancy by Transmission of Frame for Setting NAV

The above-mentioned other wireless communication is wireless LAN communication and the communication control unit 151 may occupy the above-mentioned shared band for the above-mentioned cellular communication during the above-mentioned first period by controlling a wireless communication device for performing the cellular communication so that the above-mentioned wireless communication device transmits a frame including duration information for setting the NAV using the above-mentioned shared band.

The above-mentioned wireless communication device ay be at least one of the base station 100-1 and the terminal device 200-1.

Also, the above-mentioned frame may be the RIS frame, the CTS frame, or a frame similar thereto. The above-mentioned duration information may be a value included in the duration field. Also, the above-mentioned wireless communication device may transmit one frame including the duration information for setting the NAV to cover the whole of the above-mentioned first period. Alternatively, the above-mentioned wireless communication device may transmit two or more frames at different timings. Every time each of the above-mentioned two or more frames is transmitted, the NAV of the device for receiving the frame may be updated and the updated NAV may cover the whole of the above-mentioned first period.

Through the transmission of the above-mentioned frame, for example, the device for performing the above-mentioned other wireless communication (for example, wireless LAN communication) sets the NAV and avoids the use of the above-mentioned shared band. Thus, the above-mentioned shared band can be occupied for the cellular communication.

(c) Release of Shared Band

For example, the communication control unit 151 releases the above-mentioned shared band from the above-mentioned cellular communication during at least the above-mentioned second period by controlling a wireless communication device for performing wireless communication (cellular communication) of the cellular system 1 so that the above-mentioned wireless communication device does not transmit a signal using the above-mentioned shared band during at least the above-mentioned second period.

For example, the above-mentioned wireless communication device is the base station 100-1, and the communication control unit 151 controls the base station 100-1 so that the base station 100-1 does not transmit a signal using the above-mentioned shared band during at least the above-mentioned second period. Also, for example, the above-mentioned wireless communication device may be the terminal device 200-1, and the communication control unit 151 controls the terminal device 200-1 so that the terminal device 200-1 does not transmit a signal using the above-mentioned shared band during the above-mentioned second period. More specifically, for example, the communication control unit 151 stops the use of the above-mentioned shared band during at least the above-mentioned second period.

As described above, no signal is transmitted using the above-mentioned shared band during at least the above-mentioned second period, for example, so that a device for performing the above-mentioned other wireless communication (for example, wireless LAN communication) can perform the above-mentioned other wireless communication using the above-mentioned shared band without being affected by the cellular communication. That is, the above-mentioned shared band can be released from the cellular communication.

(d) First Period and Second Period

Lengths of First Period and Second Period

The above-mentioned first period is a period of one or more radio frames of the cellular system 1. That is, the above-mentioned shared band is occupied for cellular communication during the period of one or more radio frames. Thereby, for example, the cellular communication can be enabled using the above-mentioned shared band. Also, the above-mentioned first period can be a period (for example, about 30 sec) which is longer than one radio frame, Also, for example, the above-mentioned second period has a length similar to that of the above-mentioned first period. That is, the above-mentioned shared band is occupied for cellular communication during the first period and released from the cellular communication during at least a period having a length similar to that of the first period. As an example, the above-mentioned second period has a length which is 90% to 110% of the length of the above-mentioned first period. Thereby, for example, fairness between the cellular communication and the other wireless communication (for example, wireless LAN communication) is secured.

Also, the above-mentioned second period may have a length which is a predetermined ratio of the length of the above-mentioned first period. As an example, the above-mentioned second period may have a length which is 150% of the length of the above-mentioned first period. As another example, the above-mentioned second period may have a length which is 60% of the length of the above-mentioned first period.

Also, the lengths of the above-mentioned first period and the above-mentioned second period may be fixed. Alternatively, the lengths of the above-mentioned first period and the above-mentioned second period may be variable, the length of the above-mentioned second period may change according to the length of the above-mentioned first period, or the length of the above-mentioned first period may change according to the length of the above-mentioned second period.

When First Period is Continuous Period

For example, the above-mentioned first period is a continuous period. That is, the above-mentioned shared band is occupied for cellular communication during the continuous first period.

Thereby, for example, it is possible to efficiently use the above-mentioned shared band for the cellular communication. More specifically, for example, operations such as synchronization achievement, acquisition of system information, and a series of connection establishment procedures are necessary in the terminal device to start the use of the above-mentioned shared band. Thus, when the above-mentioned shared band is used for the continuous time, a frequency of the above-mentioned operation is further reduced, and the terminal device 200-1 can efficiently use the above-mentioned shared band.

Also, for example, the above-mentioned second period is a period immediately before or immediately after the above-mentioned first period. Thereby, for example, it is possible to reliably secure an opportunity to use the above-mentioned shared band in the other wireless communication before and after the use of the above-mentioned shared band in the cellular system 1.

First Example

As the first example, the above-mentioned second period is a continuous period immediately after the above-mentioned first period. Hereinafter, in this regard, a specific example will be described with reference to FIG. 7.

Figure 7:
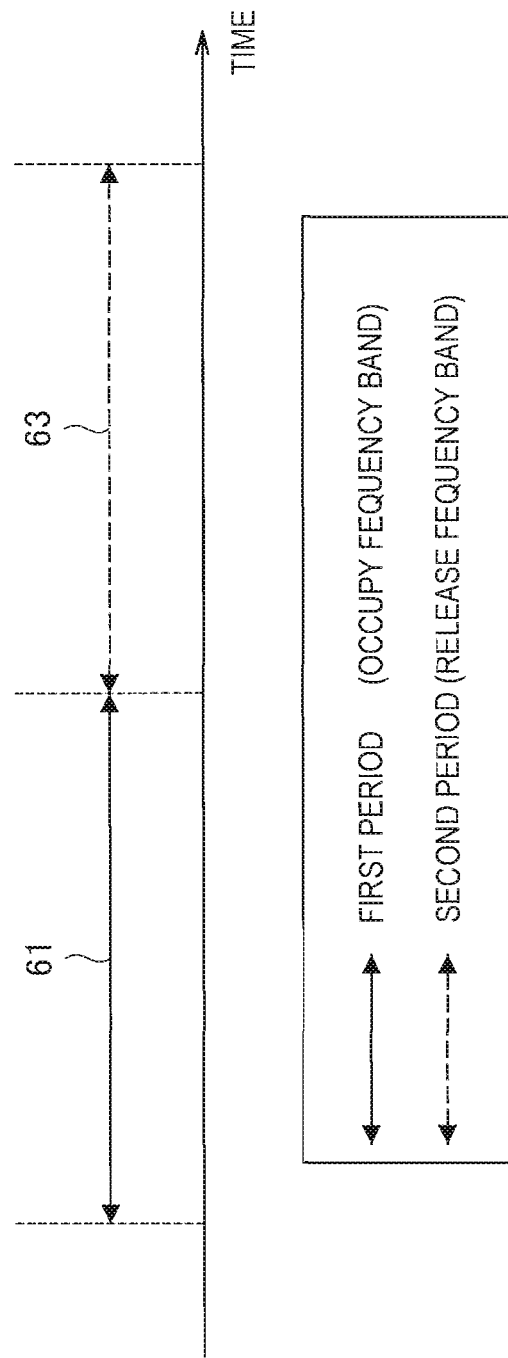
FIG. 7 is an explanatory diagram illustrating a first example of periods of occupancy and release of a shared band.

FIG. 7 is an explanatory diagram illustrating a first example of periods of occupancy and release of a shared band. For example, a first period 61 is a continuous period and a second period 63 is a continuous period immediately after the first period 61. That is, the shared band is occupied for the cellular communication during the continuous first period 61 and then released from the cellular communication during at least the continuous second period.

Thereby, for example, the cellular system 1 can more quickly start the use of the above-mentioned shared band as necessary. Also, the number of opportunities to use the above-mentioned shared band in the above-mentioned other wireless communication can further increase.

Second Example

As the second example, the above-mentioned second period may be a period immediately before the above-mentioned first period and a period immediately after the above-mentioned first period. Hereinafter, in this regard, a specific example will be described with reference to FIG. 8.

Figure 8:
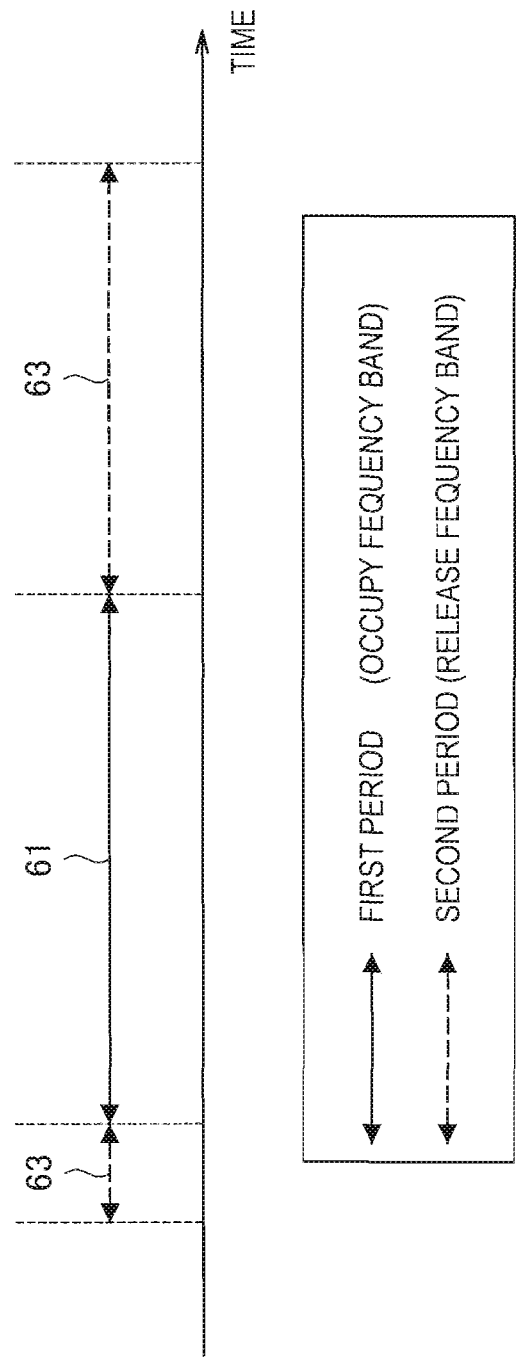
FIG. 8 is an explanatory diagram illustrating a second example of periods of occupancy and release of a shared band.

FIG. 8 is an explanatory diagram illustrating the second example of the occupancy of the shared band and the period of the release. For example, the first period 61 is a continuous period and the second period 63 is a period immediately before the first period 61 and a period immediately after the first period 61. That is, the shared band is occupied for the cellular communication during the continuous first period 61 after being released from the cellular communication during a partial period of the second period 63 and then released from the cellular communication during the remaining period of the second period 63.

Thereby, for example, the cellular system 1 can quickly start the use of the above-mentioned shared band as necessary. Also, a time period in which the above-mentioned frequency band is used for cellular communication can further increase.

Third Example

As the third example, the above-mentioned second period may be a continuous period immediately before the above-mentioned first period. Hereinafter, in this regard, a specific example will be described with reference to FIG. 9.

Figure 9:
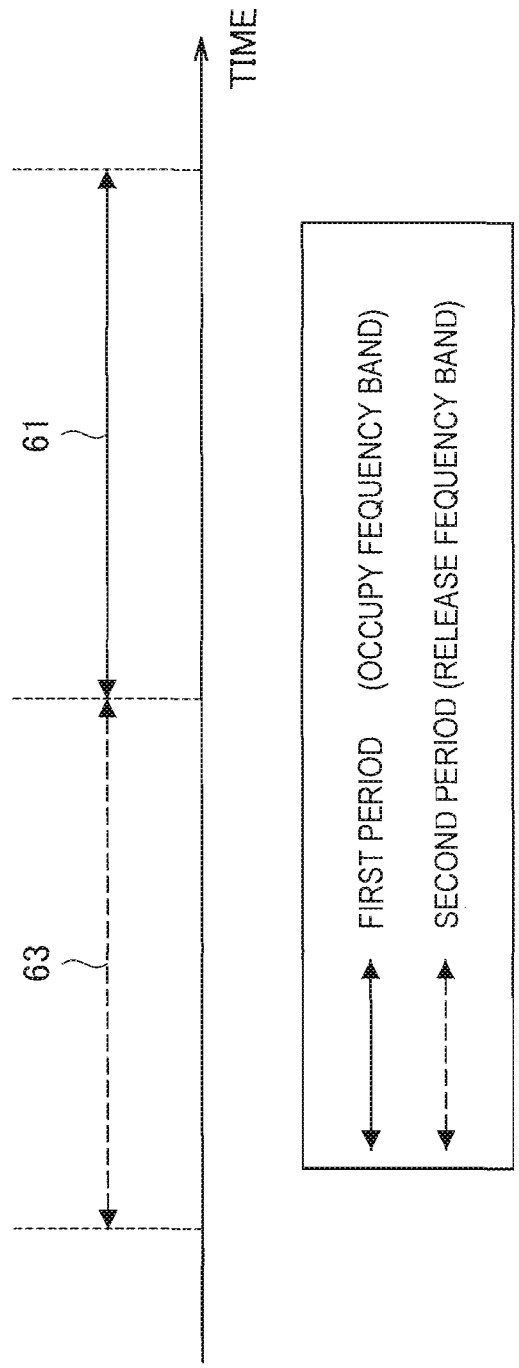
FIG. 9 is an explanatory diagram illustrating a third example of periods of occupancy and release of a shared band.

FIG. 9 is an explanatory diagram illustrating the third example of the occupancy and release of the shared band. For example, the first period 61 is a continuous period and the second period 63 is a period immediately before the first period 61. That is, the shared band is released from the cellular communication during at least the continuous second period and then occupied for the cellular communication during the continuous first period 61.

Thereby, for example, on condition that an opportunity to use the shared band in the above-mentioned wireless communication is secured, the above-mentioned shared band is available for cellular communication. Thus, it is possible to more reliably secure an opportunity to use the above-mentioned shared band in the other wireless communication.

When First Period is Discontinuous Period

The above-mentioned first period may be a discontinuous period. The communication control unit 151 may occupy the shared band for the cellular communication during the above-mentioned first period and release the above-mentioned shared band from the above-mentioned cellular communication during at least the above-mentioned second period, within a third period. Hereinafter, in this regard, a specific example will be described with reference to FIG. 10.

Figure 10:
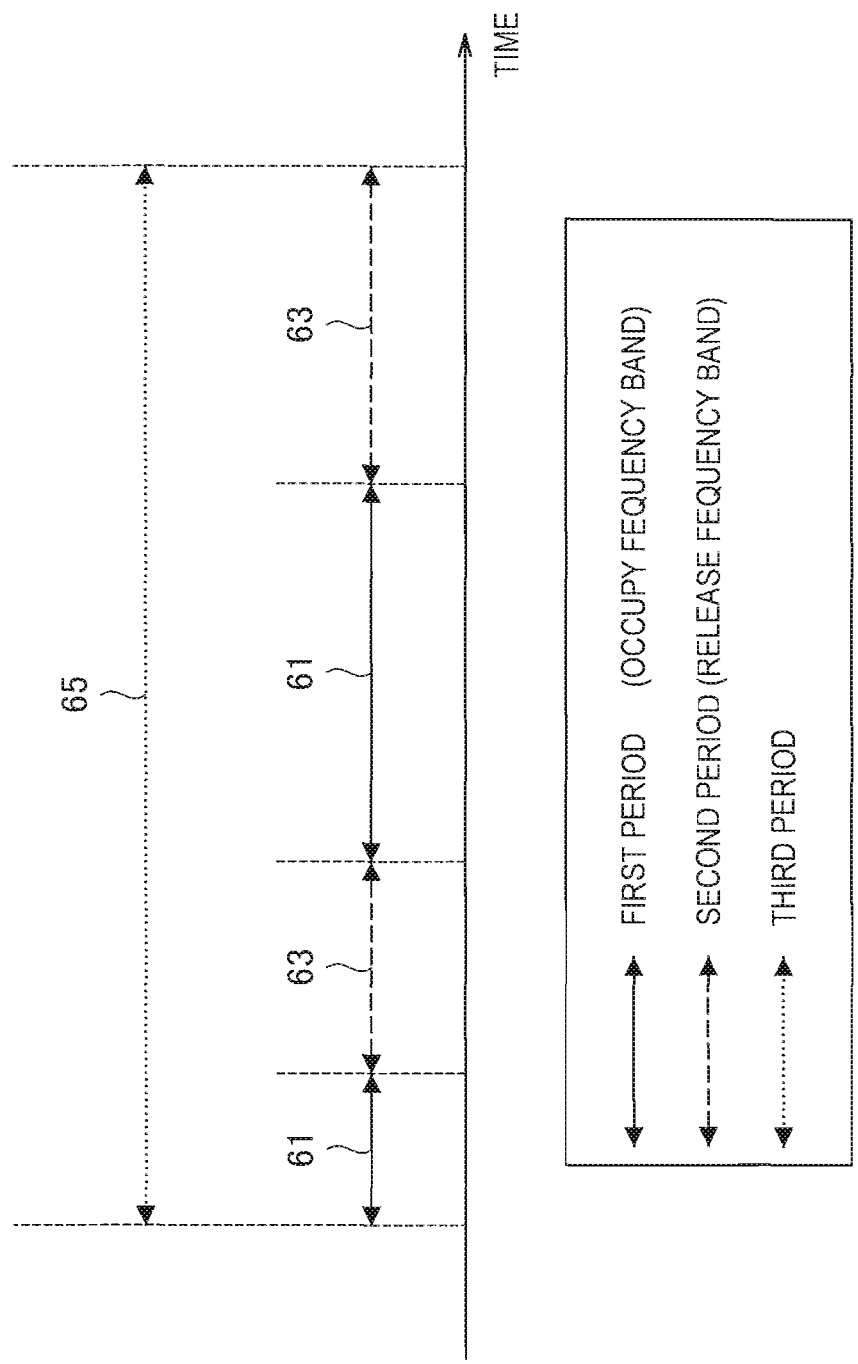
FIG. 10 is an explanatory diagram illustrating a fourth example of periods of occupancy and release of a shared band.

FIG. 10 is an explanatory diagram illustrating a fourth example of the occupancy and release of the shared band. For example, the first period 61 is a discontinuous period and the second period 63 is also a discontinuous period. In a third period 65, the shared band is occupied for the cellular communication during the discontinuous first period 61 and the shared band is released from the cellular communication during the second period 63. As an example, the third period 65 is a period having a fixed length and an upper-limit time in which the shared band available for the cellular communication is defined within the third period 65. When an occupancy period (that is, the first period 61) of the shared band reaches the above-mentioned upper-limit period, the shared band is released from the cellular communication until the third period 65 has elapsed.

Thereby, it is possible to reliably secure an opportunity to use the above-mentioned shared band in the above-mentioned other wireless communication.

As described above, the communication control unit 151 occupies the above-mentioned shared band for the cellular communication during the above-mentioned first period and releases the above-mentioned shared band from the cellular communication during at least the above-mentioned second period. Thereby, it is possible to secure an opportunity to use a frequency band shared between the cellular communication and the other wireless communication (that is, a shared band) in the above-mentioned other wireless communication and continuously use the frequency band for the cellular communication for a certain amount of time.

<3.3. Configuration of Terminal Device>

Figure 11:
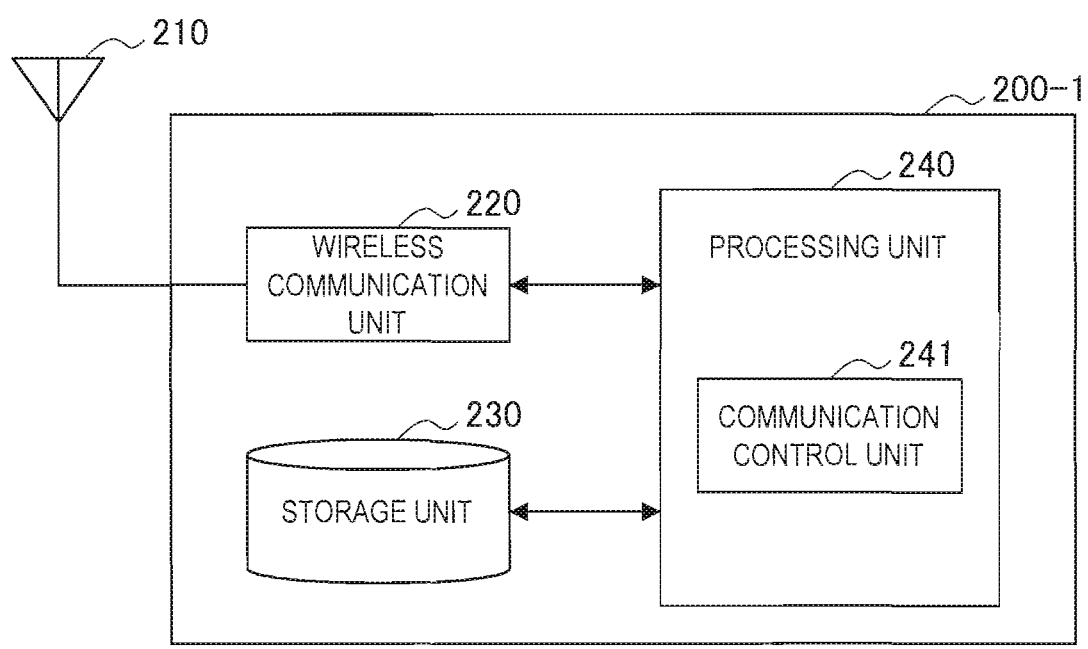
FIG. 11 is a block diagram illustrating an example of a configuration of a terminal device according to the first embodiment.

Next, an example of a configuration of the terminal device 200-1 according to the first embodiment will be described with reference to FIG. 11. FIG. 11 is a block diagram illustrating the example of the configuration of the terminal device 200-1 according to the first embodiment. Referring to FIG. 11, the terminal device 200-1 includes an antenna unit 210, a wireless communication unit 220, a storage unit 230, and a processing unit 240.

(Antenna Unit 210)

The antenna unit 210 emits a signal output by the wireless communication unit 220 into space as a radio wave. Additionally, the antenna unit 210 converts a radio wave from space into a signal, and outputs the signal to the wireless communication unit 220.

(Wireless Communication Unit 220)

The wireless communication unit 220 transmits and receives a signal. For example, the wireless communication unit 220 receives a downlink signal from the base station 100-1 and transmits an uplink signal to the base station 100-1 when the terminal device 200-1 is located within the cell 10.

For example, the wireless communication unit 220 transmits and receives a signal using a frequency band of the cellular system 1. Also, particularly, in the embodiment of the present disclosure, the wireless communication unit 220 transmits and receives a signal using a frequency band shared between cellular communication and other wireless communication (for example, wireless LAN communication) (that is, a shared band).

(Storage Unit 230)

The storage unit 230 temporarily or permanently stores programs and data for the operation of the terminal device 200-1.

(Processing Unit 240)

The processing unit 240 provides various functions of the terminal device 200-1. The processing unit 240 includes a communication control unit 241. Also, the processing unit 240 can further include other components in addition to the communication control unit 241.

(Communication Control Unit 241)

The communication control unit 241 controls the terminal device 200-1.

Particularly, in the first embodiment, the communication control unit 241 may control the terminal device 200 so that the terminal device 200-1 transmits a signal using the above-mentioned shared band during the above-mentioned first period. For example, the communication control unit 241 may control the terminal device 200 so that the terminal device 200-1 transmits a signal using the above-mentioned shared band during the above-mentioned first period according to an instruction of the base station 100-1.

Also, as a specific technique of transmitting a signal, a technique described in the third embodiment may be applied. Also, as the technique of transmitting the signal, the technique described in the second embodiment may also be applied.

<3.4. Flow of Process>

Next, an example of a process according to the first embodiment will be described with reference to FIGS. 12 to 15.

(First Example)

Figure 12:
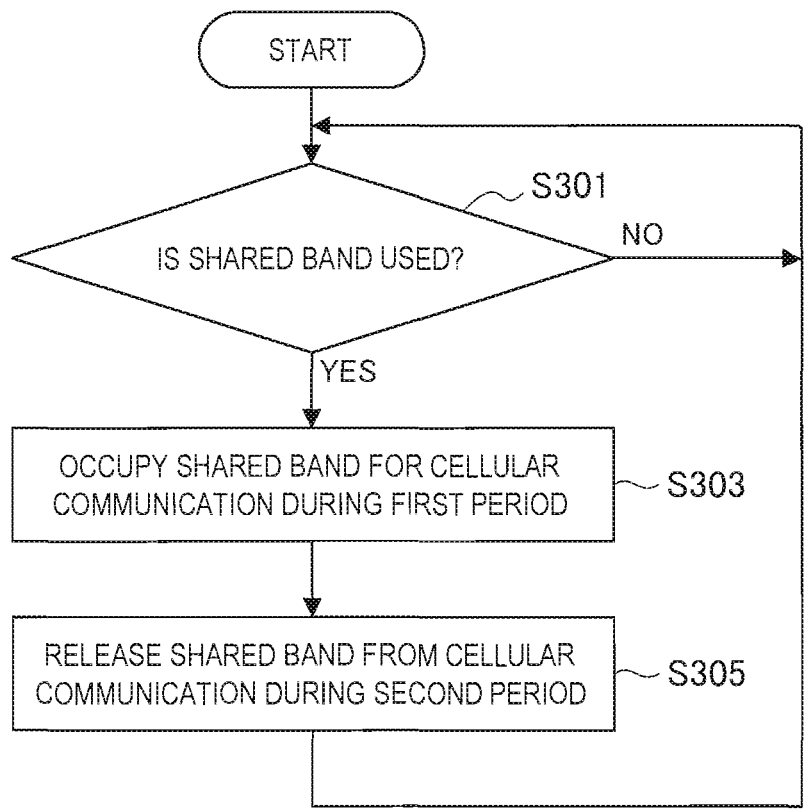
FIG. 12 is a flowchart illustrating a first example of a schematic flow of a process according to the first embodiment.

FIG. 12 is a flowchart illustrating the first example of a schematic flow of the process according to the first embodiment. The process is an example of when the occupancy and release of the shared band as illustrated in FIG. 7 are performed.

The communication control unit 151 determines whether to use the shared band (that is, a frequency band shared between cellular communication and other wireless communication) (S301). When it is determined not to use the above-mentioned shared band (S301: NO), the process returns to step S301.

On the other hand, when it is determined to use the above-mentioned shared band (S301: YES), the communication control unit 151 occupies the above-mentioned shared band for the cellular communication during the first period (S303). In the first period, the cellular communication is performed.

Thereafter, the communication control unit 151 releases the above-mentioned shared band from the cellular communication during the second period (S305). The process returns to step S301.

(Second Example)

Figure 13:
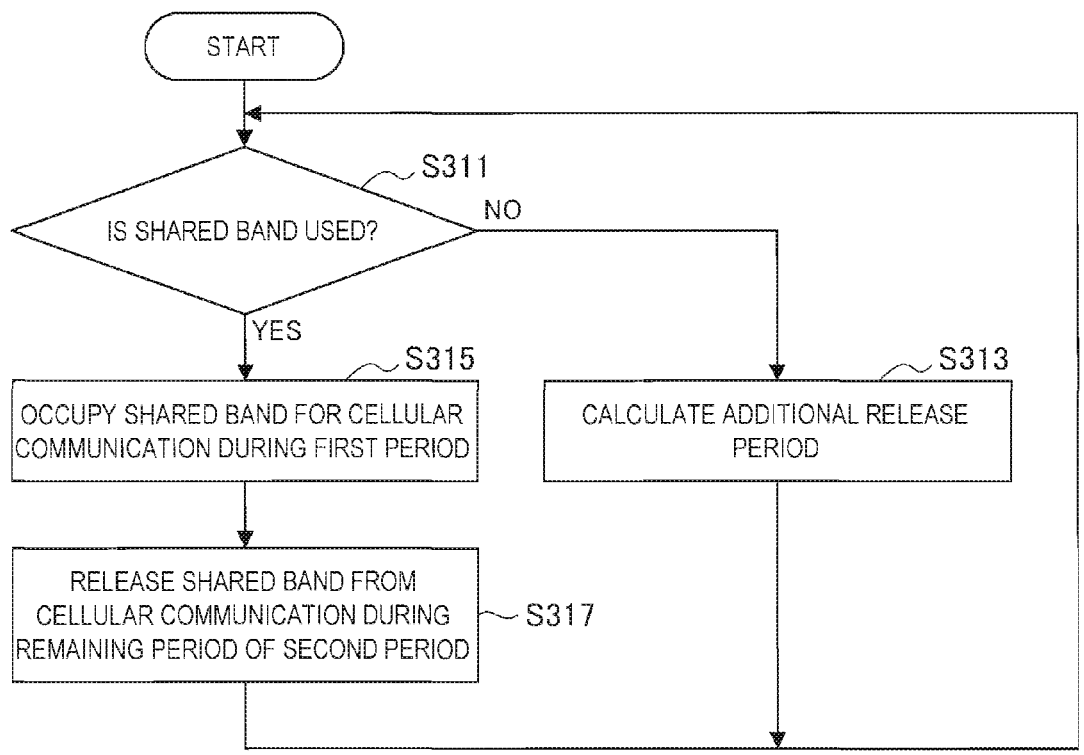
FIG. 13 is a flowchart illustrating a second example of a schematic flow of a process according to the first embodiment.

FIG. 13 is a flowchart illustrating the second example of a schematic flow of the process according to the first embodiment. The process is an example of when the occupancy and release of the shared band as illustrated in FIG. 8 are performed.

The communication control unit 151 determines whether to use the shared band (that is, a frequency band shared between cellular communication and other wireless communication) (S311).

When it is determined not to use the above-mentioned shared band (S311: NO), the communication control unit 151 calculates an additional release time for the above-mentioned shared band (S313). The process returns to step S311. Also, the above-mentioned additional release time is a period in which the above-mentioned shared band is released further after the release of the second period.

On the other hand, when it is determined to use the above-mentioned shared band (S311: YES), the communication control unit 151 occupies the above-mentioned shared band for the cellular communication during the first period (S315). In the first period, the cellular communication is performed.

Thereafter, the communication control unit 151 releases the above-mentioned shared band from the cellular communication during the remaining period of the second period (that is, a period of a difference between the second period and the additional release period) (S317). The process returns to step S311.

(Third Example)

Figure 14:
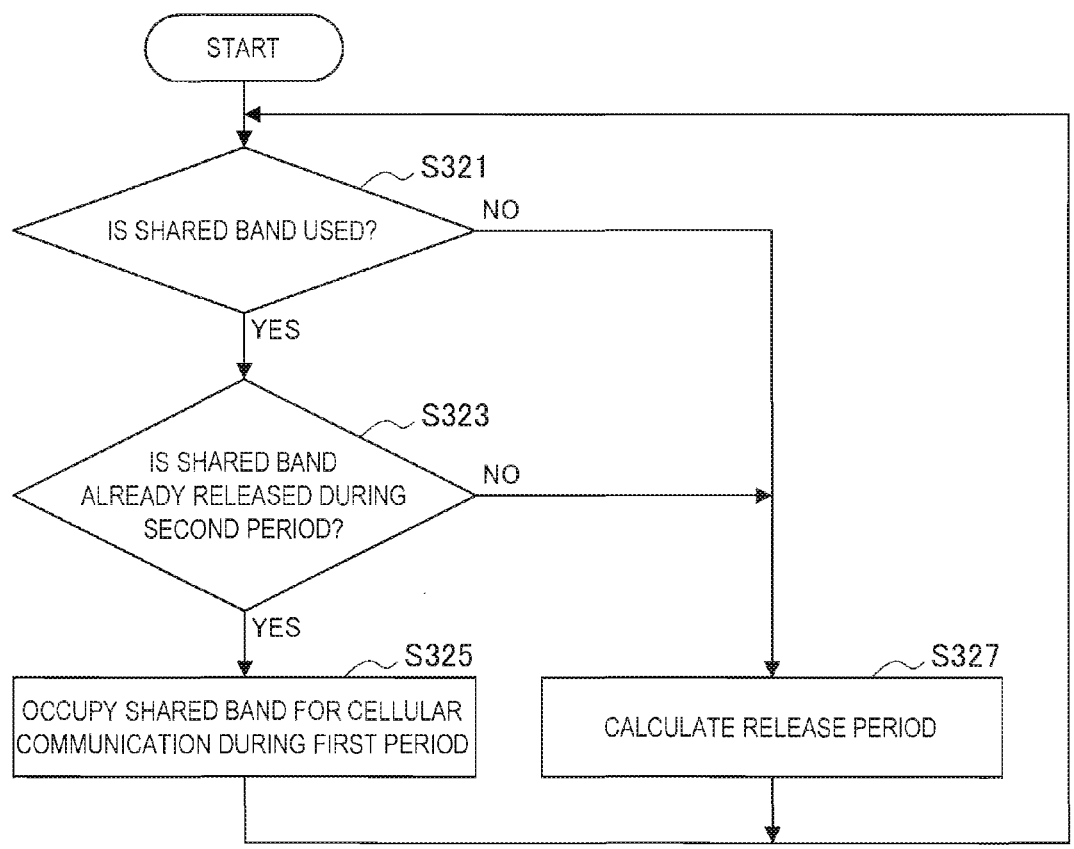
FIG. 14 is a flowchart illustrating a third example of a schematic flow of a process according to the first embodiment.

FIG. 14 is a flowchart illustrating the third example of a schematic flow of the process according to the first embodiment. The process is an example of when the occupancy and release of the shared band as illustrated in FIG. 9 are performed.

The communication control unit 151 determines whether to use the shared band (that is, a frequency band shared between cellular communication and other wireless communication) (S321).

When it is determined to use the above-mentioned shared band (S321: YES), the communication control unit 151 determines whether the above-mentioned shared band has already been released during the second period (S323).

When it is determined that the above-mentioned shared band has already been released during the second period (S323: YES), the communication control unit 151 occupies the above-mentioned shared band for the cellular communication during the first period (S325). In the first period, the cellular communication is performed. Thereafter, the process returns to step S321.

On the other hand, when it is determined not to use the above-mentioned shared band (S321: NO) and when it is determined that the above-mentioned shared band has not yet been released during the second period (S323: NO), the communication control unit 151 calculates a release time for the above-mentioned shared band (S327). The process returns to step S321.

(Fourth Example)

Figure 15:
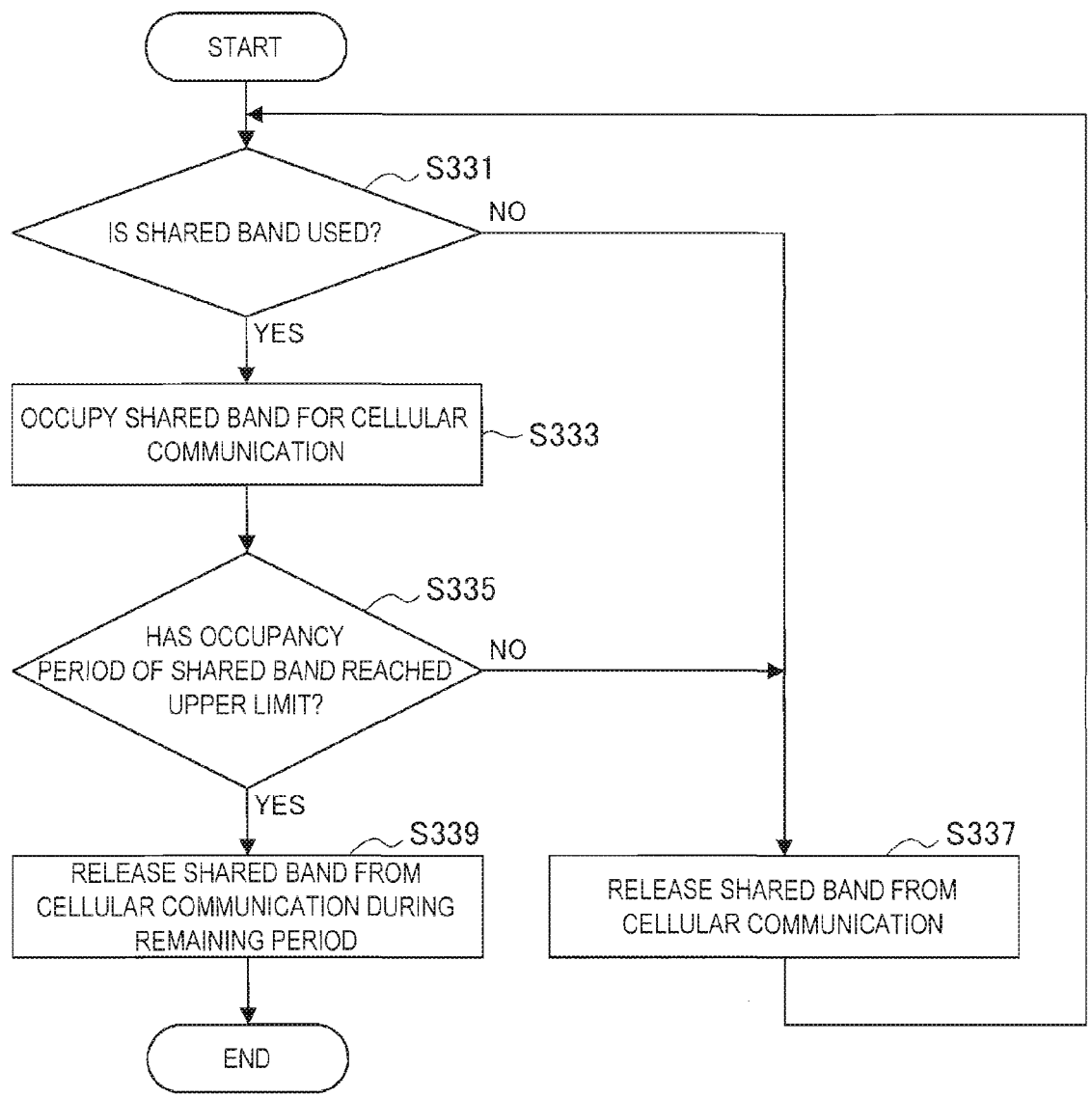
FIG. 15 is a flowchart illustrating a fourth example of a schematic flow of a process according to the first embodiment.

FIG. 15 is a flowchart illustrating the fourth example of a schematic flow of the process according to the first embodiment. The process is an example of when the occupancy and release of the shared band as illustrated in FIG. 10 are performed. The above-mentioned process is performed during the third period.

The communication control unit 151 determines whether to use the shared band (that is, a frequency band shared between cellular communication and other wireless communication) (S331).

When it is determined to use the above-mentioned shared band (S331: YES), the communication control unit 151 occupies the above-mentioned shared band for the cellular communication (S333). In the first period, the cellular communication is performed. Thereafter, the communication control unit 151 determines whether an occupancy period (the first period) of the above-mentioned shared band has reached an upper limit (S335).

When it is determined not to use the above-mentioned shared band (S331: YES) and it is determined that the above-mentioned shared period (the first period) has not reached the upper limit (S335: YES), the communication control unit 151 releases the above-mentioned shared band from the cellular communication (S337). The process returns to step S331.

On the other hand, when it is determined that the above-mentioned occupancy period (the first period) has reached the upper limit (S335: YES), the communication control unit 151 releases the above-mentioned shared band from the cellular communication during the remaining period of the third period (S339). The process ends.

<3.5. Modified Example>

(Summary)

In the above-mentioned example of the first embodiment, for example, the base station 100-1 (the communication control unit 151) occupies the shared band for the cellular communication during the first period and releases the above-mentioned shared band from the above-mentioned cellular communication during at least the second period corresponding to the above-mentioned first period.

On the other hand, in a modified example of the first embodiment, the terminal device 200-1 (the communication control unit 241) occupies the shared band for the cellular communication during the first period and releases the above-mentioned shared band from the cellular communication during at least the second period corresponding to the above-mentioned first period.

Thereby, for example, it is possible to secure an opportunity to use a frequency band shared between cellular communication and other wireless communication (that is, a shared band) in the above-mentioned other communication and continuously use the frequency band for wireless communication between terminal devices in the cellular system 1 (for example, D2D communication or wireless communication within the LN) for a certain amount of time.

Also, even in the above-mentioned modified example of the first embodiment, for example, the base station 100-1 (the communication control unit 151) may occupy the shared band for the cellular communication during the first period and release the above-mentioned shared band from the above-mentioned cellular communication during at least the second period corresponding to the above-mentioned first period.

(Terminal Device 200-1: Communication Control Unit 241)

In the modified example of the first embodiment, the communication control unit 271 occupies the shared band (that is, a frequency band shared between cellular communication and other wireless communication) during the first period and releases the above-described shared band from the above-mentioned cellular communication during at least the second period corresponding to the above-mentioned first period.

The description of the communication control unit 241 in this regard is the same as the corresponding description for the communication control unit 151 according to the above-mentioned first embodiment except for differences related to the main components (the base station 100-1 and the terminal device 200-1). Consequently, here, redundant description will be omitted.

(Flow of Process)

An example of a process of the terminal device 200-1 according to the modified example of the first embodiment is the same as the example of the process of the base station 100-1 described with reference to FIGS. 12 to 15 except for the differences related to the main components (the base station 100-1 and the terminal device 200-1). Consequently, here, redundant description be omitted.

<<4. Second Embodiment>>

Next, the second embodiment of the present disclosure will be described with reference to FIGS. 16 to 21.

<4.1. Summary>

First, the summary of the second embodiment will be described.

Problems According to Second Embodiment

In the wireless LAN standard, CSMA/CA is adopted. For example, the case in which a device (the base station 100 or the terminal device 200) of the cellular system 1 also operates on the basis of the CSMA/CA is considered to use the frequency band used in the wireless LAN communication in cellular communication. However, in this case, of course, the device for performing wireless LAN communication can first use the above-mentioned frequency band and the above-mentioned device of the cellular system 1 may be unlikely to use the above-mentioned frequency band. That is, the above-mentioned device of the cellular system 1 can or cannot secure the above-mentioned frequency band for the cellular communication. Thus, starting to use the above-mentioned frequency band in wireless communication of the above-mentioned cellular system can be time-consuming.

Therefore, it is desirable to provide a mechanism for enabling the frequency band shared between cellular communication and other wireless communication to be more appropriately used in the cellular system. More specifically, it is desirable to provide a mechanism capable of more reliably securing the above-mentioned shared band for the cellular communication.

Characteristics of Second Embodiment

According to the second embodiment, for example, a wireless communication device for performing the cellular communication is controlled so that the above-mentioned wireless communication device starts to transmit a signal using a frequency band shared between the cellular communication and the wireless LAN communication (that is, a shared band) before a period in which no signal is transmitted using the above-mentioned frequency band becomes a DIFS. Thereby, it is possible to more reliably secure the above-mentioned frequency band for the cellular communication.

Also, according to the second embodiment, a wireless communication device for performing cellular communication is controlled so that the above-mentioned wireless communication device transmits a dummy signal using the frequency band shared between the cellular communication and the wireless LAN communication (that is, the shared band), for example, during a period until a radio frame for another frequency band used for the cellular communication starts. Thereby, for example, it is possible to more reliably secure the above-mentioned frequency band for the cellular communication.

<4.2. Configuration of Base Station>

Figure 16:
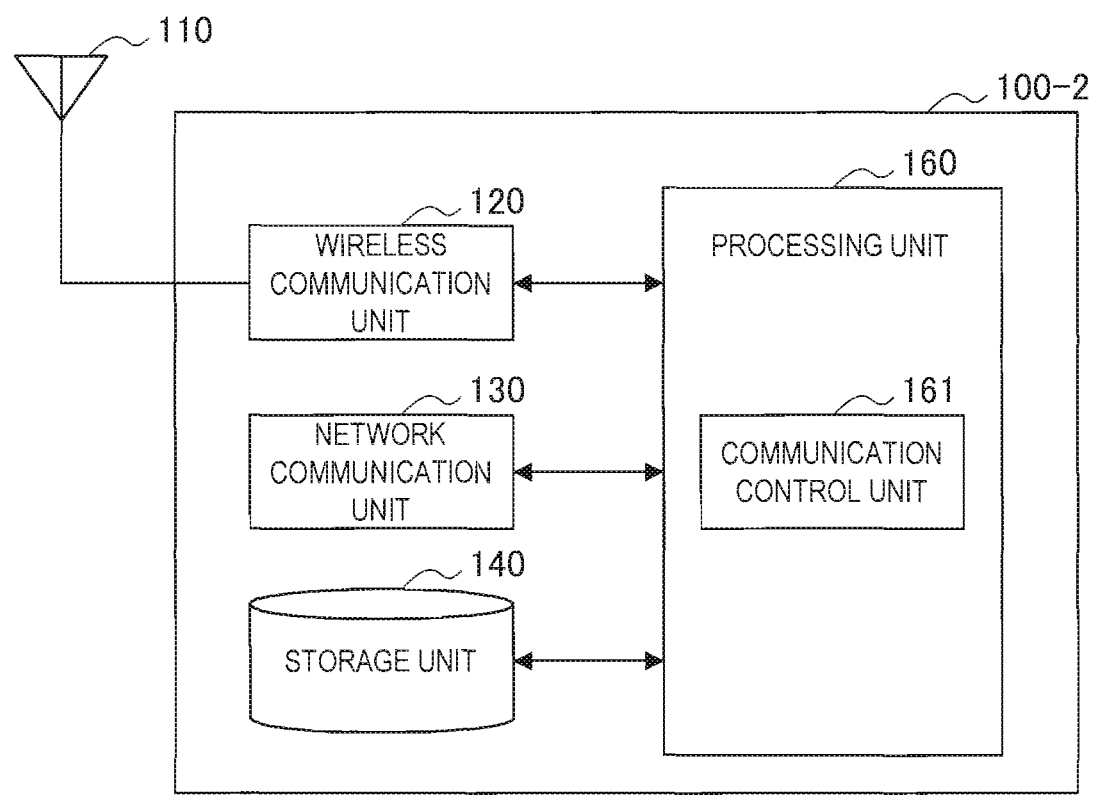
FIG. 16 is a block diagram illustrating an example of a configuration of a base station according to a second embodiment.

Next, an example of the configuration of a base station 100-2 according to the second embodiment will be described with reference to FIGS. 16 to 18. FIG. 16 is a block diagram illustrating an example of the configuration of the base station 100-2 according to the second embodiment. Referring to FIG. 16, the base station 100-2 is equipped with an antenna unit 110, a wireless communication unit 120, a network communication unit 130, a storage unit 140, and a processing unit 160.

Here, the description of the antenna unit 110, the wireless communication unit 120, the network communication unit 130, and the storage unit 140 is not different between the first embodiment and the second embodiment except for a difference of reference signs. Consequently, here, only the processing unit 160 will be described and redundant description will be omitted.

(Processing Unit 160)

The processing unit 160 provides various functions of the base station 100-2. The processing unit 160 includes a communication control unit 161. Also, the processing unit 160 can further include other components in addition to the communication control unit 161.

(Communication Control Unit 161)

(a) First Control for Securing Shared Band

For example, the communication control unit 161 controls a wireless communication device for performing the above-mentioned cellular communication so that the above-mentioned wireless communication device starts to transmit a signal using the above-mentioned shared band before a period in which no signal is transmuted using the shared band becomes a DIFS. The above-mentioned shared band is a frequency band to be shared between wireless communication of the cellular system 1 (that is, a cellular communication) and wireless communication conforming to a wireless LAN standard (that is, wireless LAN communication).

Further, for example, the communication control unit 161 controls the above-mentioned wireless communication device so that the above-mentioned wireless communication device starts to transmit a signal using the above-mentioned shared band after the period in which no signal is transmitted using the shared band is longer than an SIFS.

For example, the above-mentioned wireless communication device is the base station 100-2 and the communication control unit 161 controls the base station 100-2 so that the base station 100-2 starts to transmit a signal using the above-mentioned shared band after the period in which no signal is transmitted using the shared band is longer than the SIFS and before the period becomes the DIFS. More specifically, for example, the processing unit 160 (the communication control unit 161 or another component) determines whether the signal is transmitted using the above-mentioned shared band on the basis of a result of receiving a signal by the wireless communication unit 120. Also, the processing unit 160 (the communication control unit 161 or another component) measures the period in which no signal is transmitted using the shared band. The communication control unit 161 causes the wireless communication unit 120 to transmit the signal using the above-mentioned shared band after the period in which no signal is transmitted using the above-mentioned shared band is longer than the SIFS and before the period becomes the DIFS. As an example, when the above-mentioned period becomes a predetermined period longer than the SIFS and shorter than the DIFS, the signal is transmitted using the above-mentioned shared band. Hereinafter, in this regard, a specific example will be described with reference to FIG. 17.

Figure 17:
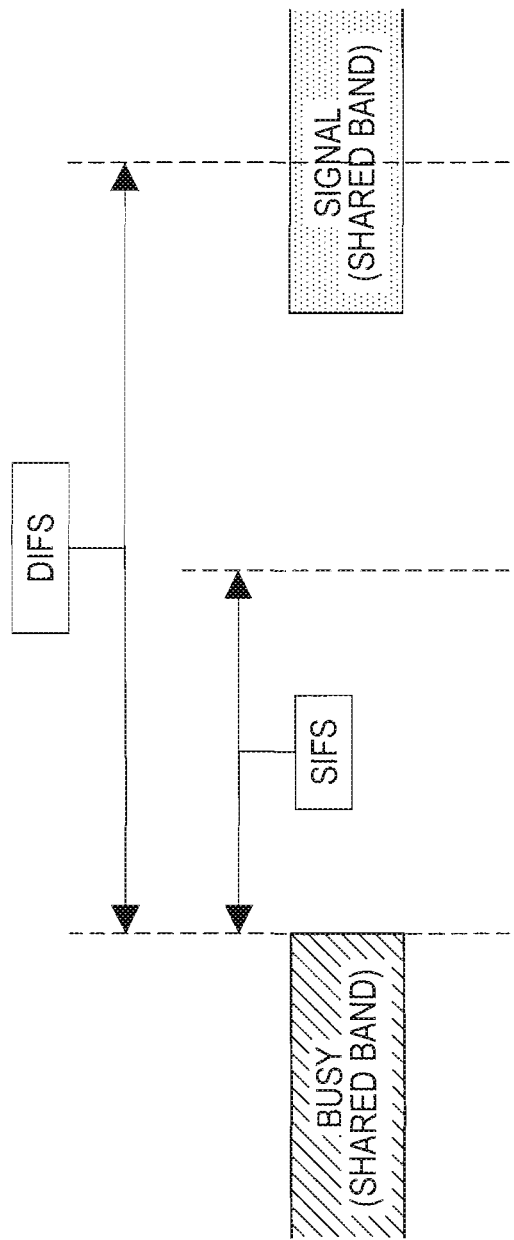
FIG. 17 is an explanatory diagram illustrating transmission timings of signals.

FIG. 17 is an explanatory diagram illustrating transmission timings of signals. Referring to FIG. 17, a signal starts to be transmitted before the period in which no signal is transmitted using the shared band becomes the DIFS and after the period is longer than the SIFS. As an example, the signal starts to be transmitted when a predetermined period longer than the SIFS and shorter than the DIFS has elapsed.

When a period in which no signal is transmitted reaches a sum of the DIFS and a backoff time, a device for performing the wireless LAN communication can transmit the signal. Thus, the signal starts to be transmitted before the passage of the above-mentioned DIFS so that it is possible to transmit the signal, for example, before a transmission time of the device for performing the wireless LAN communication. As a result, the transmission of the signal using the above-mentioned shared band by the device for performing the wireless LAN communication can be suppressed. As described above, it is possible to more reliably secure the above-mentioned shared band for the cellular communication.

Also, it is possible to prevent a signal to be transmitted from colliding with a signal of wireless LAN communication by starting to transmit a signal after the passage of the SIFS as described above. More specifically, for example, an RTS frame, a CTS frame, a DATA frame, and an ACK frame are connected at a time interval of the SU-S. Thus, when the signal is transmitted before the passage of the SIFS, the signal can collide with a signal of any of the CTS frame, the DATA frame, or the ACK frame. Therefore, as described above, the collision between the signal and the signal of the CTS frame, the DATA frame, or the ACK frame can be avoided if the signal starts to be transmitted after the period in which no signal is transmitted using the above-mentioned shared band is longer than the SIFS.

(b) Second Control for Securing Shared Band

Transmission of a Signal Until a Start of a Frame for another Frequency Band

For example, the communication control unit 161 controls a wireless communication device for performing the above-mentioned cellular communication so that the above-mentioned wireless communication device transmits a dummy signal using the shared band during a period until a radio frame for another frequency band used in cellular communication starts. The above-mentioned shared band is a frequency band to be used between wireless communication of the cellular system 1 (that is, cellular communication) and wireless communication conforming to a wireless LAN standard (that is, wireless LAN communication).

For example, the above-mentioned wireless communication device is the base station 100-2. Also, for example, the above-mentioned shared band is a CC for the cellular system 1 and the above-mentioned other frequency band is another CC for the cellular system 1. The communication control unit 161 controls the base station 100-2 so that the base station 100-2 transmits a dummy signal using a shared band (the CC) during a period until a radio frame for the other CC starts. More specifically, for example, the communication control unit 161 causes the wireless communication unit 120 to transmit the dummy signal during a period until the radio frame for the other CC starts from a timing before the passage of the DIFS and after the passage of the SIFS. Hereinafter, in this regard, a specific example will be described with reference to FIG. 18.

Figure 18:
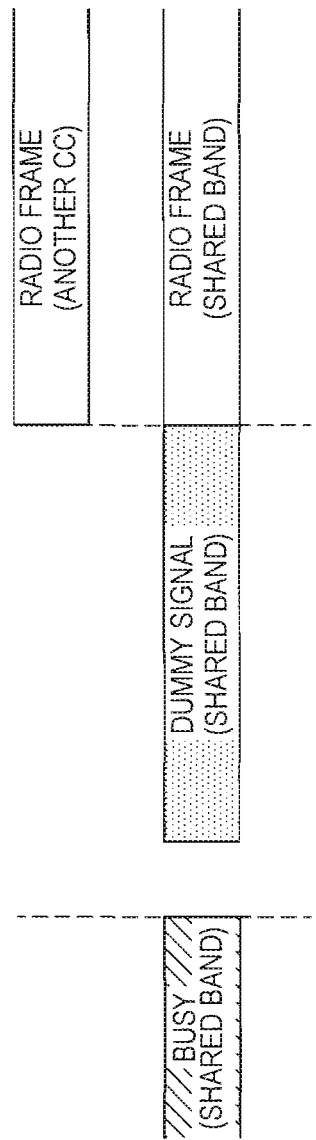
FIG. 18 is an explanatory diagram illustrating an example of transmission of a dummy signal.

FIG. 18 is an explanatory diagram illustrating an example of transmission of a dummy signal. Referring to FIG. 18, the dummy signal starts to be transmitted using the above-mentioned shared band after no signal is transmitted using the shared band (the CC) (for example, after the period in which no signal is transmitted using the shared band is longer than the SIFS and before the period becomes the DIFS as illustrated in FIG. 17). The above-mentioned dummy signal is transmitted until the radio frame of the other CC (and a radio frame of the above-mentioned shared band) starts. Thereafter, a signal of the cellular system is transmitted and received in the radio frame using the above-mentioned CC and the above-mentioned shared band.

The dummy signal is transmitted during a period until the radio frame for the above-mentioned other frequency band starts using the above-mentioned shared band so that the transmission of the signal using the above-mentioned shared band by the device for performing wireless LAN communication can be suppressed until the start of the above-mentioned radio frame. That is, the above-mentioned shared band is secured until the start of the above-mentioned radio frame. Thus, for example, it is possible to start a radio frame for the above-mentioned shared band at the timing at which a radio frame for another frequency band for cellular communication starts. As described above, it is possible to more reliably secure the above-mentioned shared band for cellular communication while synchronizing a radio frame for the shared band and a radio frame for the above-mentioned other frequency band.

Also, the above-mentioned dummy signal is, for example, any signal other than signals (a control signal and a data signal) of the cellular system. The above-mentioned dummy signal can become a busy tone for the device for performing the wireless LAN communication.

Also, in other words, the period until the radio frame for the above-mentioned other frequency band starts is a period until a sub-frame of #0 for the above-mentioned other frequency band starts.

Transmission of Radio Frame for Setting NAV

Also, in place of the transmission of the above-mentioned dummy signal, the communication control unit 161 may control the above-mentioned wireless communication device so that the above-mentioned wireless communication device transmits a frame including duration information for setting the NAV using the above-mentioned shared band before the radio frame for the above-mentioned frequency band starts.

For example, the above-mentioned wireless communication device is the base station 100-2. Also, the above-mentioned shared band may be a CC for the cellular system 1 and the above-mentioned other frequency band may be another CC for the cellular system 1. Also, the above-mentioned frame may be an RTS frame, a CTS frame, or a frame similar thereto. The communication control unit 161 may control the base station 100-2 so that the base station 100-2 transmits the above-mentioned frame using the above-mentioned shared band before the radio frame for the other CC starts. More specifically, for example, the communication control unit 161 may generate the above-mentioned frame and cause the wireless communication unit 120 to transmit the above-mentioned frame using the above-mentioned shared band before the radio frame for the other CC starts.

Also, the above-mentioned wireless communication device may transmit one frame including duration information for setting the NAV to cover a period until a radio frame for the above-mentioned other frequency band starts. Alternatively, the above-mentioned wireless communication device may transmit two or more frames at different timings. Every time each of the above-mentioned two or more frames is transmitted, the NAV of the device for receiving the frame may be updated and the updated NAV may cover the whole of a period until the radio frame for the above-mentioned other frequency band starts.

For example, the above-mentioned frame is transmitted, for example, so that the device for performing the wireless LAN communication sets the NAV and avoids using the above-mentioned shared band. Thus, until the start of the above-mentioned radio frame, the transmission of a signal using the above-mentioned shared band by the device for performing the wireless LAN communication can be suppressed.

<4.3. Configuration of Terminal Device>

Figure 19:
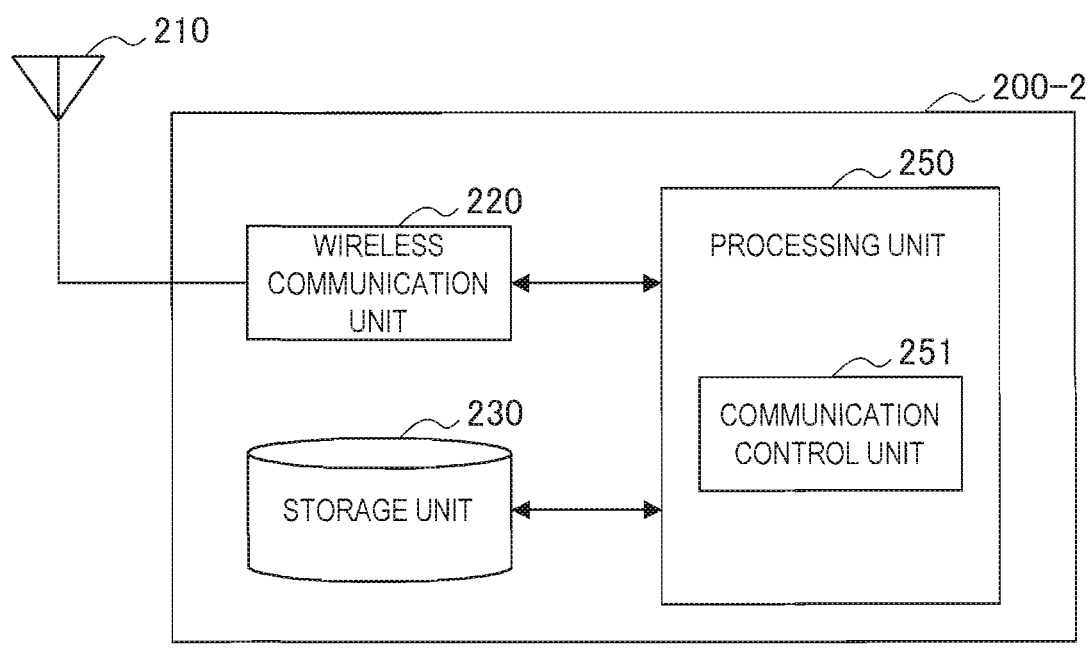
FIG. 19 is a block diagram illustrating an example of a configuration of a terminal device according to the second embodiment.

Next, an example of the configuration of a terminal device 200-2 according to the second embodiment will be described with reference to FIG. 19. FIG. 19 is a block diagram illustrating the example of the configuration of the terminal device 200-2 according to the second embodiment. Referring to FIG. 19, the terminal device 200-2 includes an antenna unit 210, a wireless communication unit 220, a storage unit 230, and a processing unit 250.

Here, the description of the antenna unit 210, the wireless communication unit 220, and the storage unit 230 is not different between the first embodiment and the second embodiment except for a difference of reference signs. Consequently, here, only the processing unit 250 will be described and redundant description will be omitted.

(Processing Unit 250)

The processing unit 250 provides various functions of the terminal device 200-2. The processing unit 250 includes a communication control unit 251. Also, the processing unit 250 can further include another component in addition to the communication control unit 251.

(Communication Control Unit 251)

The communication control unit 251 controls the terminal device 200-1.

<4.4. Flow of Process>

Next, an example of the process according to the second embodiment will be described with reference to FIGS. 20 and 21.

(First Example)

Figure 20:
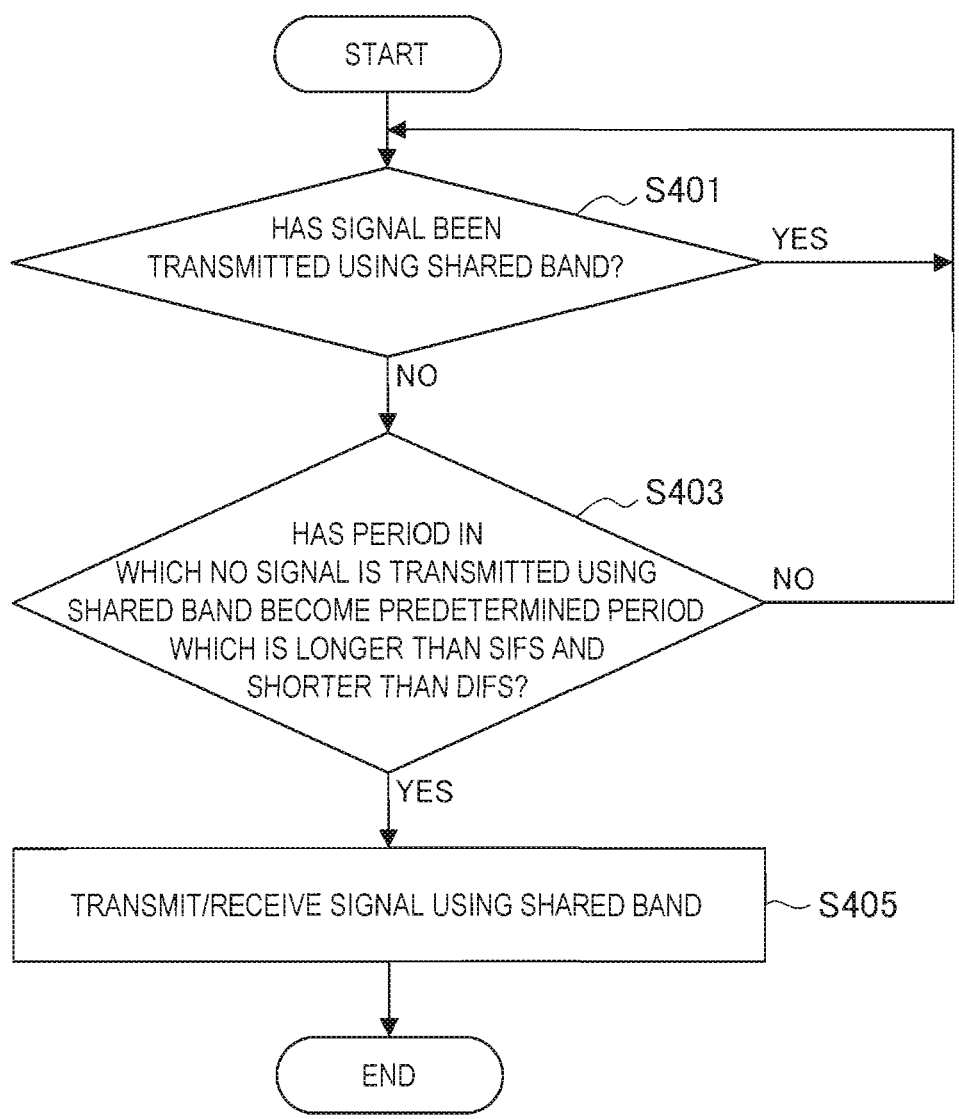
FIG. 20 is a flowchart illustrating a first example of a schematic flow of a process according to the second embodiment.

FIG. 20 is a flowchart illustrating the first example of a schematic flow of the process according to the second embodiment. The process is an example of when a signal is transmitted as illustrated in FIG. 17.

The processing unit 160 (the communication control unit 161 or another component) determines whether a signal is transmitted using the above-mentioned shared band on the basis of a result of receiving a signal by the wireless communication unit 120 (S401). When it is determined that the signal is transmuted using the above-mentioned shared band (S401: YES), the process returns to step S401.

On the other hand, when it is determined that no signal is transmitted using the above-mentioned shared band (S401: NO), for example, the communication control unit 161 determines whether a period in which no signal is transmitted using the above-mentioned shared band has become a predetermined period longer than the SIFS and shorter than the DIFS (S403). When it is determined that the above-mentioned period has not become the above-mentioned predetermined period (that is, a signal is transmitted using the above-mentioned shared band before the passage of the above-mentioned predetermined period) (S403: NO), the process returns to step S401.

When it is determined that the above-mentioned period is the above-mentioned predetermined period (S403: YES), the base station 100-2 transmits and/or receives a signal using the above-mentioned shared band according to control by the processing unit 160 (S405). The process ends.

(Second Example)

Figure 21:
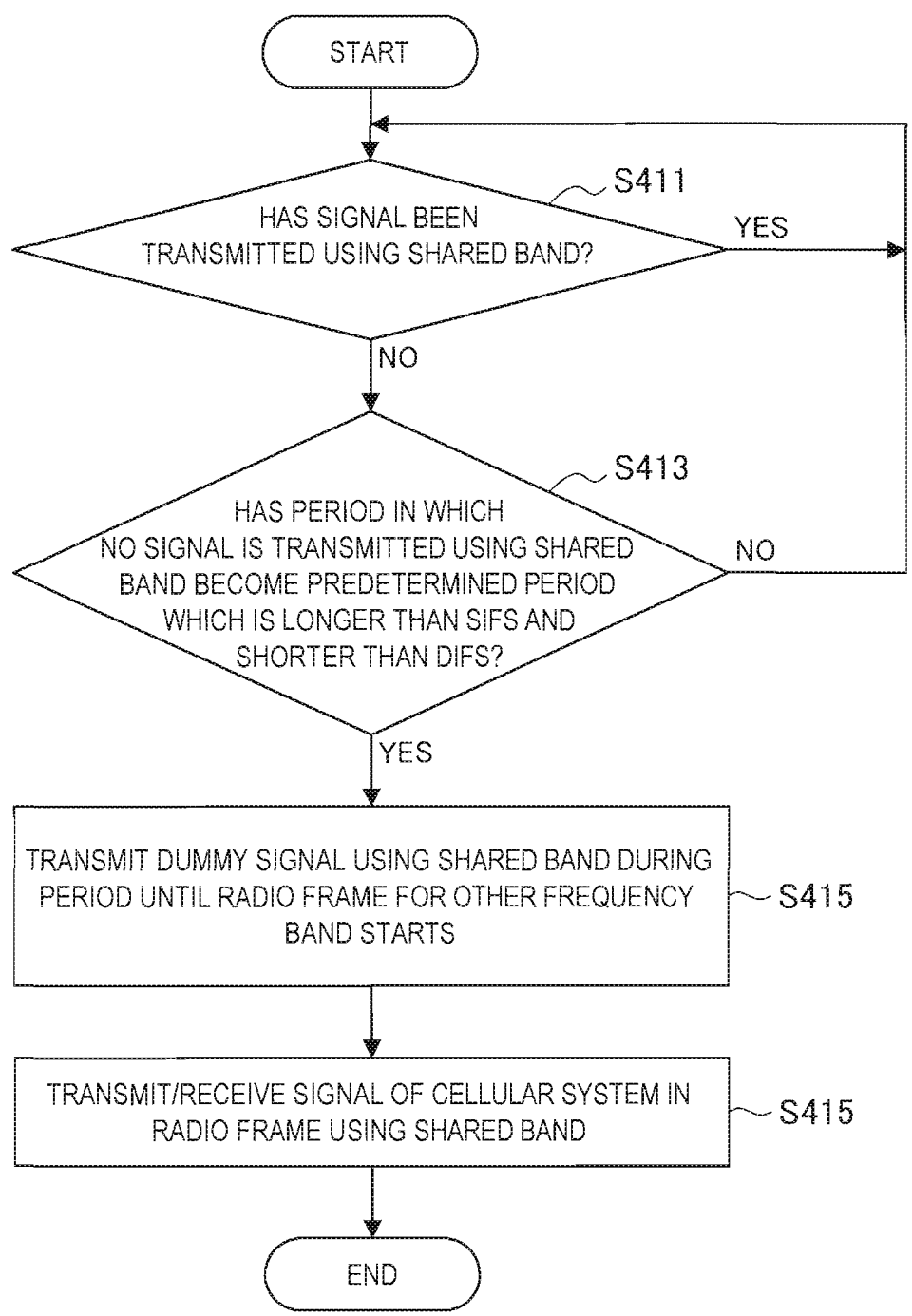
FIG. 21 is a flowchart illustrating a second example of a schematic flow of a process according to the second embodiment.

FIG. 21 is a flowchart illustrating the second example of a schematic flow of the process according to the second embodiment. The process is an example of when a signal is transmitted as illustrated in FIG. 18 (and FIG. 17).

The processing unit 160 (the communication control unit 161 or another component) determines whether a signal is transmitted using the above-mentioned shared band on the basis of a result of receiving the signal by the wireless communication unit 120 (S411). When it is determined that the signal is transmitted using the above-mentioned shared band (S411: YES), the process returns to step S411.

On the other hand, when it is determined that no signal is transmitted using the above-mentioned shared band (S411: NO), for example, the communication control unit 161 determines whether a period in which no signal is transmitted using the above-mentioned shared band has become a predetermined period longer than the SIFS and shorter than the DIFS (S413). When it is determined that the above-mentioned period does not become the above-mentioned predetermined period (that is, a signal is transmitted using the above-mentioned shared band before the passage of the above-mentioned predetermined period) (S413: NO), the process returns to step S411.

When it is determined that the above-mentioned period becomes the above-mentioned predetermined period (S413: YES), the base station 100-2 transmits a dummy signal using the above-mentioned shared band during a period until a radio frame for another frequency band for the cellular system 1 starts according to control by the processing unit 160 (S415).

Further, the base station 100-2 transmits and/or receives a signal of a cellular system in a radio frame using the above-mentioned shared band (S417). The process ends.

<4.5. First Modified Example>

(Summary)

(a) First Control for Securing Shared Band

In the above-mentioned example of the second embodiment, for example, the base station 100-2 starts to transmit a signal using the above-mentioned shared band, for example, before the period in which no signal is transmitted using the shared band becomes a DIFS.

On the other hand, in the first modified example of the second embodiment, for example, the base station 100-2 controls the terminal device 200-2 so that the terminal device 200-2 starts to transmit a signal using the above-mentioned shared band before the period in which no signal is transmitted using the shared band becomes the DIFS. The terminal device 200-2 starts to transmit a signal using the shared band before the period in which no signal is transmitted using the shared band becomes the DIFS.

Thereby, for example, a device which does not receive a signal transmitted by the base station 100-2 can also receive a signal transmitted by the terminal device 200-2. Thus, for example, the hidden terminal problem can be solved.

Also, even in the first modified example of the second embodiment, the base station 100-2 (communication control unit 161) may start to transmit a signal using the above-mentioned shared band before the period in which no signal is transmitted using the shared band becomes the DIFS.

(b) Second Control for Securing Shared Band

In the above-mentioned example of the second embodiment, for example, the base station 100-2 transmits a dummy signal using the above-mentioned shared band during a period until a radio frame for another frequency band to be used in the wireless communication of the cellular system 1 starts.

On the other hand, in the first modified example of the second embodiment, for example, the base station 100-2 controls the terminal device 200-2 so that the terminal device 200-2 transmits a dummy signal using the shared band during a period until a radio frame for another frequency band to be used for the cellular communication starts. The terminal device 200-2 transmits the dummy signal using the above-mentioned shared band during the period until the radio frame for the other frequency band to be used for the wireless communication of the cellular system 1 starts.

Thereby, for example, a device which does not receive a signal transmitted by the base station 100-2 can also receive a signal transmitted by the terminal device 200-2. Thus, for example, the hidden terminal problem can be solved.

Also, even in the first modified example of the second embodiment, the base station 100-2 (communication control unit 161) may transmit a dummy signal using the above-mentioned shared band during the period until the radio frame for the other frequency band to be used for the wireless communication of the cellular system 1 starts.

(Base Station 100-2: Communication Control Unit 161)

(a) First Control for Securing Shared Band

As described above, for example, the communication control unit 161 controls a wireless communication device for performing the above-mentioned cellular communication so that the above-mentioned wireless communication device starts to transmit a signal using the above-mentioned shared before a period in which no signal is transmitted using the shared band becomes a DIFS. Further, for example, the communication control unit 161 controls the above-mentioned wireless communication device so that the above-mentioned wireless communication device starts to transmit a signal using the above-mentioned shared band after the period in which no signal is transmitted using the shared band is longer than an SIFS.

In the first modified example, for example, the above-mentioned wireless communication device is the terminal device 200-2 and the communication control unit 161 controls the terminal device 200-2 so that the terminal device 200-2 starts to transmit a signal using the above-mentioned shared band after the period in which no signal is transmitted using the shared band is longer than the SIFS and before the period becomes the DIFS. More specifically, for example, the communication control unit 161 instructs the terminal device 200-2 to start the transmission of a signal using the above-mentioned shared band after the period in which no signal is transmitted using the above-mentioned shared band is longer than the SIFS and before the period becomes the DIFS. For example, this instruction can be performed according to RRC signaling or system information.

(b) Second Control for Securing Shared Band

Transmission of Signal until Start of Frame for other Frequency Band

As described above, for example, the communication control unit 161 controls a wireless communication device for performing the above-mentioned cellular communication so that the above-mentioned wireless communication device transmits a dummy signal using the shared band during a period until a radio frame for another frequency band to be used in cellular communication starts.

In a first modified example, for example, the above-mentioned wireless communication device is the terminal device 200-2. Also, for example, the above-mentioned shared band may be a CC for the cellular system 1 and the above-mentioned other frequency band may be another CC for the cellular system 1. The communication control unit 161 may control the terminal device 200-2 so that the terminal device 200-2 transmits the dummy signal using the shared band (CC) during a period until the radio frame for the other CC starts. More specifically, for example, the communication control unit 161 instructs the terminal device 200-2 to transmit a dummy signal using the shared band (CC) during the period until the radio frame for the other CC starts. For example, this instruction can be performed according to RRC signaling or system information.

Transmission of Radio Frame for Setting NAV

As described above, in place of the transmission of the above-mentioned dummy signal, the communication control unit 161 may control the above-mentioned wireless communication device so that the above-mentioned wireless communication device transmits a frame including duration information for setting the NAV using the above-mentioned shared band before the radio frame for the above-mentioned frequency band starts.

In the first modified example, the above-mentioned wireless communication device may be the terminal device 200-2. Also, the above-mentioned shared band may be a CC for the cellular system 1 and the above-mentioned other frequency band may be another CC for the cellular system 1. Also, the above-mentioned frame may be an RTS frame, a CTS frame, or a frame similar thereto. The communication control unit 161 may control the terminal device 200-2 so that the terminal device 200-2 transmits the above-mentioned frame using the above-mentioned shared band before the radio frame for another CC starts. More specifically, for example, the communication control unit 161 may instruct the terminal device 200-2 to transmit the above-mentioned frame before the radio frame for the other CC starts. For example, this instruction can be performed according to RRC signaling or system information.

The base station 100-2 according to the first modified example of the second embodiment has been described above. Also, in the first modified example of the second embodiment, the above-mentioned wireless communication device may be the base station 100-2 and the terminal device 200-2. As in the above-mentioned example of the second embodiment, the base station 100-2 may also transmit a signal.

(Terminal Device 200-2: Communication Control Unit 251)

(a) First Control for Securing Shared Band

In the first modified example of the second embodiment, for example, the communication control unit 251 controls the terminal device 200-2 so that the terminal device 200-2 starts to transmit a signal using the above-mentioned shared band, for example, before the period in which no signal is transmitted using the shared band becomes a DIFS.

Further, for example, the communication control unit 251 controls the terminal device 200-2 so that the terminal device 200-2 starts to transmit a signal using the above-mentioned shared band after the period in which no signal is transmitted using the shared band is longer than an SIFS.

For example, the communication control unit 251 controls the terminal device 200-2 according to an instruction by the base station 100-2. More specifically, for example, the processing unit 250 (the communication control unit 251 or another component) determines whether a signal is transmitted using the above-mentioned shared band on the basis of a result of receiving a signal by the wireless communication unit 220. Also, the processing unit 250 (the communication control unit 251 or another component) measures a period in which no signal is transmitted using the above-mentioned shared band. The communication control unit 251 causes the wireless communication unit 220 to transmit a signal using the above-mentioned shared band after the period in which no signal is transmitted using the shared band is longer than the SIFS and before the period becomes the DIFS. As an example, a signal is transmitted using the above-mentioned shared band when the above-mentioned period becomes a predetermined period longer than the SIFS and shorter than the DIFS. Even in the first modified example of the second embodiment, the terminal device 200-2 transmits a signal, for example, as illustrated in FIG. 17.

(b) Second Control for Securing Shared Band

Transmission of Signal until Start of Frame for other Frequency Band

In the first modified example of the second embodiment, for example, the communication control unit 251 controls the terminal device 200-2 so that the terminal device 200-2 transmits a dummy signal using the shared band during a period until a radio frame for another frequency band to be used in cellular communication starts.

For example, the communication control unit 251 controls the terminal device 200-2 according to an instruction by the base station 100-2. Specifically, for example, the communication control unit 251 causes the wireless communication unit 220 to transmit a dummy signal during a period until a radio frame for another CC starts from a timing before the passage of the DIFS after the passage of the SIFS. Even in the first modified example of the second embodiment, for example, as illustrated in FIG. 18, the terminal device 200-2 transmits a signal.

Transmission of Radio Frame for Setting NAV

Also, in the first modified example of the second embodiment, in place of the transmission of the above-mentioned dummy signal, the communication control unit 251 may control the terminal device 200-2 so that the terminal device 200-2 transmits a frame including duration information for setting the NAV using the above-mentioned shared band before the radio frame for the above-mentioned other frequency band starts.

For example, the communication control unit 251 may control the terminal device 200-2 according to an instruction by the base station 100-2. Specifically, for example, the communication control unit 251 may generate the above-mentioned frame and cause the wireless communication unit 220 to transmit the above-mentioned frame before the radio frame for the other CC starts.

(Flow of Process)

An example of the process of the terminal device 200-2 according to the first modified example of the second embodiment is the same as the example of the process of the base station 100-2 described with reference to FIGS. 20 and 21, except for the differences related to the main components (the base station 100-2 and the terminal device 200-2). Consequently, here, redundant description will be omitted.

<4.6. Second Modified Example>

(Summary)

As in the first modified example of the second embodiment, even in the second modified example of the second embodiment, for example, the terminal device 200-2 starts to transmit a signal using the above-mentioned shared band before the period in which no signal is transmitted using the shared band becomes a DIFS. Also, for example, the terminal device 200-2 transmits a dummy signal using the above-mentioned shared band during a period until a radio frame for another frequency band to be used in cellular communication starts.

In particular, in the second modified example of the second embodiment, the terminal device 200-2 independently transmits a signal using the above-mentioned shared band as described above without depending upon control by the base station 100-2 (an instruction by the base station 100-2).

Thereby, for example, it is possible to more reliably secure the above-mentioned shared band for the wireless communication between the terminal devices in the cellular system 1 (D2D communication in the cellular system or wireless communication within the LN).

(Terminal Device 200-2: Communication Control Unit 251)

The description of the communication control unit 251 according to the second modified example is the same as the description of the communication control unit 251 according to the first modified example, except for the difference related to the involvement of the base station 100-2. Consequently, here, redundant description will be omitted.

Also, the communication control unit 251 according to the second modified example controls the terminal device 200-2 independently (for example, according to a determination of whether to perform wireless communication between the terminal devices in the cellular system 1 using the shared band) without depending upon an instruction by the base station 100-2.

(Flow of Process)

An example of the process of the terminal device 200-2 according to the second modified example of the second embodiment is the same as the example of the process of the base station 100-2 described with reference to FIGS. 20 and 21, except for the differences related to the main components (the base station 100-2 and the terminal device 200-2). Consequently, here, redundant description will be omitted.

<4.7. Combination of Second Embodiment and First Embodiment>

The second embodiment may be combined with the above-mentioned first embodiment. For example, an operation according to the second embodiment may be applied to the above-mentioned first embodiment.

For example, the communication control unit 151 of the base station 100-1 may further perform an operation of the communication control unit 161 of the base station 100-2 and the communication control unit 241 of the terminal device 200-1 may further perform an operation of the communication control unit 251 of the terminal device 200-2.

Specifically, a technique according to the second embodiment may be used, for example, when the shared band is occupied for cellular communication during the first period in the first embodiment. Specifically, for example, when the wireless communication device (for example, the base station 100 or the terminal device 200) for performing the cellular communication transmits a signal using the shared band during the first period, a signal may start to be transmitted using the above-mentioned shared band before a period in which no signal is transmitted using the shared band becomes a DIFS. Also, for example, when the wireless communication device (for example, the base station 100 or the terminal device 200) for performing cellular communication transmits a signal using the shared band during the first period, a dummy signal may be transmitted using the shared band during a period until a radio frame of another frequency band starts. Thereby, for example, it is possible to more reliably secure the shared band.

<<5. Third Embodiment>>

Next, the third embodiment of the present disclosure will be described with reference to FIGS. 22 to 30.

<5.1. Summary>

First, the summary of the third embodiment will be described.

Problem According to Third Embodiment

For example, a device for performing wireless LAN communication can transmit a signal (for example, a signal of an RTS frame) using a frequency band (channel) when a period in which no signal is transmitted using the frequency band reaches a sum of a DIFS and a backoff time. For example, the DIFS is shorter than a symbol of LTE (an OFDM symbol or an SC-FDMA symbol).

For example, a frequency band (for example, a channel of a wireless LAN) is shared between the cellular communication and the wireless LAN communication. In this case, for example, it may be impossible to transmit any signal of the cellular system using the above-mentioned frequency band in any symbol even while the above-mentioned frequency band is used in the cellular communication. Thus, the device for performing the wireless LAN communication is likely to transmit a signal (for example, a signal of an RTS frame) using the above-mentioned frequency band even while the above-mentioned frequency band is used in cellular communication. Thus, the interference between the cellular communication and the wireless LAN communication occurs in the above-mentioned frequency band and the communication quality of the above-mentioned cellular communication and/or the above-mentioned other wireless communication is likely to deteriorate.

Therefore, it is desirable to provide a mechanism for enabling the frequency band shared between the cellular communication and the other wireless communication to be more appropriately used in the cellular system. More specifically, it is desirable to provide a mechanism capable of preventing the above-mentioned frequency band from being used in the above-mentioned other wireless communication while the frequency band shared between the cellular communication and the other wireless communication (for example, wireless LAN communication) is used in the cellular communication.

Characteristics of Third Embodiment

According to the third embodiment, at any time, a wireless communication device for performing cellular communication is controlled so that the above-mentioned wireless communication device transmits a signal using a frequency band shared between the cellular communication and other wireless communication (that is, a shared band). Thereby, for example, it is possible to prevent the above-mentioned frequency band from being used in the above-mentioned other wireless communication while the frequency band shared between the cellular communication and the other wireless communication (for example, wireless LAN communication) is used in the cellular communication.

<5.2. Configuration of Base Station>

Figure 22:
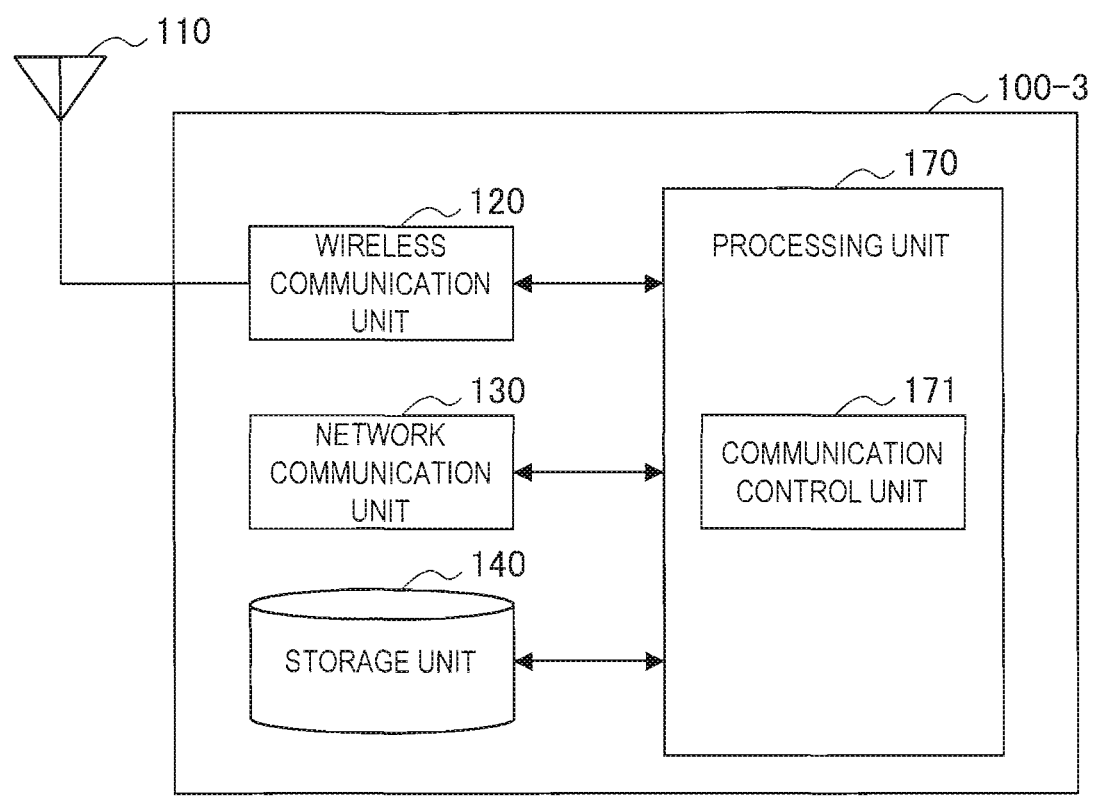
FIG. 22 is a block diagram illustrating an example of a configuration of a base station according to a third embodiment.

Next, an example of the configuration of a base station 100-3 according to the third embodiment will be described with reference to FIGS. 22 to 27. FIG. 22 is a block diagram illustrating an example of the configuration of the base station 100-3 according to the third embodiment. Referring to FIG. 22, the base station 100-3 is equipped with an antenna unit 110, a wireless communication unit 120, a network communication unit 130, a storage unit 140, and a processing unit 170.

Here, the description of the antenna unit 110, the wireless communication unit 120, the network communication unit 130, and the storage unit 140 is not different between the first embodiment and the third embodiment, except for a difference of reference signs. Consequently, here, only the processing unit 170 will be described and redundant description will be omitted.

(Processing Unit 170)

The processing unit 170 provides various functions of the base station 100-3. The processing unit 170 includes a communication control unit 171. Also, the processing unit 170 can further include another component in addition to the communication control unit 171.

(Communication Control Unit 171)

The communication control unit 171 controls a wireless communication device for performing the cellular communication so that the above-mentioned wireless communication device transmits a signal using the above-mentioned shared at any time. The above-mentioned shared band is a frequency band shared between wireless communication (that is, a cellular communication) of the cellular system 1 and other wireless communication.

(a) Other Wireless Communication

For example, the above-mentioned wireless communication is wireless communication (that is, wireless LAN communication) conforming to a wireless LAN standard. In this case, the above-mentioned shared band is shared between the cellular communication and the wireless LAN communication. The above-mentioned shared band is, for example, a channel of a wireless LAN.

(b) Unit of Time

The communication control unit 171 controls the above-mentioned wireless communication device so that the above-mentioned wireless communication device transmits a signal using the above-mentioned shared band in each symbol. The above-mentioned symbol is, for example, an OFDM symbol or an SC-FDMA symbol. Thereby, for example, it is possible to eliminate a non-signal time.

(c) Wireless Communication Device

The above-mentioned wireless communication device is at least one of the base station 100-3 and the terminal device 200-3.

Case of FDD

Downlink Band

As a first example, the FDD is adopted in the cellular system 1 and the above-mentioned shared band is used as the downlink band in the cellular system 1. In this case, the above-mentioned wireless communication device is the base station 100-3. That is, the communication control unit 171 controls the base station 100-3 so that the base station 100-3 transmits a signal using a shared band (downlink band) at any time.

Specifically, for example, the communication control unit 171 maps a signal to one or more resource elements within the above-mentioned shared band in each symbol. Thereby, the base station 100-3 transmits the signal using the above-mentioned shared band in each symbol.

Uplink Band

As a second example, the FDD is adopted in the cellular system 1 and the above-mentioned shared band is used as the uplink band in the cellular system 1. In this case, the above-mentioned wireless communication device is a terminal device 200-3. That is, the communication control unit 171 controls the terminal device 200-3 so that the base station 100-3 transmits a signal using the above-mentioned shared band (uplink band) at any time.

Specifically, for example, the communication control unit 171 instructs the terminal device 200-3 to transmit a signal using the above-mentioned shared band at any time for the uplink.

Thereby, for example, the terminal device 200-3 can transmit a signal using the above-mentioned shared band at any time (in each symbol). Also, for example, this instruction can be performed according to RRC signaling or system information.

Case of TDD

As a third example, the TDD is adopted in the cellular system 1 and the above-mentioned shared band is used as the downlink and uplink bands in the cellular system 1. In this case, the above-mentioned wireless communication device is the base station 100-3 and the terminal device 200-3.

For example, the communication control unit 171 controls the base station 100-3 so that the base station 100-3 transmits a signal using the above-mentioned shared band at any downlink time. Specifically, for example, the communication control unit 171 maps a signal to one or more resource elements within the above-mentioned shared band in each symbol for a downlink sub-frame. Thereby, the base station 100-3 transmits a signal using the above-mentioned shared band in each symbol within the downlink sub-frame.

Also, for example, the communication control unit 171 controls the terminal device 200-3 so that the terminal device 200-3 transmits a signal using the above-mentioned shared band at any uplink time. Specifically, for example, the communication control unit 171 instructs the terminal device 200-3 to transmit a signal using the above-mentioned shared band at any time for the uplink. Thereby, for example, the terminal device 200-3 can transmit a signal using the above-mentioned shared band at any uplink time (in each symbol within the uplink sub-frame). Also, for example, this instruction can be performed according to RRC signaling or system information.

(d) Transmission Power

For example, the communication control unit 171 controls the above-mentioned wireless communication device so that transmission power of a signal to be transmitted using the above-mentioned shared band is greater than or equal to predetermined transmission power at any time.

For example, the above-mentioned wireless communication device is a base station 100-3 and the communication control unit 171 controls the base station 100-3 so that the transmission power of the signal to be transmitted using the above-mentioned shared band is greater than or equal to the predetermined transmission power at any time for the downlink. Specifically, for example, the communication control unit 171 allocates power greater than or equal to the above-mentioned predetermined transmission power to the signal to be transmitted using the above-mentioned shared band in each symbol.

Also, for example, the above-mentioned wireless communication system is the terminal device 200-3 and the communication control unit 171 controls the terminal device 200-3 so that the transmission power of the signal to be transmitted using the above-mentioned shared band is greater than or equal to the predetermined transmission power at any time for the uplink. Specifically, for example, the communication control unit 171 indicates the transmission power of a signal to be transmitted using the above-mentioned shared band to the terminal device 200-3.

Thereby, for example, in a device for performing other wireless communication (for example, wireless LAN communication), reception power of the above-mentioned signal can reach desired power. As a result, the device can more reliably avoid the transmission of a signal using the above-mentioned shared band.

(e) Technique of Transmission of Signal

Transmission of Dummy Signal

For example, the communication control unit 171 controls the base station 100-3 so that the base station 100-3 transmits a dummy signal using the above-mentioned shared band in at least a symbol in which neither a data signal nor a control signal of the cellular system 1 is transmitted using the above-mentioned shared band. Thereby, for example, it is possible to reliably transmit a signal in each symbol of downlink.

Also, the above-mentioned dummy signal is, for example, any signal other than signals (a control signal and a data signal) of the cellular system. The above-mentioned dummy signal is a busy tone for a device for performing wireless LAN communication.

Transmission of Dummy Signal in some Radio Resources

For example, the communication control unit 171 controls the base station 100-3 so that the base station 100-3 transmits the above-mentioned dummy signal in some radio resources among radio resources arranged in a frequency direction across the above-mentioned shared band in at least the above-mentioned symbol.

Specifically, for example, the communication control unit 171 maps a dummy signal to one or more resource elements (REs) within the above-mentioned shared band in at least a symbol in which a data signal and a control signal are not transmitted.

Transmission in some Resource Blocks (RBs)

For example, some radio resources mentioned above are some RBs among RBs arranged in a frequency direction across the above-mentioned shared band. That is, the base station 100-3 transmits a dummy signal in some RBs among the RBs arranged in the frequency direction across the above-mentioned shared band. Hereinafter, in this regard, a specific example will be described with reference to FIGS. 23 and 24.

Figure 23:
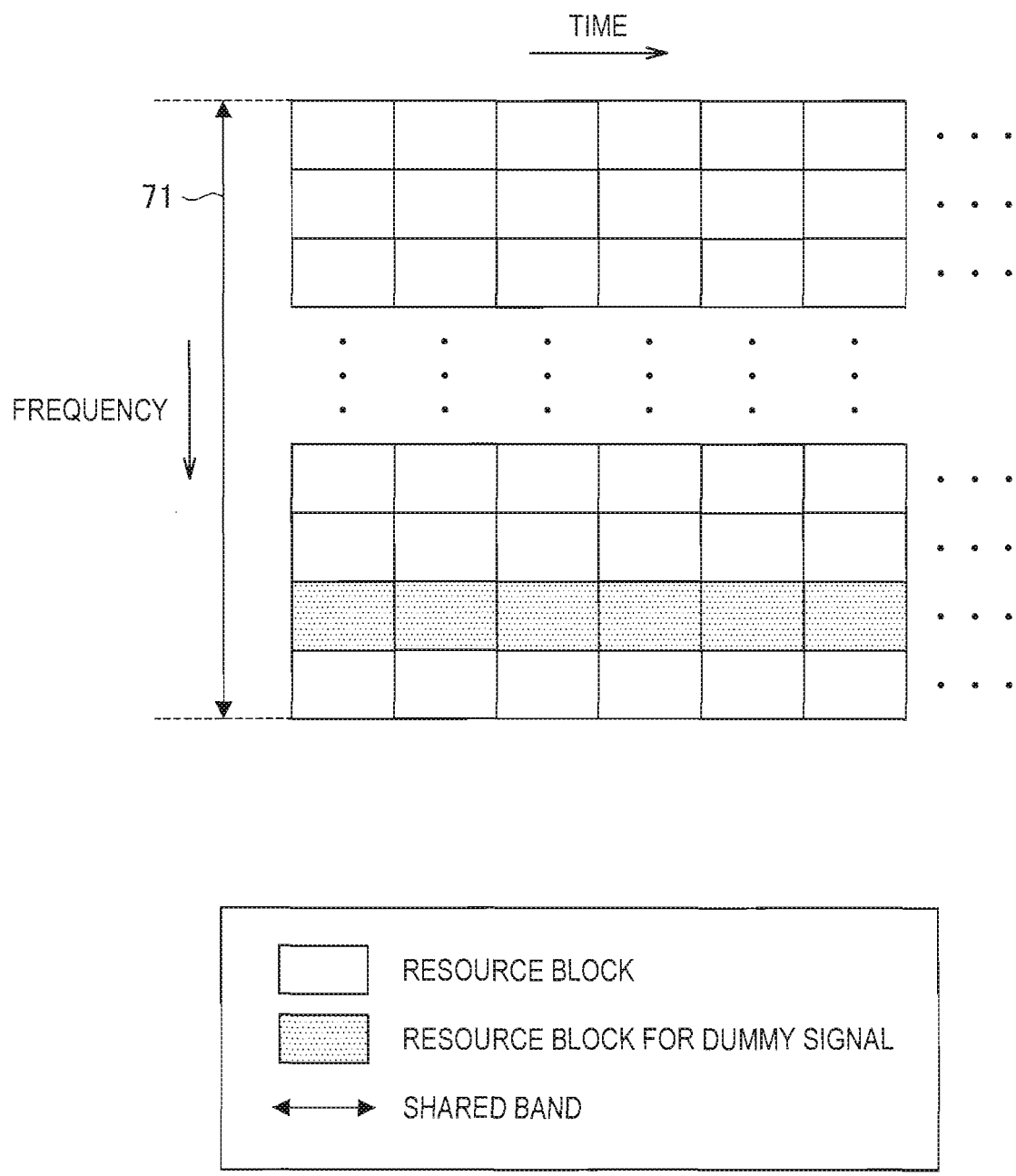
FIG. 23 is an explanatory diagram illustrating an example of some resource blocks (RBs) in which a dummy signal is transmitted.

FIG. 23 is an explanatory diagram illustrating an example of some RBs in which a dummy signal is transmitted. Referring to FIG. 23, a shared band 71 and RBs arranged across a plurality of slots are illustrated. In this example, a dummy signal is transmitted in one specific RB among the RBs arranged in the frequency direction across the shared band 71 within each slot. Also, no dummy signal is transmitted in the other RBs.

FIG. 24 is an explanatory diagram illustrating a first example of an RE in which a dummy signal is transmitted. Referring to FIG. 24, one of some RBs in which the dummy signal (for example, illustrated in FIG. 23) is transmitted is illustrated. In this example, the dummy signal is transmitted in all REs other than a cell-specific reference signal (CRS) RE among REs included in the RB.

Thereby, for example, it is possible to allocate an RB in which no dummy signal is transmitted. Consequently, backward compatibility can be more easily secured.

Also, the dummy signal is transmitted in only one RB in the example of FIG. 23, but, of course, the dummy signal may be transmitted in two or more RBs. Also, an RB band in which the dummy signal is transmitted is common between slots in the example of FIG. 23, but, of course, the RB band in which the dummy signal is transmitted may be different between slots.

Also, the dummy signal is transmitted in all REs except for a CRS RE in the RB in the example of FIG. 24, but, of course, the dummy signal may be transmitted in some REs in the RB. As an example, no dummy signal may be transmitted in one or more sub-carriers among 12 sub-carriers of the RB. As another example, no dummy signal may be transmitted in one or more symbols in which another signal is transmitted. As a specific example, no dummy signal may be transmitted in one or more symbols (that is, first to third OFDM symbols in a first slot of a sub-frame) in which signals of control channels such as a PDCCH and a PCFICH are transmitted. Also, as still another specific example, no dummy signal may be transmitted in one or more symbols in which a data signal is transmitted.

Transmission in each RB

Also, some radio resources mentioned above may be some REs included in each RB arranged in the frequency direction across the above-mentioned shared band. That is, the base station 100-3 may transmit a dummy signal in some REs included in each RB arranged in the frequency direction across the above-mentioned shared band. Hereinafter, in this regard, a specific example will be described with reference to FIG. 25.

FIG. 25 is an explanatory diagram illustrating a second example of an RE in which a dummy signal is transmitted. Referring to FIG. 25, an RB when a dummy signal is transmitted in each RB is illustrated. In this example, the dummy signal is transmitted in one or two specific REs among 12 REs arranged in the frequency direction across an RB within each symbol. Also, no dummy signal is transmitted in other REs.

Also, a dummy signal is transmitted in only REs of two sub-carriers in the example of FIG. 25, but, of course, the dummy signal may be transmitted in an RE of one sub-carrier or may be transmitted in REs of three or more sub-carriers. Also, a sub-carrier of an RE in which the dummy signal is transmitted is common between symbols in the example of FIG. 25, but, of course, the sub-carrier of the RE in which the dummy signal is transmitted may be different between symbols. Also, no dummy signal may be transmitted in one or more symbols in which another signal is transmitted among seven symbols of an RB. As a specific example, no dummy signal may be transmitted in one or more symbols (that is, first to third OFDM symbols of a first slot of a sub-frame) in which signals of control channels such as the PDCCH and the PCFICH are transmitted. As another specific example, no dummy signal may be transmitted in one or more symbols in which the data signal is transmitted.

(f) Transmission of Signal by Plurality of Terminal Devices

Instruction for Plurality of Terminal Devices

For example, the communication control unit 171 instructs each of the plurality of terminal devices 200-3 to transmit a signal using the above-mentioned shared band at any time for the uplink. For example, this instruction can be performed according to RRC signaling or system information.

Thereby, for example, because the plurality of terminal devices 200-3 transmit signals, the signals reach a wider area. Thus, the transmission of a signal using the above-mentioned shared band by the device for performing other wireless communication (for example, wireless LAN communication) can be more reliably suppressed.

Radio Resource for Transmitting Dummy Signal

Also, for example, the communication control unit 171 instructs a plurality of terminal devices to transmit the above-mentioned dummy signal in some radio resources among radio resources arranged in a frequency direction across the above-mentioned shared band in at least a symbol in which neither a data signal nor a control signal of the cellular system 1 is transmitted using the above-mentioned shared band for the uplink.

Specifically, for example, the communication control unit 171 instructs the plurality of terminal devices to transmit the dummy signal. Also, the communication control unit 171 designates a radio resource for transmitting the dummy signal at the time of such an instruction.

Common Radio Resource

Some radio resources mentioned above are common among a plurality of terminal devices 200-3. That is, the communication control unit 171 instructs the plurality of terminal devices 200-3 to transmit the above-mentioned dummy signals in a common radio resource among the above-mentioned plurality of terminal devices 200-3 in at least the above-mentioned symbol for the uplink. Hereinafter, a specific example of the radio resource will be described with reference to FIG. 26.

Figure 26:
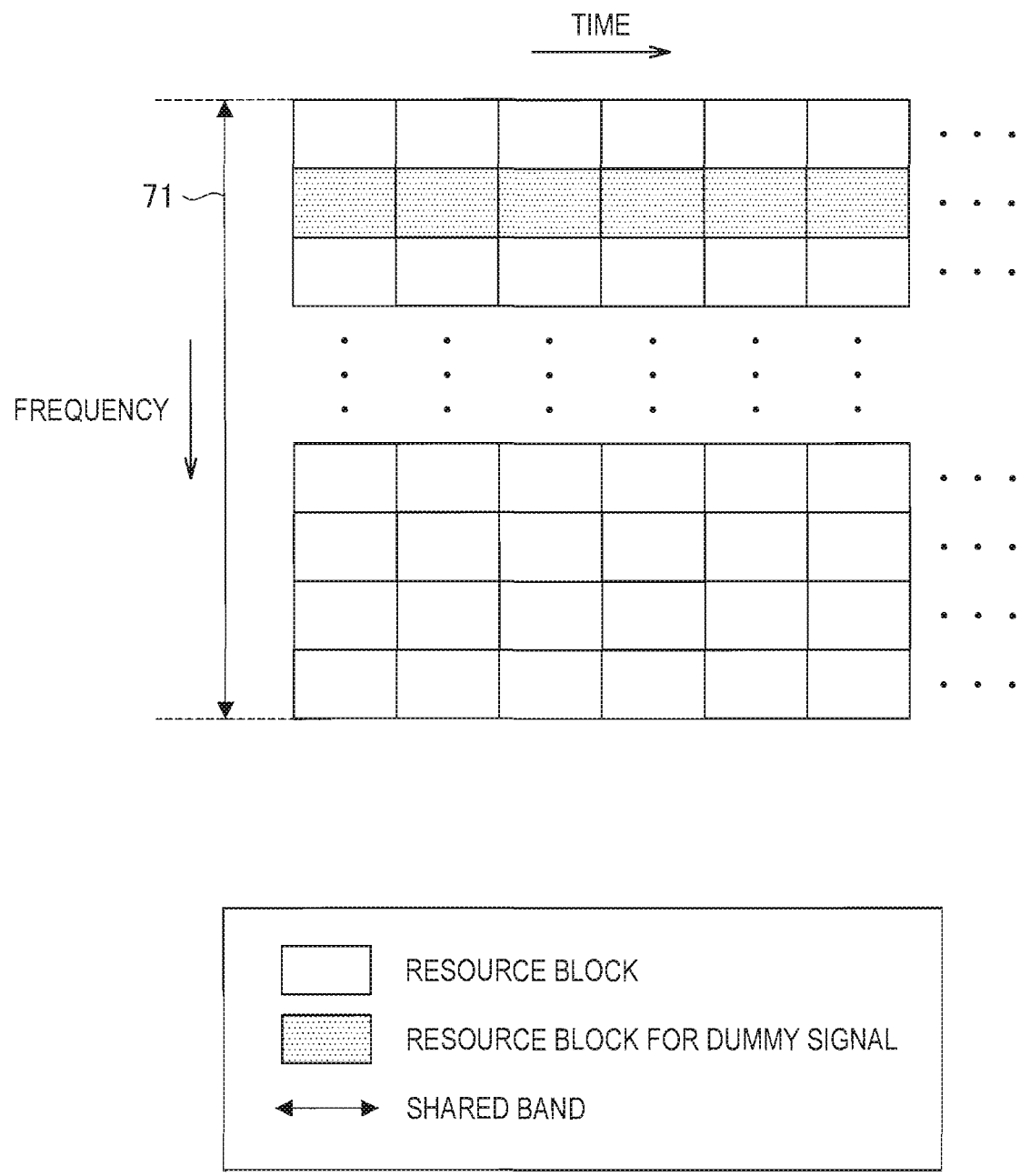
FIG. 26 is an explanatory diagram illustrating a first example of radio resources in which dummy signals are transmitted by a plurality of terminal devices.

FIG. 26 is an explanatory diagram illustrating a first example of radio resources in which dummy signals are transmitted by the plurality of terminal devices 200-3. Referring to FIG. 26, a shared band 71 and RBs arranged across a plurality of slots are illustrated. In this example, the plurality of terminal devices 200-3 transmit the dummy signals in the same RB among the RBs arranged in the frequency direction across the shared band 71 within each slot.

Thereby, for example, in the cellular system 1, it is possible to allocate more RBs in which no dummy signal is transmitted.

Separate Radio Resources

Also, some radio resources mentioned above may be different between at least two of the plurality of terminal devices 200-3. That is, the communication control unit 171 may instruct the at least two of the plurality of terminal devices 200-3 to transmit the above-mentioned dummy signals in different radio resources. Hereinafter, a specific example of the radio resource will be described with reference to FIG. 27.

Figure 27:
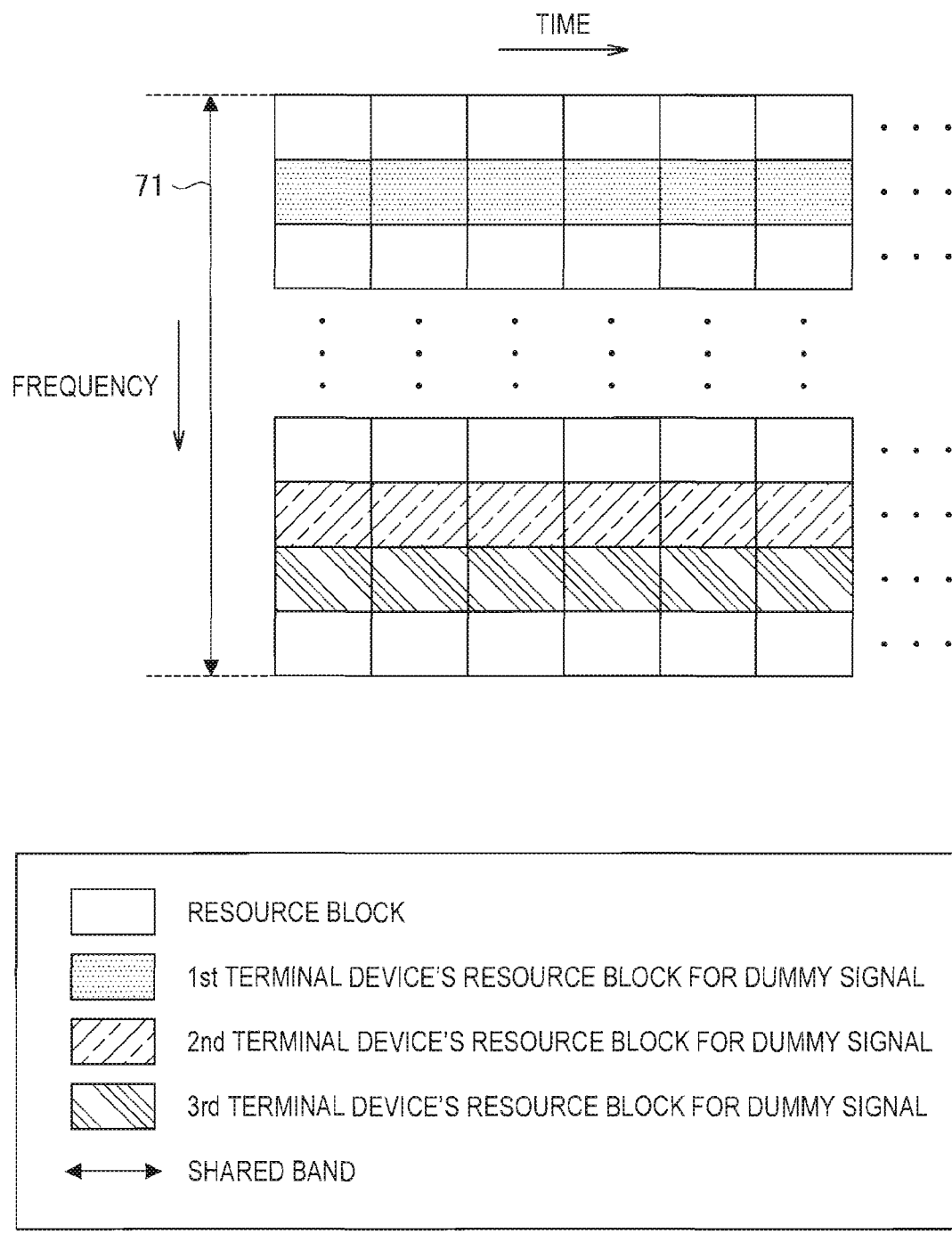
FIG. 27 is an explanatory diagram illustrating a second example of radio resources in which dummy signals are transmitted by a plurality of terminal devices.

FIG. 27 is an explanatory diagram illustrating a second example of radio resources in which dummy signals are transmitted by the plurality of terminal devices 200-3. Referring to FIG. 27, a shared band 71 and RBs arranged across a plurality of slots are illustrated. In this example, first to third terminal devices 200-3 transmit dummy signals in different RBs among the RBs arranged in the frequency direction across the shared band 71 within each slot.

As described above, the communication control unit 171 controls a wireless communication device for performing the cellular communication so that the above-mentioned wireless communication device transmits a signal using the shared band at any time. Thereby, for example, while a frequency band shared between the cellular communication and other wireless communication (for example, wireless LAN communication) (that is, a shared band) is used in the cellular communication, it is possible to prevent the above-mentioned frequency band from being used in the above-mentioned other wireless communication. Also, according to this technique, for example, a wireless LAN communication device which cannot set the NAV can be prevented from using the above-mentioned frequency band (that is, the shared band).

<5.3. Configuration of Base Station>

Figure 28:
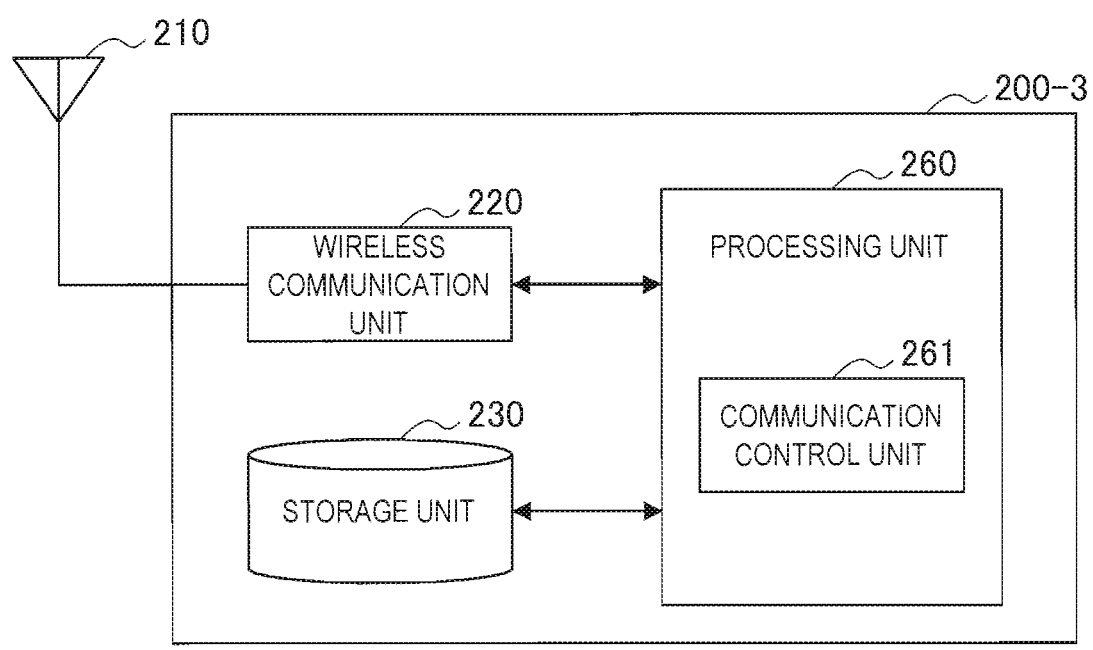
FIG. 28 is a block diagram illustrating an example of a configuration of a terminal device according to the third embodiment.

Next, an example of the configuration of terminal device 200-3 according to the third embodiment will be described with reference to FIGS. 28. FIG. 28 is a block diagram illustrating an example of the configuration of the terminal device 200-3 according to the third embodiment. Referring to FIG. 28, the terminal device 200-3 is equipped with an antenna unit 210, a wireless communication unit 220, a storage unit 230, and a processing unit 260.

Here, the description of the antenna unit 210, the wireless communication unit 220, and the storage unit 230 is not different between the first embodiment and the third embodiment, except for a difference of reference signs. Consequently, here, only the processing unit 260 will be described and redundant description will be omitted.

(Processing Unit 260)

The processing unit 260 provides various functions of the terminal device 200-3. The processing unit 260 includes a communication control unit 261. Also, the processing unit 260 can further include another component in addition to the communication control unit 261.

(Communication Control Unit 261)

The communication control unit 261 controls the terminal device 200-3 so that the terminal device 200-3 transmits a signal using a shared band at any time for the uplink. The above-mentioned shared band is a frequency band to be shared between cellular communication and other wireless communication.

Also, the above-mentioned frequency band is an uplink band when an FDD is adopted or downlink and uplink bands when a TDD is adopted.

(a) Other Wireless Communication and Unit of Time

For example, the above-mentioned other wireless communication is wireless communication (that is, wireless LAN communication) conforming to the wireless LAN standard.

Also, for example, the communication control unit 261 controls the terminal device 200-3 so that the terminal device 200-3 transmits a signal using the above-mentioned shared band in each symbol. The above-mentioned symbol is, for example, an SC-FDMA symbol.

(b) Trigger of Control

For example, the communication control unit 261 controls the terminal device 200-3 so that the terminal device 200-3 transmits a signal using a shared band at any time according to an instruction by the base station 100-3.

(c) Transmission Power

For example, the communication control unit 261 controls e terminal device 200-3 so that transmission power of a signal to be transmitted using the above-mentioned shared band is greater than or equal to predetermined transmission power at any time. Specifically, for example, the communication control unit 261 allocates power greater than or equal to the above-mentioned predetermined transmission power to a signal to be transmitted using the above-mentioned shared band in each symbol. Also, for example, the predetermined transmission power is indicated by the base station 100-3.

Thereby, for example, in a device for performing other wireless communication (for example, wireless LAN communication), reception power of the above-mentioned signal can reach desired power. As a result, the device can reliably avoid the transmission of a signal using the above-mentioned shared band.

(d) Technique of Transmission of Signal

Transmission of Dummy Signal

For example, the communication control unit 261 controls the terminal device 200-3 so that the terminal device 200-3 transmits a dummy signal using the above-mentioned shared band in at least a symbol in which neither a data signal nor a control signal of the cellular system 1 is transmitted using the above-mentioned shared band. Thereby, for example, it is possible to reliably transmit a signal in each symbol of uplink.

Also, the description of a specific technique of transmission of a dummy signal by the terminal device 200-3 is the same as the description of the specific technique of transmission of a dummy signal by the base station 100-3 described above, except for a difference related to a link direction (downlink and uplink). Consequently, here, redundant description will be omitted.

As described above, the communication control unit 261 controls the terminal device 200-3 so that the terminal device 200-3 transmits a signal using the shared band at any time. Thereby, it is possible to prevent a frequency band shared between cellular communication and other wireless communication (for example, wireless LAN communication) (that is, a shared band) from being used in the above-mentioned other wireless communication, for example, while the above-mentioned frequency band is used in the uplink communication.

<5.4. Flow of Process>

Next, an example of a process according to the third embodiment will be described with reference to FIGS. 29 and 30.

(Process by Base Station)

Figure 29:
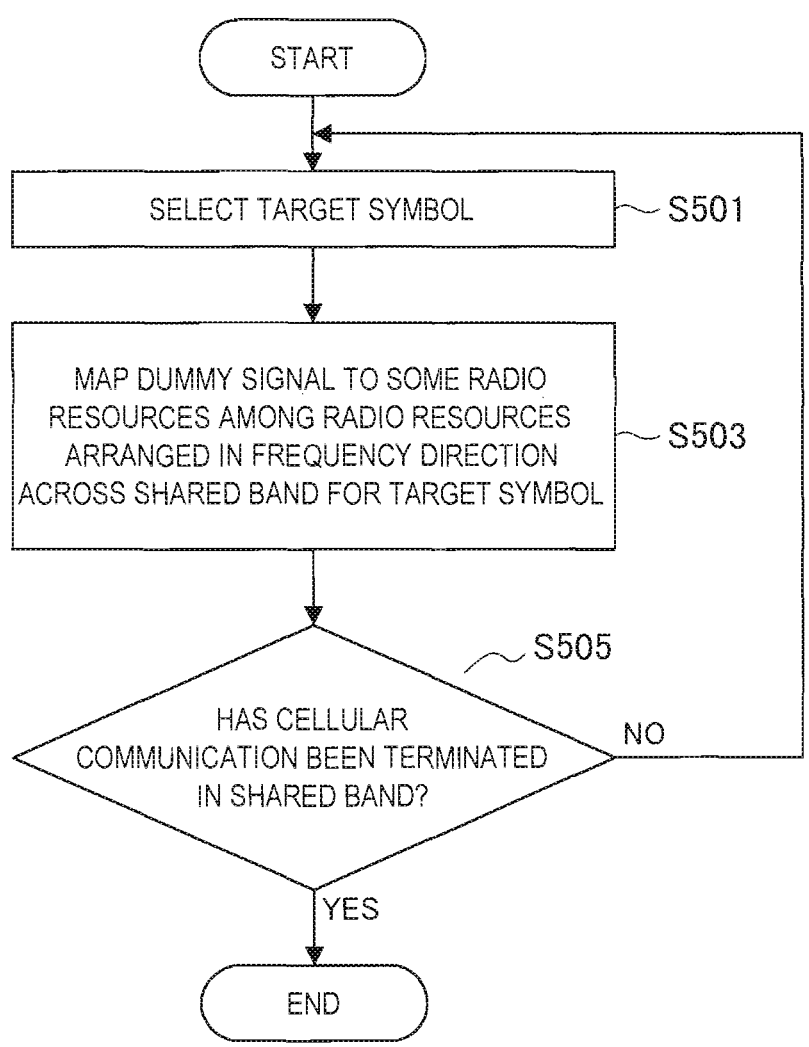
FIG. 29 is a flowchart illustrating an example of a schematic flow of a process by a base station according to the third embodiment.

FIG. 29 is a flowchart illustrating an example of a schematic flow of a process by the base station 100-3 according to the third embodiment.

The communication control unit 171 selects a target symbol (S501).

The communication control unit 171 maps a dummy signal to some radio resources among radio resources arranged in the frequency direction across the shared band for the target symbol (S503).

When cellular communication using the shared band has been terminated (S505: YES), the process ends. Otherwise (S505: NO), the communication control unit 171 selects the next symbol as the target symbol (S501).

(Process by Terminal Device)

Figure 30:
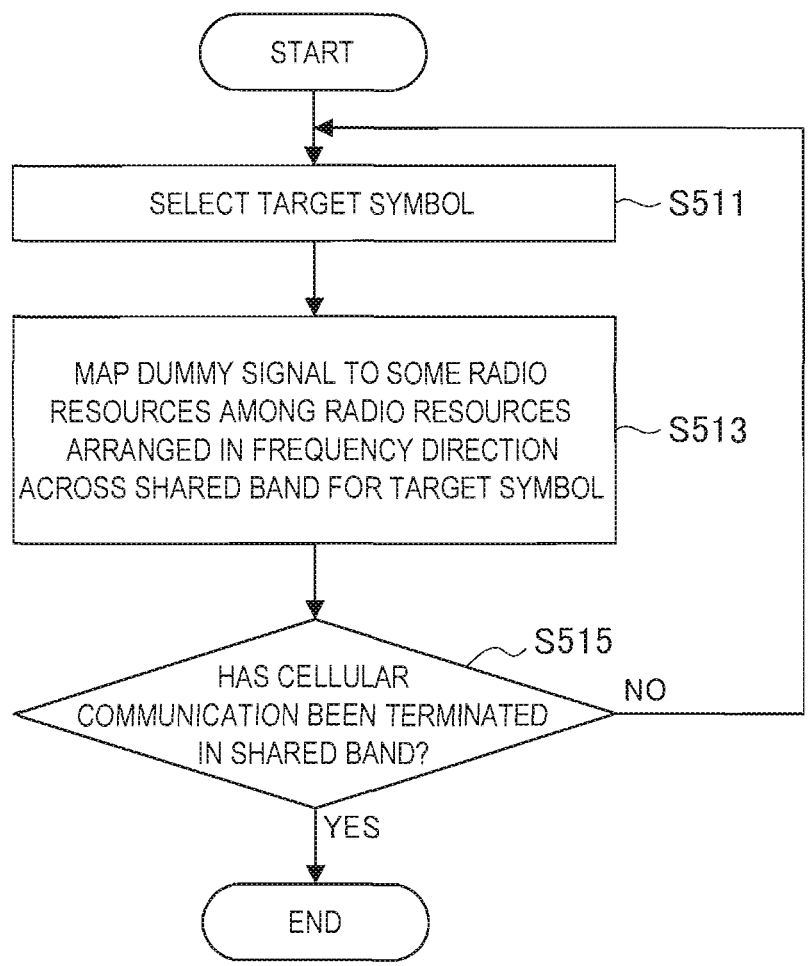
FIG. 30 is a flowchart illustrating an example of a schematic flow of a process by the terminal device according to the third embodiment.

FIG. 30 is a flowchart illustrating an example of a schematic flow of a process by the terminal device 200-3 according to the third embodiment. The process is executed by the terminal device 200-3 according to an instruction by the base station 100-3.

The communication control unit 261 selects a target symbol (S511).

The communication control unit 261 maps a dummy signal to some radio resources among radio resources arranged in the frequency direction across the shared band for the target symbol (S513).

When the cellular communication using the shared band has been terminated (S515: YES), the process ends. Otherwise (S515: NO), the communication control unit 261 selects the next symbol as the target symbol (S511).

<5.5. Modified Example>

(Summary)

In the above-mentioned example of the third embodiment, for example, the base station 100-3 instructs the terminal device 200-3 to transmit a signal using a shared band (for example, in each symbol) at any time for the uplink. Also, for example, the terminal device 200-3 transmits a signal using the shared band (for example, in each symbol) at any time according to an instruction by the base station 100-3.

On the other hand, in the modified example of the third embodiment, the terminal device 200-3 transmits a signal using the shared band at any time (for example, in each symbol) independently without depending upon the instruction by the base station 100-3.

Thereby, for example, while a frequency band shared between cellular communication and other wireless communication (that is, a shared band) is used in wireless communication between the terminal devices (for example, D2D communication or wireless communication within the LN) in the cellular system, the above-mentioned frequency band can be prevented from being used in the above-mentioned other wireless communication.

(Terminal Device 200-3: Communication Control Unit 261)

In the modified example of the third embodiment, the communication control unit 261 controls the terminal device 200-3 so that the terminal device 200-3 transmits a signal using the shared band at any time.

The description of the communication control unit 261 in this regard is the same as the corresponding description for the communication control unit 261 according to the above-mentioned third embodiment, except for differences related to the involvement of a base station and a link direction. Consequently, here, redundant description will be omitted.

Also, in the above-mentioned example of the third embodiment, for example, the communication control unit 261 controls the terminal device 200-3 so that the terminal device 200-3 transmits a signal using the shared band at any time according to an instruction by the base station 100-3. On the other hand, in the modified example of the third embodiment, the communication control unit 261 controls the terminal device 200-3 so that the terminal device 200-3 transmits a signal using the shared band at any time independently (for example, in a period in which the shared band is used in the cellular communication).

Also, in the above-mentioned example of the third embodiment, for example, the communication control unit 261 controls the terminal device 200-3 so that the terminal device 200-3 transmits a signal using the shared band at any time for the uplink. On the other hand, in the modified example of the third embodiment, for example, the communication control unit 261 controls the terminal device 200-3 so that the terminal device 200-3 transmits a signal using a shared band at any time during wireless communication between the terminal devices in the cellular system 1.

(Flow of Process)

An example of the process of the terminal device 200-3 according to the modified example of the third embodiment is the same as the example of the process of the terminal device 200-3 described with reference to FIG. 30. Consequently, here, redundant description will be omitted.

<5.6. Combination of Third Embodiment and First Embodiment/Second Embodiment>

(Combination of Third Embodiment and First Embodiment)

The third embodiment may be combined with the above-mentioned first embodiment. For example, an operation according to the third embodiment may be applied to the above-mentioned first embodiment.

For example, the communication control unit 151 of the base station 100-1 may further perform an operation of the communication control unit 171 of the base station 100-3 and the communication control unit 241 of the terminal device 200-1 may further perform an operation of the communication control unit 261 of the terminal device 200-3.

Specifically, a technique according to the third embodiment may be used, for example, when a shared band is occupied for cellular communication during a first period in the first embodiment. Specifically, for example, the wireless communication device (for example, the base station 100 or the terminal device 200) for performing the cellular communication may transmit a signal using the shared band at any time (for example, in each symbol) during the first period. Thereby, for example, the use of the shared band for other wireless communication (for example, wireless LAN communication) is prevented during the first period. Consequently, the shared band can be more reliably occupied for the cellular communication.

(Combination of Third Embodiment and Second Embodiment)

The third embodiment may be combined with the above-mentioned second embodiment. For example, an operation according to the third embodiment may be applied to the above-mentioned second embodiment.

For example, the communication control unit 161 of the base station 100-2 may further perform an operation of the communication control unit 171 of the base station 100-3 and the communication control unit 251 of the terminal device 200-2 may further perform an operation of the communication control unit 261 of the terminal device 200-3.

Specifically, a technique according to the third embodiment may be used, for example, when a signal is transmitted using a shared band in the second embodiment. Specifically, for example, the wireless communication device (for example, the base station 100 or the terminal device 200) for performing the cellular communication may start to transmit a signal using the shared band before a period in which no signal is transmitted using the shared band becomes a DIFS and then transmit a signal using the shared band (for example, in each symbol) at any time (during any period). Thereby, for example, it is possible to more reliably secure the shared band and then continuously use the shared band in the cellular communication.

Also, of course, all the first to third embodiments may be combined.

<<6. Applications>>

Technology according to the present disclosure is applicable to various products. For example, the base station 100 may be implemented as a type of eNB such as a macro eNB or a small eNB. The small eNB may be an eNB to cover a cell smaller than a macro cell such as a pico eNB, a micro eNB, or a home (femto) eNB. Conversely, the base station 100 may also be realized as another type of base station, such as a NodeB or a base transceiver station (BTS). The base station 100 may also include a main unit that controls wireless communication (also called a base station device), and one or more remote radio heads (RRHs) placed in a location separate from the main unit. Also, various types of terminals to be described below temporarily or semi-permanently execute a base station function and therefore may operate as the base station 100.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, at least a part of constituent elements of the terminal device 200 may be realized as a module mounted onboard these terminals (for example, an integrated circuit module configured on a single die).

<6.1. Application Examples Regarding Base Station>
(First Application Example)

Figure 31:
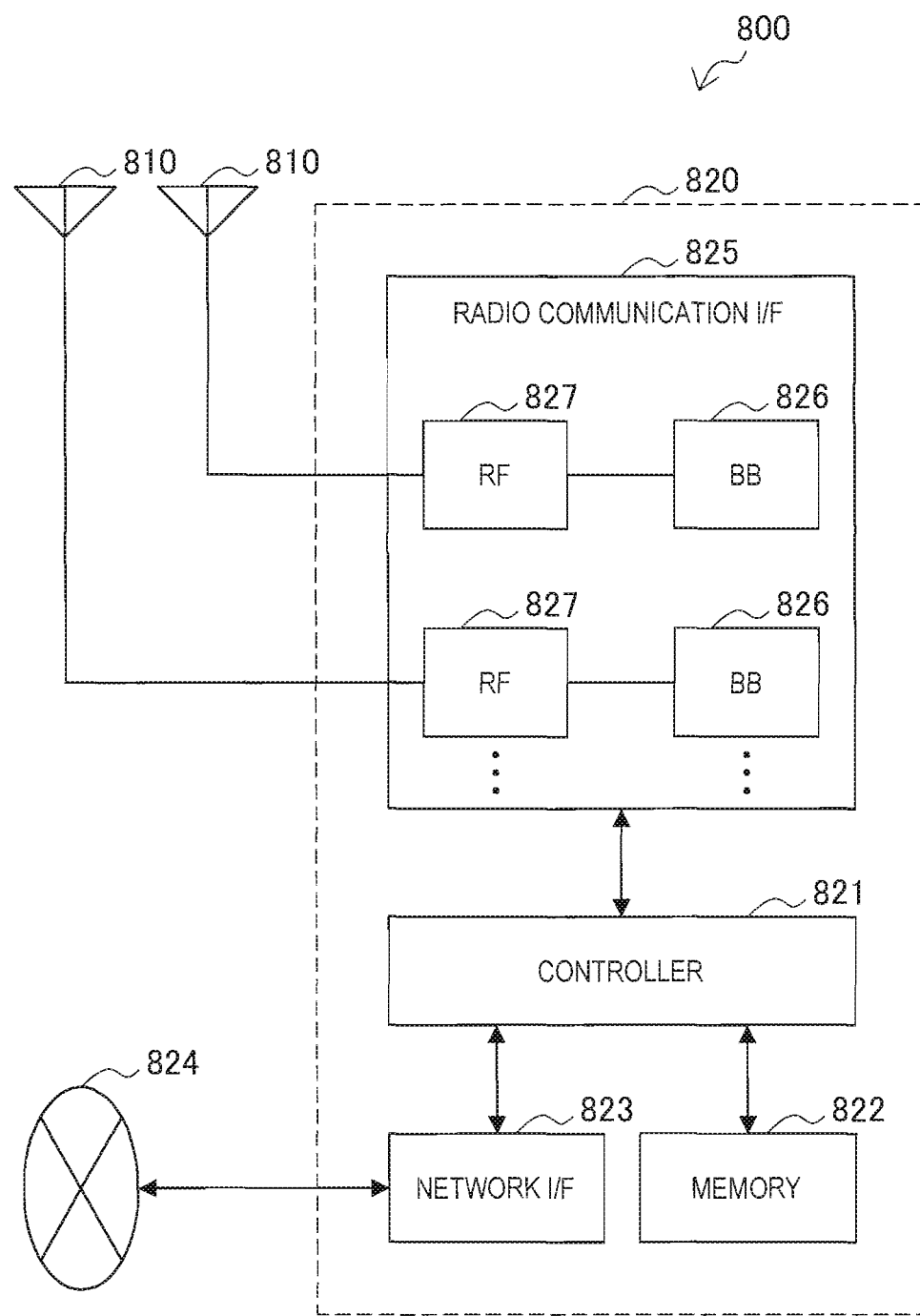
FIG. 31 is a block diagram illustrating a first example of a schematic configuration of an eNB.

FIG. 31 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MEMO antenna), and is used for the base station device 820 to transmit and receive radio signals. The eNB 800 may include the multiple antennas 810, as illustrated in FIG. 31. For example, the multiple antennas 810 may be compatible with multiple frequency bands used by the eNB 800. Although FIG. 31 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as LTE and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-mentioned logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 31. For example, the multiple BB processors 826 may be compatible with multiple frequency bands used by the eNB 800. The wireless communication interface 825 may include the multiple RF circuits 827, as illustrated in FIG. 31. For example, the multiple RF circuits 827 may be compatible with multiple antenna elements. Although FIG. 31 illustrates the example in which the wireless communication interface 825 includes the multiple BB processors 826 and the multiple RF circuits 827, the wireless communication interface 825 may also include a single BB processor 826 or a single RF circuit 827.

Furthermore, in addition to a cellular communication scheme, the wireless communication interface 825 may support a radio LAN communication scheme. In that case, the wireless communication interface 825 may include the BB processor 826 and the RF circuit 827 in the radio LAN communication scheme.

In the eNB 800 illustrated in FIG. 31, the communication control unit 151 described with reference to FIG. 6 may be implemented in the wireless communication interface 825 (for example, the BB processor). Alternatively, at least a part of the communication control unit 151 may be implemented in the controller 821. As one example, the eNB 800 is equipped with a module including a part (for example, the BB processor 826) or all of the wireless communication interface 825 and/or the controller 821, and the communication control unit 151 may be implemented in the module. In this case, the above-mentioned module may store a program for causing the processor to function as the communication control unit 151 (in other words, a program for causing the processor to execute the operation of the communication control unit 151) and execute the program. As another example, a program for causing the processor to function as the communication control unit 151 is installed in the eNB 800, and the wireless communication interface 825 (for example, the BB processor 826) and/or the controller 821 may execute the program. As mentioned above, the eNB 800, the base station device 820, or the above-mentioned module may be provided as the device including the communication control unit 151, and the program for causing the processor to function as the communication control unit 151 may be provided. Also, a readable storage medium storing the above-mentioned program may be provided. With respect to these points, the communication control unit 161 described with reference to FIG. 16 and the communication control unit 171 described with reference to FIG. 22 are also similar to the communication control unit 151.

Also, in the eNB 800 illustrated in FIG. 31, the wireless communication unit 120 described with reference to FIG. 6 may be implemented in the wireless communication interface 825 (for example, the RF circuit 827). Also, the antenna unit 110 may be implemented in the antenna 810. Also, the network communication unit 130 may be implemented in the controller 821 and/or the network interface 823.

(Second Application Example)

Figure 32:
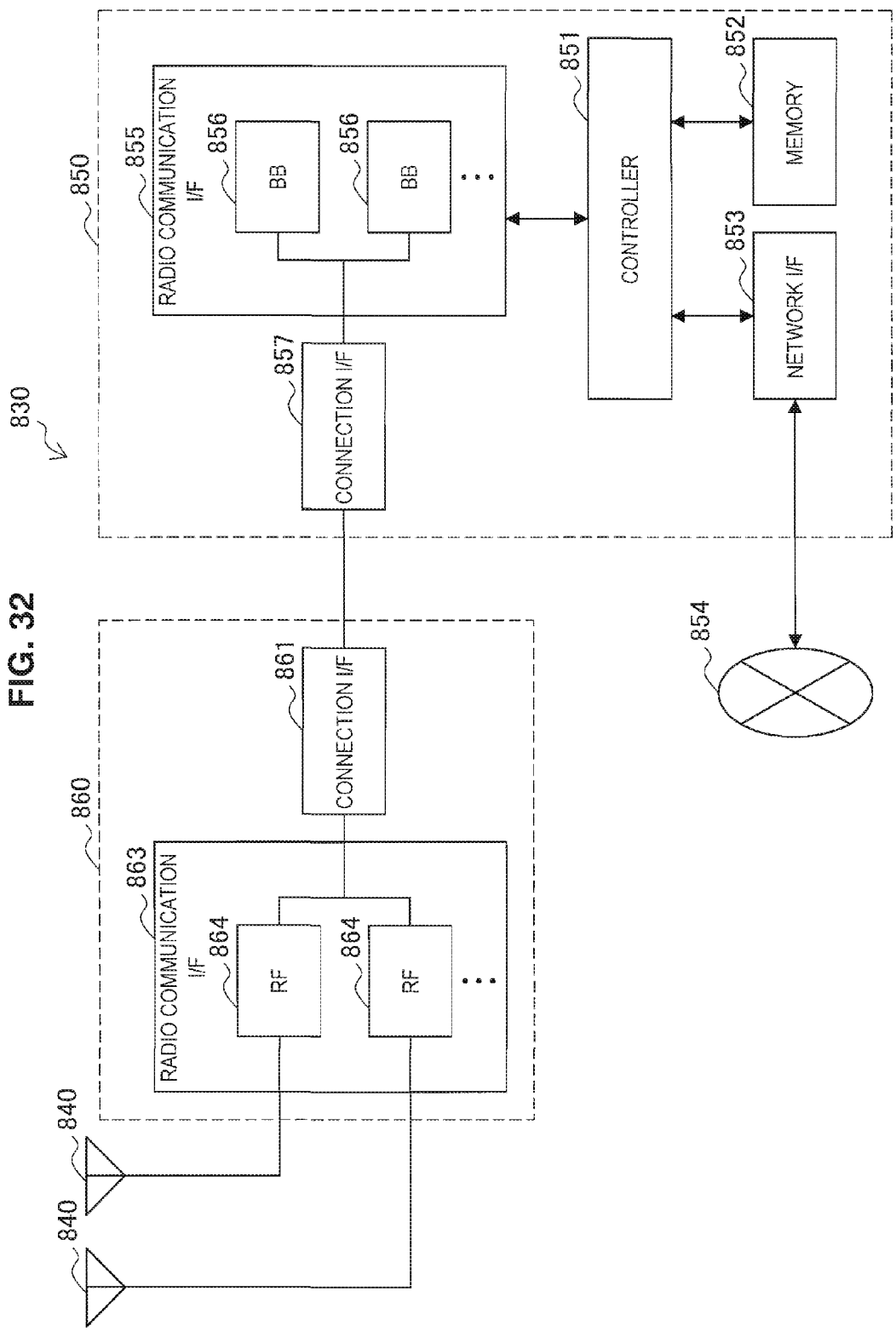
FIG. 32 is a block diagram illustrating a second example of a schematic configuration of an eNB.

FIG. 32 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 32. For example, the multiple antennas 840 may be compatible with multiple frequency bands used by the eNB 830. Although FIG. 32 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 31.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 31, except the BB processor 856 is connected to the RF circuit 864 of the RRH 860 via the connection interface 857. The wireless communication interface 855 may include the multiple BB processors 856, as illustrated in FIG. 32. For example, the multiple BB processors 856 may be compatible with multiple frequency bands used by the eNB 830. Although FIG. 32 illustrates the example in which the wireless communication interface 855 includes the multiple BB processors 856, the wireless communication interface 855 may also include a single BB processor 856.

Furthermore, in addition to a cellular communication scheme, the wireless communication interface 855 may support a radio LAN communication scheme. In that case, the wireless communication interface 825 may include the BB processor 856 in the radio LAN communication scheme.

The connection interface 857 is an interface for connecting the base station device 850 (wireless communication interface 855) to the RRH 860. The connection interface 857 may also be a communication module for communication in the above-mentioned high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-mentioned high speed line.

The wireless communication interface 863 transmits and receives radio signals via the antenna 840. The wireless communication interface 863 may typically include, for example, the RE circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 32. For example, the multiple RE circuits 864 may support multiple antenna elements. Although FIG. 32 illustrates the example in which the wireless communication interface 863 includes the multiple RF circuits 864, the wireless communication interface 863 may also include a single RF circuit 864.

In the eNB 830 illustrated in FIG. 32, the communication control unit 151 described with reference to FIG. 6 may be implemented in the wireless communication interface 855 (for example, the BB processor). Alternatively, at least a part of the communication control unit 151 may be implemented in the controller 851. As one example, the eNB 830 is equipped with a module including a part (for example, the BB processor 856) or all of the wireless communication interface 855 and/or the controller 851, and the communication control unit 151 may be implemented in the module. In this case, the above-mentioned module may store a program for causing the processor to function as the communication control unit 151 (in other words, a program for causing the processor to execute the operation of the communication control unit 151) and execute the program. As another example, a program for causing the processor to function as the communication control unit 151 is installed in the eNB 830, and the wireless communication interface 855 (for example, the BB processor 856) and/or the controller 851 may execute the program. As mentioned above, the eNB 830, the base station device 850, or the above-mentioned module may be provided as the device including the communication control unit 151, and the program for causing the processor to function as the communication control unit 151 may be provided. Also, a readable storage medium storing the above-mentioned program may be provided. With respect to these points, the communication control unit 161 described with reference to FIG. 16 and the communication control unit 171 described with reference to FIG. 22 are also similar to the communication control unit 151.

Also, in the eNB 830 illustrated in FIG. 32, the wireless communication unit 120 described, for example, with reference to FIG. 6 may be implemented in the wireless communication interface 863 (for example, the RF circuit 864). Also, the antenna unit 110 may be implemented in the antenna 840. Also, the network communication unit 130 may be implemented in the controller 851 and/or the network interface 853.

<6.2. Application Examples Regarding Terminal Device>
(First Application Example)

Figure 33:
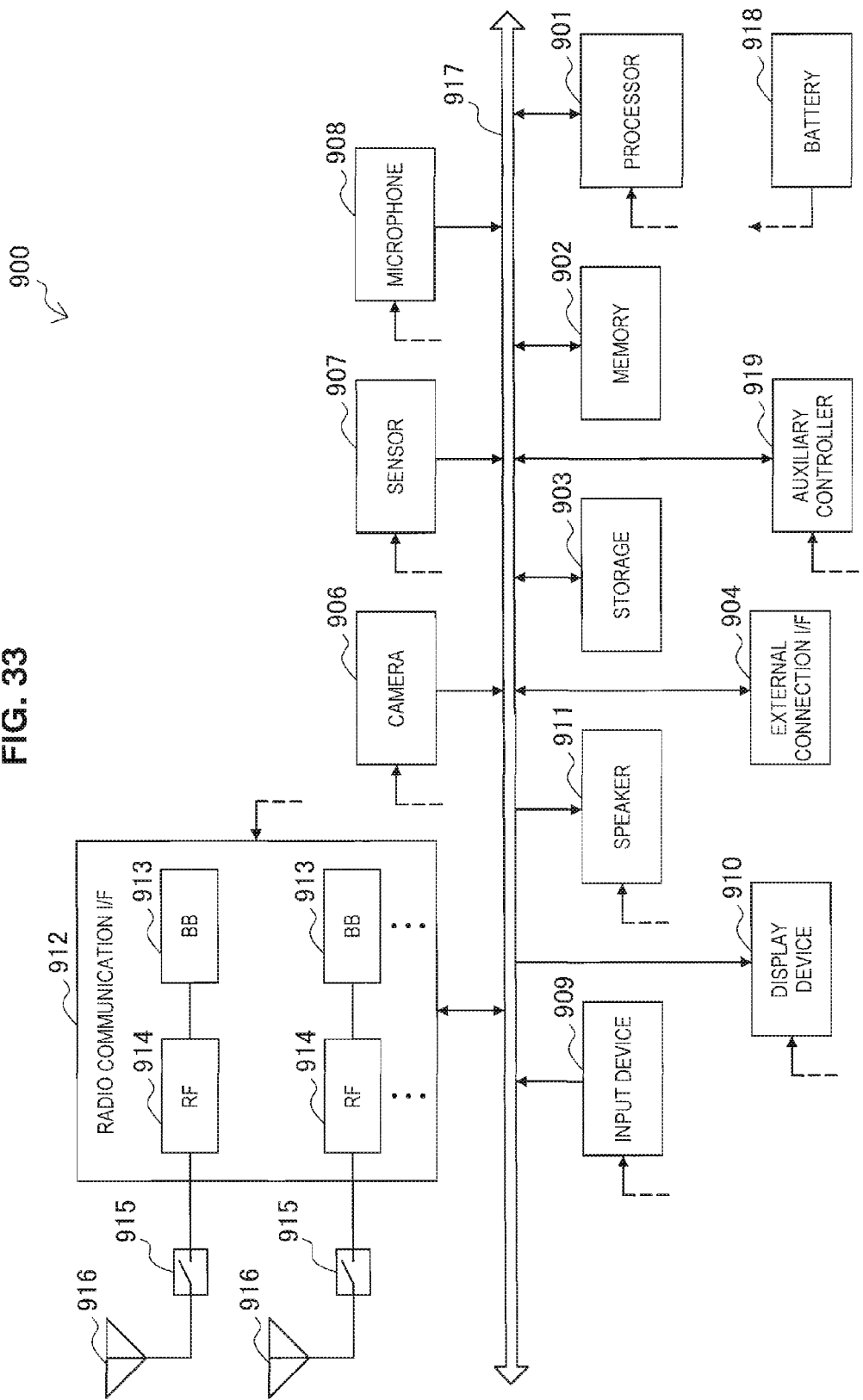
FIG. 33 is a block diagram illustrating an example of a schematic configuration of a smartphone.

FIG. 33 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RE circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 934 and the multiple RF circuits 914, as illustrated in FIG. 33. Although FIG. 33 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support a radio LAN communication scheme. In that case, the wireless communication interface 912 may include the BB processor 913 and the RF circuit 914 in the radio LAN communication scheme. Furthermore, in addition to a cellular communication scheme, the wireless communication interface 912 may support another type of wireless communication scheme such as a short-distance wireless communication scheme and a near field communication scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MEMO antenna), and is used for the wireless communication interface 912 to transmit and receive radio signals. The smartphone 900 may include the multiple antennas 916, as illustrated in FIG. 33. Although FIG. 33 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 33 via feeder lines, which are partially shown as dashed lines in the figure. The auxiliary controller 919 operates a minimum necessary function of the smartphone 900, for example, in a sleep mode.

In the smartphone 900 illustrated in FIG. 33, the communication control unit 241 described with reference to FIG. 11 may be implemented in the wireless communication interface 912 (for example, the BB processor 913). Alternatively, at least a part of the communication control unit 241 may be implemented in the processor 901 or the auxiliary controller 919. As one example, the smartphone 900 is equipped with a module including a part (for example, the BB processor 913) or all of the wireless communication interface 912, the processor 901 and/or the auxiliary controller 919, and the communication control unit 241 may be implemented in the module. In this case, the above-mentioned module may store a program for causing the processor to function as the communication control unit 241 (in other words, a program for causing the processor to execute the operation of the communication control unit 241) and execute the program. As another example, a program for causing the processor to function as the communication control unit 241 is installed in the smartphone 900, and the wireless communication interface 912 (for example, the BB processor 913), the processor 901, and/or the auxiliary controller 919 may execute the program. As mentioned above, the smartphone 900, the base station device 820, or the above-mentioned module may be provided as the device including the communication control unit 241, and the program for causing the processor to function as the communication control unit 241 may be provided. Also, a readable storage medium storing the above-mentioned program may be provided. With respect to these points, the communication control unit 251 described with reference to FIG. 19 and the communication control unit 261 described with reference to FIG. 28 are also similar to the communication control unit 241.

Also, in the smartphone 900 illustrated in FIG. 33, the wireless communication unit 220 described, for example, with reference to FIG. 11 may be implemented in the wireless communication interface 912 (for example, the RF circuit 914). Also, the antenna unit 210 may be implemented in the antenna 916.

(Second Application Example)

Figure 34:
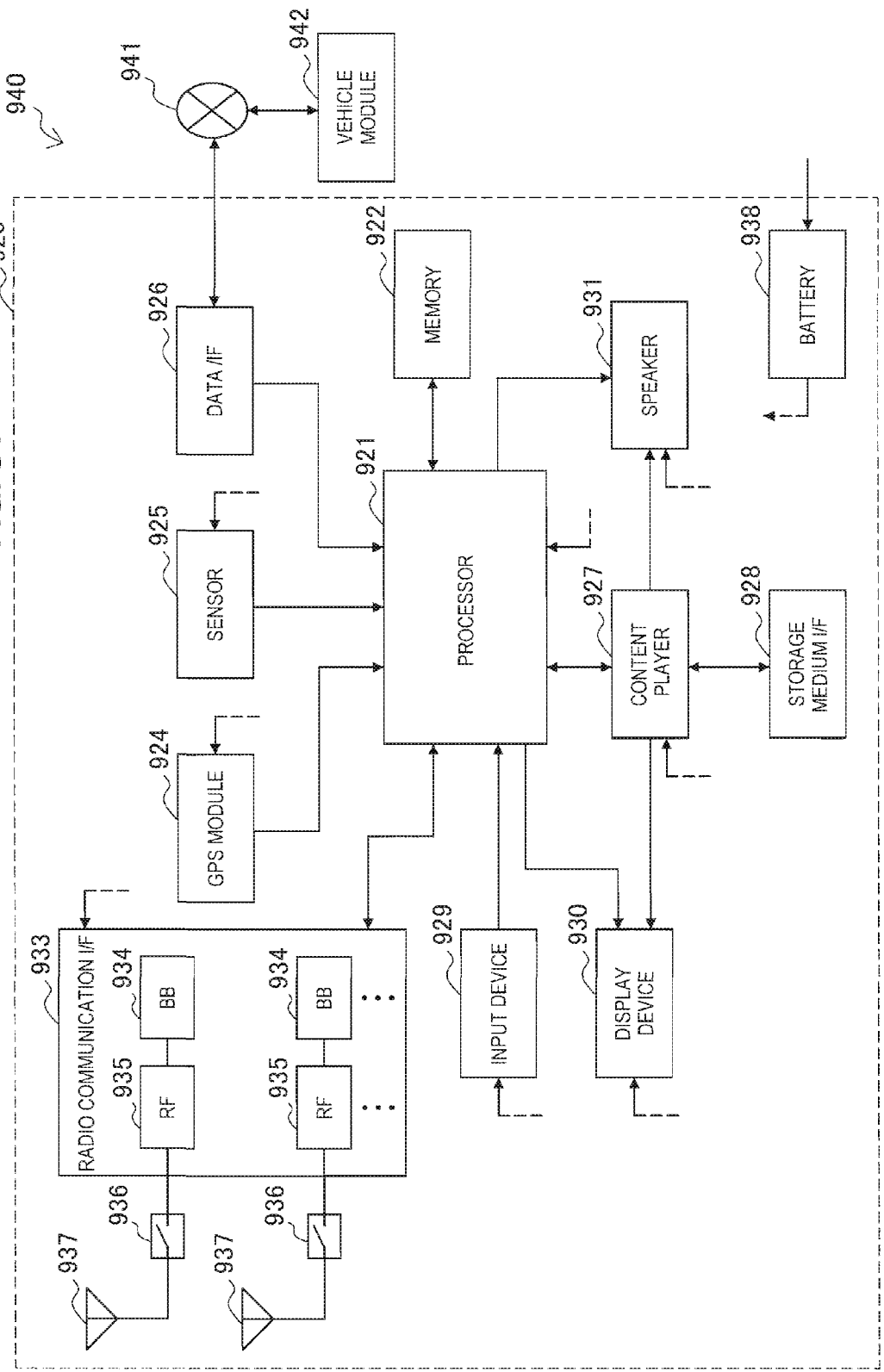
FIG. 34 is a block diagram illustrating an example of a schematic configuration of a car navigation device.

FIG. 34 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LTE and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 34. Although FIG. 34 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support a radio LAN communication scheme. In that case, the wireless communication interface 933 may include the BB processor 934 and the RF circuit 935 in the radio LAN communication scheme. Furthermore, in addition to a cellular communication scheme, the wireless communication interface 933 may support another type of wireless communication scheme such as a short-distance wireless communication scheme and a near field communication scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 34. Although FIG. 34 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 34 via feeder lines that are partially shown as dashed lines in the figure. The battery 938 accumulates power supplied form the vehicle.

In the car navigation device 920 illustrated in FIG. 34, the communication control unit 241 described with reference to FIG. 11 may be implemented in the wireless communication interface 933 (for example, the BB processor 934). Alternatively, at least a part of the communication control unit 241 may be implemented in the processor 921. As one example, the car navigation device 920 is equipped with a module including a part (for example, the BB processor 934) or all of the wireless communication interface 933, and/or processor 921, and the communication control unit 241 may be implemented in the module. In this case, the above-mentioned module may store a program for causing the processor to function as the communication control unit 241 (in other words, a program for causing the processor to execute the operation of the communication control unit 241) and execute the program. As another example, a program for causing the processor to function as the communication control unit 241 is installed in the car navigation device 920, and the wireless communication interface 933 (for example, the BB processor 934), and/or the processor 921 may execute the program. As mentioned above, the car navigation device 920, the base station device 820, or the above-mentioned module may be provided as the device including the communication control unit 241, and the program for causing the processor to function as the communication control unit 241 may be provided. Also, a readable storage medium storing the above-mentioned program may be provided. With respect to these points, the communication control unit 251 described with reference to FIG. 19 and the communication control unit 261 described with reference to FIG. 28 are also similar to the communication control unit 241.

Also, in the car navigation device 920 illustrated in FIG. 34, the wireless communication unit 220 described, for example, with reference to FIG. 11 may be implemented in the wireless communication interface 933 (for example, the RF circuit 935). Also, the antenna unit 210 may be implemented in the antenna 937.

The technology of the present disclosure may also be realized as an in-vehicle system (or a vehicle) 940 including one or more blocks of the car navigation device 920, the in-vehicle network 941, and a vehicle module 942. That is, the in-vehicle system (or the vehicle) 940 may be provided as a device including the communication control unit 241 (or the communication control unit 251 or 261). The vehicle module 942 generates vehicle data such as vehicle speed, engine speed, and trouble information, and outputs the generated data to the in-vehicle network 941.

<<7. Conclusion>>

The devices and the processes according to the embodiments of the present disclosure have been described with reference to FIGS. 1 to 34.

(First Embodiment)

According to the first embodiment, a frequency band shared between cellular communication and other wireless communication (that is, a shared band) is occupied for the above-mentioned cellular communication during the first period, and released from the above-mentioned cellular communication during at least a second period corresponding to the above-mentioned first period.

Thereby, for example, it is possible to secure an opportunity to use the above-mentioned frequency band (that is, the shared band) in the above-mentioned other wireless communication and continuously use the frequency band for cellular communication for a certain amount of time.

(Second Embodiment)

According to the second embodiment, for example, before a period in which no signal is transmitted using a frequency band shared between cellular communication and wireless LAN communication (that is, a shared band) becomes a DIFS, a wireless communication device for performing the cellular communication is controlled so that the above-mentioned wireless communication device starts to transmit a signal using the above-mentioned frequency band.

Thereby, for example, it is possible to more reliably secure the above-mentioned frequency band for cellular communication.

Also, according to the second embodiment, for example, during a period until a radio frame for another frequency band to be used in cellular communication starts, a wireless communication device for performing the cellular communication is controlled so that the wireless communication device transmits a dummy signal using a frequency band shared between the cellular communication and wireless LAN communication (that is, a shared band).

Thereby, for example, it is possible to more reliably secure the above-mentioned frequency band for the cellular communication.

(Third Embodiment)

According to the third embodiment, a wireless communication device for performing cellular communication is controlled so that the above-mentioned wireless communication device transmits a signal using a frequency band (that is, shared band) shared between the cellular communication and other wireless communication.

Thereby, for example, a frequency band shared between the cellular communication and the other wireless communication (for example, wireless LAN communication) can be prevented from being used in the above-mentioned other wireless communication while the frequency band is used for the cellular communication.

As described above, according to the embodiment of the present disclosure, for example, it is possible to more appropriately use a frequency band shared between wireless communication of a cellular system and other wireless communication in the above-mentioned cellular system.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Although an example in which the cellular system is a system conforming to LTE, LTE-Advanced, or a compliant communication scheme has been described, the present disclosure is not limited to such an example. For example, the communication system may be a system conforming to another communication standard.

Also, for example, an example in which other wireless communication different from wireless communication of the cellular system is wireless LAN communication (that is, wireless communication conforming to the wireless LAN standard) has been described, but the present disclosure is not limited to the relevant examples. For example, the above-mentioned other wireless communication may be wireless communication (wireless communication conforming to another communication standard adopting CSMA) other than the wireless LAN communication.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Also, it is possible to create a computer program for causing the processor (for example, a CPU, a DSP, etc.) provided in a device (for example, the base station and/or the terminal device) of the present description to function as the components (for example, the communication control unit) of the above-mentioned device other words, a computer program for causing the above-mentioned processor to execute the operation of the components of the above-mentioned device). Also, a storage medium storing the computer program may be provided. Also, a device (for example, a completed product or a module (a component, a processing circuit, a chip, etc.) for a completed product) including a memory that stores the above-mentioned computer program and one or more processors capable of executing the above-mentioned computer program may be provided. Also, a method including the operation of the components of the above-mentioned device (for example, the communication control unit) is included in the technology according to the present disclosure.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

Additionally, the present technology may also be configured as below.

(1)

A device including:

a control unit configured to occupy a frequency band shared between wireless communication of a cellular system and other wireless communication for the wireless communication of the cellular system during a first period and release the frequency band from the wireless communication of the cellular system during at least a second period corresponding to the first period.

(2)

The device according to (1), wherein the first period is a period of one or more radio frames of the cellular system.

(3)

The device according to (1), wherein the first period is a continuous period.

(4)

The device according to (3), wherein the second period is a period immediately before or immediately after the first period.

(5)
The device according to (4), wherein the second period is a continuous period immediately after the first period.
(6)
The device according to (4), wherein the second period is a period immediately before the first period and a period immediately after the first period.
(7)
The device according to (4), wherein the second period is a continuous period immediately before the first period.
(8)
The device according to (3),
wherein the first period is a discontinuous period, and
wherein the control unit occupies the frequency band for the wireless communication of the cellular system during the first period and releases the frequency band from the wireless communication of the cellular system during at least the second period, within a third period.
(9)
The device according to any one of (1) to (8), wherein the second period has a length which is 90% to 110% of a length of the first period.
(10)
The device according to any one of (1) to (9), wherein the control unit occupies the frequency band for the wireless communication of the cellular system during the first period by controlling a wireless communication device for performing wireless communication of the cellular system so that the wireless communication device for performing the wireless communication of the cellular system transmits a signal using the frequency band during the first period.
(11)
The device according to (10), wherein the control unit controls the wireless communication device so that the wireless communication device transmits a signal using the frequency band at any time.
(12)
The device according to (11), wherein the control unit controls the wireless communication device so that transmission power of a signal to be transmitted using the frequency band is greater than or equal to predetermined transmission power at any time.
(13)
The device according to (11) or (12), wherein the control unit controls the wireless communication device so that the wireless communication device transmits a signal using the frequency band in each symbol.
(14)
The device according to (13), wherein the control unit controls the wireless communication device so that the wireless communication device transmits a dummy signal using the frequency band in at least a symbol in which neither a data signal nor a control signal of the cellular system is transmitted using the frequency band.
(15)
The device according to (14), wherein the control unit controls the wireless communication device so that the wireless communication device transmits the dummy signal in some radio resources among radio resources arranged in a frequency direction across the frequency band in at least the symbol.
(16)
The device according to (15), wherein the some radio resources are some resource blocks among resource blocks arranged in a frequency direction across the frequency band.

(17)
The device according to (15), wherein the some radio resources are some resource elements included in each resource block arranged in a frequency direction across the frequency band.
(18)
The device according to any one of (11) to (17),
wherein the device is a base station for performing wireless communication of the cellular system, a base station device for the base station, or a module for the base station device, and
wherein the control unit instructs a terminal device for performing wireless communication of the cellular system to transmit a signal using the frequency band at any time for an uplink.
(19)
The device according to (18), wherein the control unit instructs each of a plurality of terminal devices for performing wireless communication of the cellular system to transmit a signal using the frequency band at any time for an uplink.
(20)
The device according to (18) or (19),
wherein the control unit instructs a plurality of terminal devices to transmit dummy signals in some radio resources among radio resources arranged in a frequency direction across the frequency band in at least a symbol in which neither a data signal nor a control signal of the cellular system is transmitted using the frequency band for an uplink, and
wherein the some radio resources are common among a plurality of terminal devices.
(21)
The device according to any one of (11) to (17),
wherein the device is a terminal device for performing wireless communication of the cellular system or a module for the terminal device, and
wherein the control unit controls the terminal device so that the terminal device transmits a signal using the frequency band at any time for an uplink.
(22)
The device according to any one of (1) to (9),
wherein the other wireless communication is wireless communication conforming to a wireless local area network (LAN) standard, and
wherein the control unit occupies the frequency band for wireless communication of the cellular system during the first period by controlling a wireless communication device for performing the wireless communication of the cellular system so that the wireless communication device transmits a frame including duration information for setting a network allocation vector (NAV) using the frequency band,
(23)
The device according to any one of (1) to (22), wherein the control unit releases the frequency band from wireless communication of the cellular system during at least the second period by controlling a wireless communication device for performing the wireless communication of the cellular system so that the wireless communication device does not transmit a signal using the frequency band during at least the second period.
(24)
The device according to any one of (10) to (23), wherein the wireless communication device is at least one of a base station and a terminal device for performing wireless communication of the cellular system.

(25)

The device according to any one of (1) to (24), wherein the other wireless communication is wireless communication conforming to a wireless local area network (LAN) standard.

(26)

The device according to (25), wherein the control unit controls a wireless communication device for performing wireless communication of the cellular system so that the wireless communication device starts to transmit a signal using the frequency band before a period in which no signal is transmitted using the frequency band becomes a distributed coordination function (DCF) inter-frame space (DIFS).

(27)

The device according to (26), wherein the control unit controls the wireless communication device so that the wireless communication device starts to transmit a signal using the frequency band after the period in which no signal is transmitted using the frequency band is longer than a short inter-frame space (SIFS).

(28)

The device according to any one of (25) to (27), wherein the control unit controls a wireless communication device for performing wireless communication of the cellular system so that the wireless communication device transmits a dummy signal using the frequency band during a period until a radio frame for another frequency band to be used in the wireless communication of the cellular system starts.

(29)

The device according to any one of (24) to (26), wherein the control unit controls a wireless communication device for performing wireless communication of the cellular system so that the wireless communication device transmits a frame including duration information for setting an NAV using the frequency band before a radio frame for another frequency band to be used in the wireless communication of the cellular system starts.

(30)

The device according to any one of (26) to (29), wherein the wireless communication device is at least one of a base station and a terminal device for performing wireless communication of the cellular system.

(31)

The device according to any one of (1) to (17) and (22) to (30), wherein the device is a base station for performing wireless communication of the cellular system, a base station device for the base station, or a module for the base station device.

(32)

The device according to any one of (1) to (17) and (22) to (30), wherein the device is a terminal device for performing wireless communication of the cellular system or a module for the terminal device.

(33)

A method including:

occupying, by a processor, a frequency band shared between wireless communication of a cellular system and other wireless communication for the wireless communication of the cellular system during a first period and releasing the frequency band from the wireless communication of the cellular system during at least a second period corresponding to the first period.

(34)

A program for causing a processor to execute:

occupying a frequency band shared between wireless communication of a cellular system and other wireless communication for the wireless communication of the cellular system during a first period and releasing the frequency band from the wireless communication of the cellular system during at least a second period corresponding to the first period.

(35)

A readable recording medium having a program recorded thereon, the program causing a processor to execute:

occupying a frequency band shared between wireless communication of a cellular system and other wireless communication for the wireless communication of the cellular system during a first period and releasing the frequency band from the wireless communication of the cellular system during at least a second period corresponding to the first period.

(36)

A device including: a control unit configured to control a wireless communication device for performing wireless communication of a cellular system so that the wireless communication device transmits a signal using a frequency band shared between the wireless communication of the cellular system and other wireless communication at any time.

(37)

An method including: controlling, by a processor, a wireless communication device for performing wireless communication of a cellular system so that the wireless communication device transmits a signal using a frequency band shared between the wireless communication of the cellular system and other wireless communication at any time.

(38)

A program for causing a processor to execute: controlling a wireless communication device for performing wireless communication of a cellular system so that the wireless communication device transmits a signal using a frequency band shared between the wireless communication of the cellular system and other wireless communication at any time.

(39)

A readable recording medium having a program recorded thereon, the program causing a processor to execute: controlling a wireless communication device for performing wireless communication of a cellular system so that the wireless communication device transmits a signal using a frequency band shared between the wireless communication of the cellular system and other wireless communication at any time.

(40)

A device including: a control unit configured to control a wireless communication device for performing wireless communication of a cellular system so that the wireless communication device starts to transmit a signal using a frequency band shared between the wireless communication of the cellular system and other wireless communication before a period in which no signal is transmitted using the frequency band becomes a DIFS.

(41)

A method including: controlling, by a processor, a wireless communication device for performing wireless communication of a cellular system so that the wireless communication device starts to transmit a signal using a frequency band shared between the wireless communication of the cellular system and other wireless communication before a period in which no signal is transmitted using the frequency band becomes a DIFS.

(42)

A program for causing a processor to execute: controlling a wireless communication device for performing wireless communication of a cellular system so that the wireless communication device starts to transmit a signal using a frequency band shared between the wireless communication of the cellular system and other wireless communication before a period in which no signal is transmitted using the frequency band becomes a DIFS.

(43)

A readable recording medium having a program recorded thereon, the program causing a processor to execute: controlling a wireless communication device for performing wireless communication of a cellular system so that the wireless communication device starts to transmit a signal using a frequency band shared between the wireless communication of the cellular system and other wireless communication before a period in which no signal is transmitted using the frequency band becomes a DIFS.

(44)

A device including: a control unit configured to control a wireless communication device for performing wireless communication of a cellular system so that the wireless communication device transmits a dummy signal using a frequency band shared between the wireless communication of the cellular system and other wireless communication during a period until a radio frame for another frequency band to be used in the wireless communication of the cellular system starts.

(45)

A method including: controlling, by a processor, a wireless communication device for performing wireless communication of a cellular system so that the wireless communication device transmits a dummy signal using a frequency band shared between the wireless communication of the cellular system and other wireless communication during a period until a radio frame for another frequency band to be used in the wireless communication of the cellular system starts.

(46)

A program for causing a processor to execute: controlling a wireless communication device for performing wireless communication of a cellular system so that the wireless communication device transmits a dummy signal using a frequency band shared between the wireless communication of the cellular system and other wireless communication during a period until a radio frame for another frequency band to be used in the wireless communication of the cellular system starts.

(47)

A readable recording medium having a program recorded thereon, the program causing a processor to execute: controlling a wireless communication device for performing wireless communication of a cellular system so that the wireless communication device transmits a dummy signal using a frequency band shared between the wireless communication of the cellular system and other wireless communication during a period until a radio frame for another frequency band to be used in the wireless communication of the cellular system starts.

(48)

The device according to any one of (36), (40), and (44), wherein the device is a base station for performing wireless communication of the cellular system, a base station device for the base station, or a module for the base station device.

(49)

The device according to any one of (36), (40), and (44), wherein the device is a terminal device for performing wireless communication of the cellular system or a module for the terminal device.

REFERENCE SIGNS LIST 1 cellular system
10 cell
30 access point
40 communication area
50 terminal device
61 first period
63 second period
65 third period
71 shared band
100 base station
151, 161, 171 communication control unit
200 terminal device
241, 251, 261, 271 communication control unit

The invention claimed is:

1. A communication control device comprising:
processing circuitry configured to
communicate with a terminal device via a plurality of component carriers according to carrier aggregation, the plurality of component carriers including a primary component carrier and a secondary component carriers, the secondary component carrier being controllable to be activated and deactivated; and
control setting a first period and a second period, the secondary component carrier being configured by occupying an unlicensed frequency band shared between wireless communication of a cellular system and wireless communication of a wireless local area network during the first period, the unlicensed frequency band being released from the secondary component carrier during the second period,
wherein the primary component carrier uses a licensed frequency band for the cellular system during both the first period and the second period,
wherein the first period has a variable length depending on a length of the second period such that the first period maintains a length that is a predetermined percentage of the length of the second period.

2. The communication control device according to claim 1, wherein the first period is a period of one or more radio frames of the cellular system.

3. The communication control device according to claim 1, wherein the first period is a continuous period.

4. The communication control device according to claim 3, wherein the second period is a period immediately before or immediately after the first period.

5. The communication control device according to claim 4, wherein the second period is a continuous period immediately after the first period.

6. The communication control device according to claim 4, wherein the second period is a period immediately before the first period and a period immediately after the first period.

7. The communication control device according to claim 4, wherein the second period is a continuous period immediately before the first period.

8. The communication control device according to claim 3,
wherein the first period is a discontinuous period, and
wherein the processing circuitry occupies the frequency band for the wireless communication of the cellular system during the first period and releases the frequency band from the wireless communication of the cellular system during at least the second period, within a third period.

9. The communication control device according to claim 1, wherein the second period has a length which is 90% to 110% of a length of the first period.

10. The communication control device according to claim 1, wherein the processing circuitry occupies the frequency band for the wireless communication of the cellular system during the first period by controlling a wireless communication device for performing wireless communication of the cellular system so that the wireless communication device for performing the wireless communication of the cellular system transmits a signal using the frequency band during the first period.

11. The communication control device according to claim 10, wherein the processing circuitry controls the wireless communication device so that the wireless communication device transmits a signal using the frequency band at any time.

12. The communication control device according to claim 11, wherein the processing circuitry controls the wireless communication device so that transmission power of a signal to be transmitted using the frequency band is greater than or equal to predetermined transmission power at any time.

13. The device according to claim 11, wherein the processing circuitry controls the wireless communication device so that the wireless communication device transmits a signal using the frequency band in each symbol.

14. The communication control device according to claim 13, wherein the processing circuitry controls the wireless communication device so that the wireless communication device transmits a dummy signal using the frequency band in at least a symbol in which neither a data signal nor a control signal of the cellular system is transmitted using the frequency band.

15. The communication control device according to claim 14, wherein the processing circuitry controls the wireless communication device so that the wireless communication device transmits the dummy signal in some radio resources among radio resources arranged in a frequency direction across the frequency band in at least the symbol.

16. The communication control device according to claim 15, wherein the some radio resources are some resource blocks among resource blocks arranged in a frequency direction across the frequency band.

17. The communication control device according to claim 15, wherein the some radio resources are some resource elements included in each resource block arranged in a frequency direction across the frequency band.

18. The communication control device according to claim 11,
wherein the communication control device is a base station for performing wireless communication of the cellular system, a base station device for the base station, or a module for the base station device, and
wherein the processing circuitry instructs a terminal device for performing wireless communication of the cellular system to transmit a signal using the frequency band at any time for an uplink.

19. The communication control device according to claim 18, wherein the processing circuitry instructs each of a plurality of terminal devices for performing wireless communication of the cellular system to transmit a signal using the frequency band at any time for an uplink.

20. The communication control device according to claim 18,
wherein the processing circuitry instructs a plurality of terminal devices to transmit dummy signals in some radio resources among radio resources arranged in a frequency direction across the frequency band in at least a symbol in which neither a data signal nor a control signal of the cellular system is transmitted using the frequency band for an uplink, and
wherein the some radio resources are common among a plurality of terminal devices.

21. A terminal device comprising:
processing circuitry configured to:
communicate with a base station via a plurality of component carriers according to carrier aggregation, the plurality of component carriers including a primary component carrier and a secondary component carriers, the secondary component carrier being controllable to be activated and deactivated; and
recognize a first period and a second period, the secondary component carrier being configured by occupying an unlicensed frequency band shared between wireless communication of a cellular system and wireless communication of a wireless local area network during the first period, the unlicensed frequency band being released from the secondary component carrier during the second period,
wherein the primary component carrier uses a licensed frequency band for the cellular system during both the first period and the second period,
wherein the first period has a variable length depending on a length of the second period such that the first period maintains a length that is a predetermined percentage of the length of the second period.

22. A method, implemented by a communication control device, comprising:
communicating with a terminal device via a plurality of component carriers according to carrier aggregation, the plurality of component carriers including a primary component carrier and a secondary component carriers, the secondary component carrier being controllable to be activated and deactivated; and
controlling setting a first period and a second period, the secondary component carrier being configured by occupying an unlicensed frequency band shared between wireless communication of a cellular system and wireless communication of a wireless local area network during the first period, the unlicensed frequency band being released from the secondary component carrier during the second period,
wherein the primary component carrier uses a licensed frequency band for the cellular system during both the first period and the second period,
wherein the first period has a variable length depending on a length of the second period such that the first period maintains a length that is a predetermined percentage of the length of the second period.

* * * * *